US012710762B2

(12) United States Patent
Shokri et al.

(10) Patent No.: US 12,710,762 B2
(45) Date of Patent: Aug. 18, 2026

(54) LOGISTICS AUTONOMOUS VEHICLE WITH ROBUST OBJECT DETECTION, LOCALIZATION AND MONITORING

(71) Applicant: Symbotic LLC, Wilmington, MA (US)

(72) Inventors: Maryam Shokri, Wilmington, MA (US); Paul Besl, Wilmington, MA (US)

(73) Assignee: Symbotic LLC, Wilmington, MA (US)

( * ) Notice: Subject to any disclaimer, the term of this patent is extended or adjusted under 35 U.S.C. 154(b) by 189 days.

(21) Appl. No.: 18/474,765

(22) Filed: Sep. 26, 2023

(65) Prior Publication Data

US 2024/0111308 A1 Apr. 4, 2024

Related U.S. Application Data

(60) Provisional application No. 63/377,271, filed on Sep. 27, 2022.

(51) Int. Cl.
*G05D 1/06* (2006.01)
*G05D 1/622* (2024.01)
*G06V 10/82* (2022.01)

(52) U.S. Cl.
CPC ............. *G05D 1/622* (2024.01); *G06V 10/82* (2022.01)

(58) Field of Classification Search
CPC ............................... G05D 1/622; G06V 10/82
USPC ........................................................... 701/23
See application file for complete search history.

(56) References Cited

U.S. PATENT DOCUMENTS 4,954,962 A 9/1990 Evans, Jr. et al.
4,965,442 A 10/1990 Girold et al.
5,040,116 A 8/1991 Evans, Jr. et al.
6,072,903 A 6/2000 Maki et al.
6,101,455 A 8/2000 Davis
9,538,892 B2 1/2017 Fong et al.
9,910,444 B2 3/2018 Eade et al.
10,335,004 B2 7/2019 Fong et al.
10,650,574 B2 5/2020 Holzer et al.
10,664,502 B2 5/2020 Chambers et al.
(Continued)

FOREIGN PATENT DOCUMENTS

EP 3555854 11/2021

OTHER PUBLICATIONS

International Search Report for application No. PCT/US23/75234 dated Mar. 21, 2024.
(Continued)

*Primary Examiner* — Mahmoud S Ismail
(74) *Attorney, Agent, or Firm* — Perman & Green, LLP

(57) ABSTRACT

An autonomous guided vehicle including a frame, a drive section, a payload handler, a vision system, and a controller. The vision system has a camera disposed to generate video stream data imaging of an object. The controller being communicably connected to register the video stream data imaging from the at least one camera and communicably connected to at least one or more of a time of flight sensor and a distance sensor that detects a distance of the object. The controller is configured so to effect, from the video stream data imaging, robust object detection and localization within a predetermined reference frame via alternately both binocular vision and monocular vision from the video stream data imaging, the detection determined via monocular vision having confidence commensurate with detection determined via the binocular vision.

24 Claims, 23 Drawing Sheets

(56) References Cited

U.S. PATENT DOCUMENTS

| | | | | |
|---|---|---|---|---|
| 10,774,650 | B2 | 9/2020 | Nash et al. | |
| 11,446,810 | B1 | 9/2022 | Chua et al. | |
| 2013/0073088 | A1 | 3/2013 | Lee et al. | |
| 2014/0277691 | A1 | 9/2014 | Jacobus et al. | |
| 2018/0307922 | A1* | 10/2018 | Yoon | G06T 7/55 |
| 2019/0212730 | A1 | 7/2019 | Jones et al. | |
| 2020/0302207 | A1 | 9/2020 | Perkins et al. | |
| 2021/0039897 | A1* | 2/2021 | Cyrulik | B65G 1/1373 |
| 2021/0117704 | A1* | 4/2021 | Yao | G06T 7/73 |
| 2021/0173407 | A1* | 6/2021 | Tang | G06V 40/103 |
| 2021/0208771 | A1 | 7/2021 | Jones et al. | |
| 2022/0024486 | A1 | 1/2022 | Scott et al. | |
| 2022/0172607 | A1* | 6/2022 | Guan | G08G 1/052 |

OTHER PUBLICATIONS

Lowe, D.G., Distinctive Image Features from Scale-Invariant Keypoints, International Journal of Computer Vision 60, 91-110, httpsdol.org10.1023B VISI.0000029664.99615.94. Jan. 5, 2004.

* cited by examiner 100
190
401
OPERATING ENVIRONMENT
STORAGE STRUCTURE LEVEL
PICKING AISLES
TRANSFER DECK(S)
NETWORK
CONTROL SERVER (CMS)
PALLETIZER CONTROL
BOTS
LIFT MODULE(S)
IN-FEED TRANSFER STATIONS
OUT-FEED TRANSFER STATIONS
PACKAGES
PALLETIZER
PALLETIZER CONTROL
WAREHOUSE MANAGEMENT SYSTEM
UI
2500
CU
PAL
162
164
170
160
150A
150B
150LHD
130L
130S
(P)
130
130A
130AR
130B
140
180
120
120SL
164'
DC
110
400
122
122VC
MS
SH
ML
ANN
SL

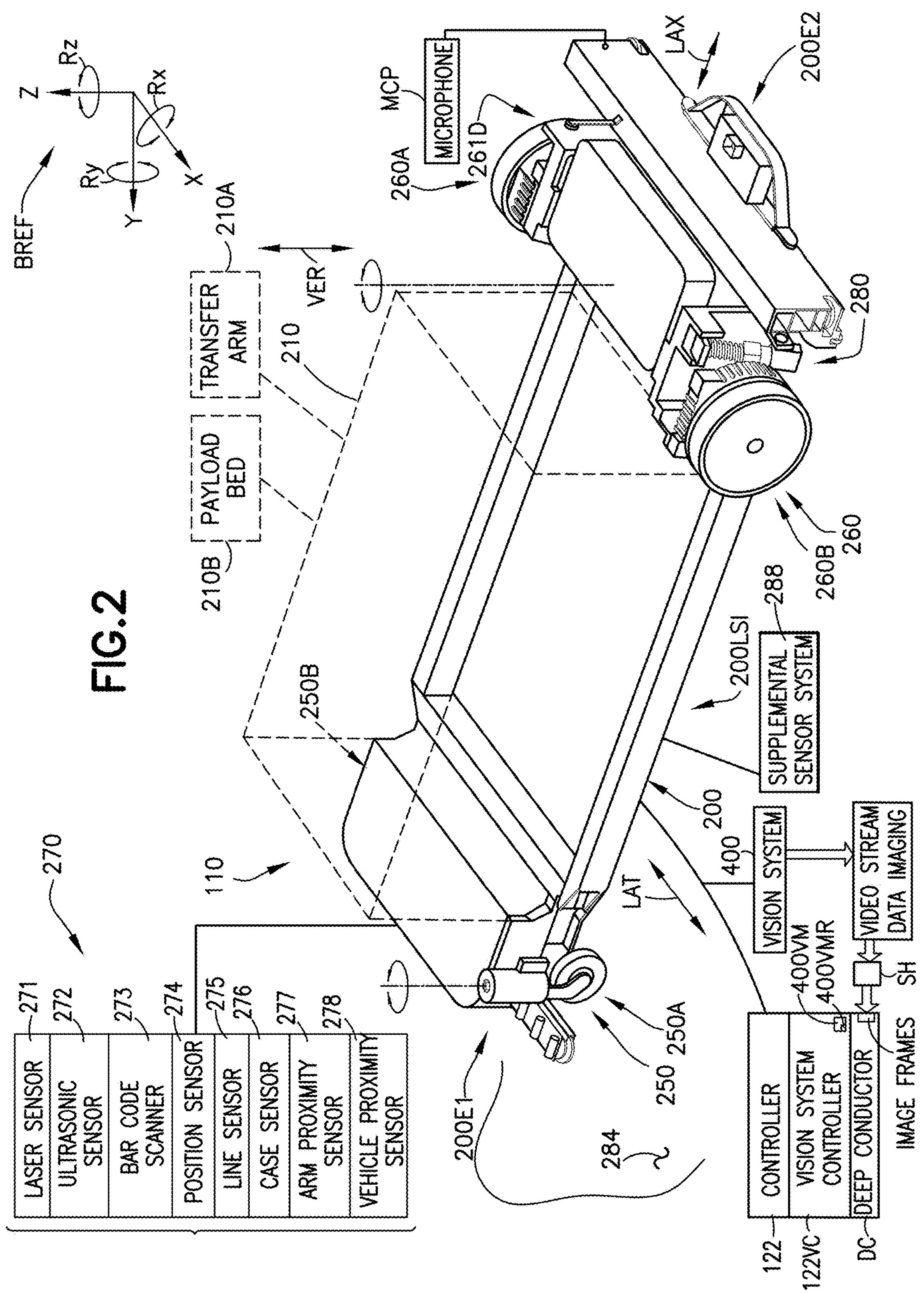
FIG.2
BREF
Z
Rz
Rx
X
Y
Ry
210A
TRANSFER ARM
PAYLOAD BED
210B
210
VER
MCP
MICROPHONE
261D
260A
LAX
200E2
280
260
260B
288
SUPPLEMENTAL SENSOR SYSTEM
200LSI
250B
110
270
200
400
VISION SYSTEM
VIDEO STREAM DATA IMAGING
LAT
400VM
400VMR
SH
CONTROLLER
VISION SYSTEM CONTROLLER
DEEP CONDUCTOR
IMAGE FRAMES
122
122VC
DC
250A
250
200E1
284
271
LASER SENSOR
272
ULTRASONIC SENSOR
273
BAR CODE SCANNER
274
POSITION SENSOR
275
LINE SENSOR
276
CASE SENSOR
277
ARM PROXIMITY SENSOR
278
VEHICLE PROXIMITY SENSOR 110
288
284
299
LAXCL
200E1
200E2
BREF
Z (VER)
X (LAT)
Y
LAT1
LAT2
CLPB
430AF
430BF
430A
430B
440D
477B
460B
460BF
460A
460AF
440B
410BF
410B
450B
450A
410A
440A
410AF
420A
420B
440C
477A
420AF
420BF
471
472
210B
PSP
210AT
210A
YW
1199
555
CL
CU
FFCP

LOGISTICS AUTONOMOUS VEHICLE WITH ROBUST OBJECT DETECTION, LOCALIZATION AND MONITORING

CROSS-REFERENCE TO RELATED APPLICATIONS

This application is a non-provisional of and claims the benefit of U.S. provisional patent application No. 63/377,271 filed on Sep. 27, 2022, the disclosure of which is incorporated herein by reference in its entirety.

BACKGROUND

1. Field

The disclosed embodiment generally relates to material handling systems, and more particularly, to transports for automated logistics systems.

2. Brief Description of Related Developments

Generally, automated logistics systems, such as automated storage and retrieval systems, employ autonomous vehicles that transport goods within the automated storage and retrieval system. These autonomous vehicles are guided throughout the automated storage and retrieval system by location beacons, capacitive or inductive proximity sensors, line following sensors, reflective beam sensors and other narrowly focused beam type sensors. These sensors may provide limited information for effecting navigation of the autonomous vehicles through the storage and retrieval system or provide limited information with respect to identification and discrimination of hazards that may be present throughout the automated storage and retrieval system.

The autonomous vehicles may also be guided throughout the automated storage and retrieval system by vision systems that employ stereo or binocular cameras. However, in a logistics environment the stereo camera pairs may be impaired or not always available due to, e.g., blockage or view obstruction (by, for example, payload carried by the autonomous vehicle, storage structure, etc.) and/or view obscurity of one camera in the pair of stereo cameras; or image processing may be degraded from processing of duplicate image data or images that are otherwise unsuitable (e.g., blurred, etc.) for guiding and localizing the autonomous vehicle within the automated storage and retrieval system.

BRIEF DESCRIPTION OF THE DRAWINGS

The foregoing aspects and other features of the disclosed embodiment are explained in the following description, taken in connection with the accompanying drawings, wherein:

FIG. 2 is a schematic illustration of an autonomous guided vehicle, of the logistics facility of FIG. 1A, in accordance with aspects of the disclosed embodiment;

DETAILED DESCRIPTION

Figure 1A:
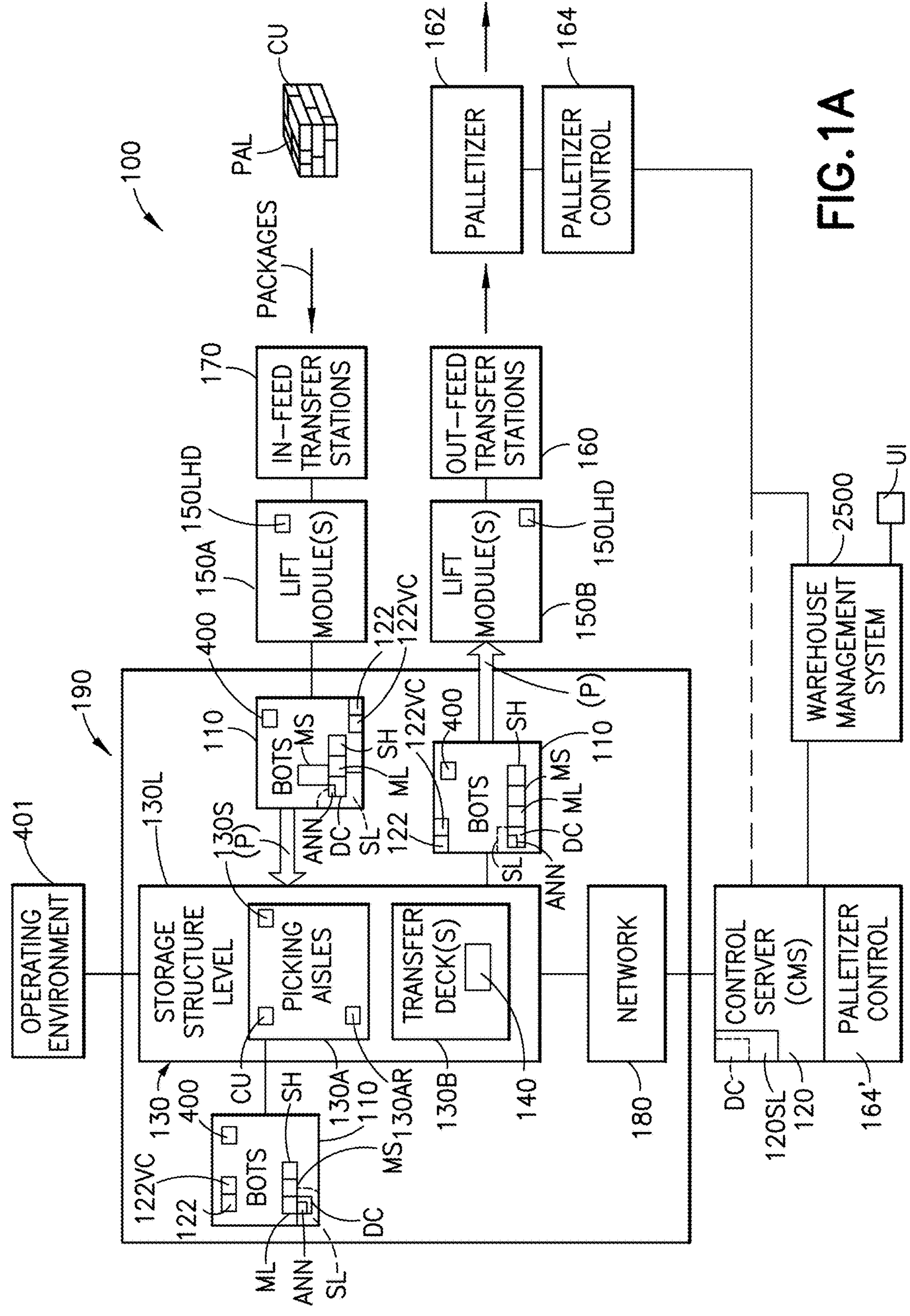
FIG. 1A is a schematic illustration of a logistics facility incorporating aspects of the disclosed embodiment.
Figure 1B:
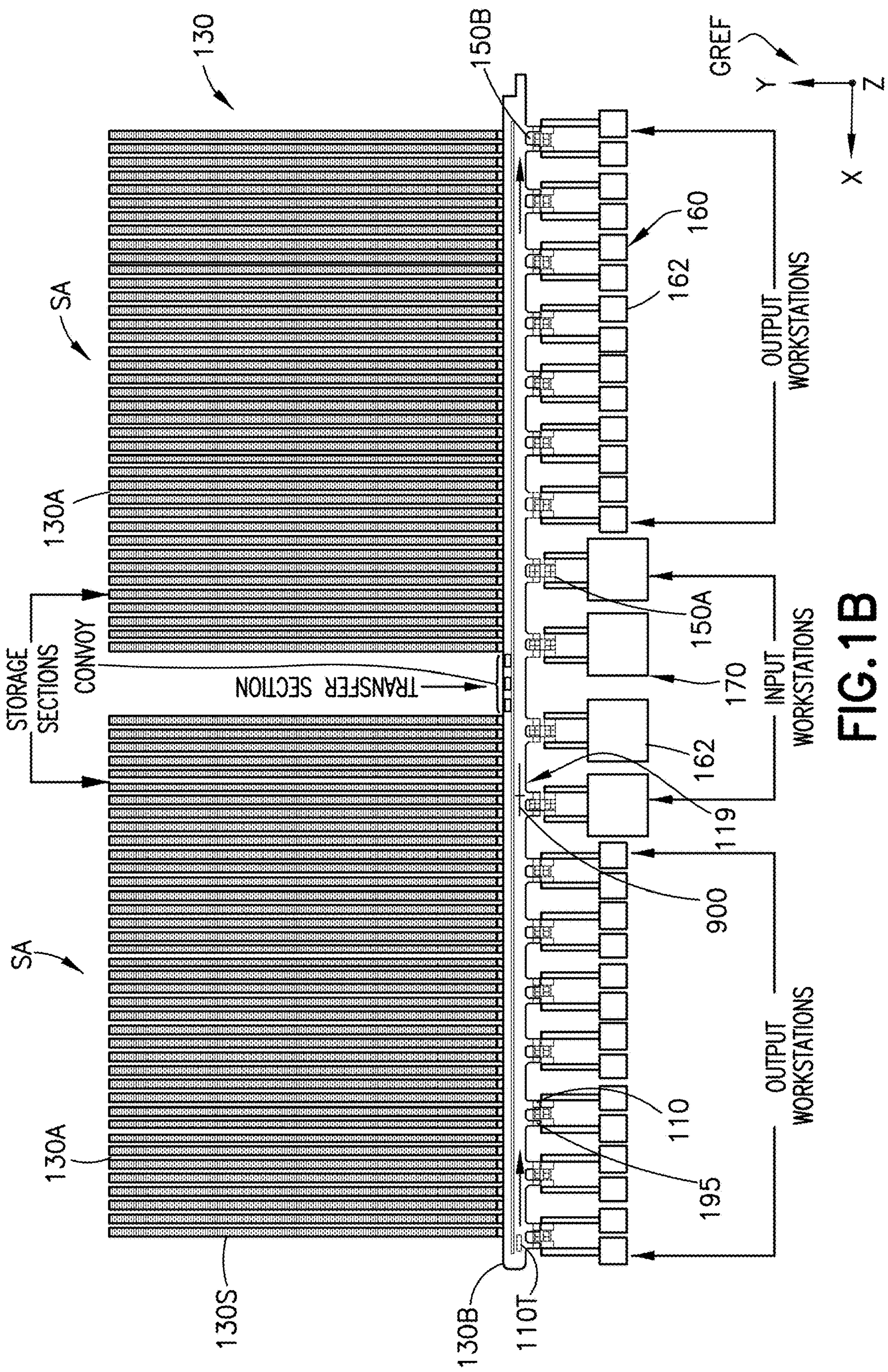
FIG. 1B is a schematic illustration of the logistics facility of FIG. 1A in accordance with aspects of the disclosed embodiment.

FIGS. 1A and 1B illustrate an exemplary automated storage and retrieval system 100 in accordance with aspects of the disclosed embodiment. Although the aspects of the disclosed embodiment will be described with reference to the drawings, it should be understood that the aspects of the disclosed embodiment could be embodied in many forms. In addition, any suitable size, shape or type of elements or materials could be used.

Figure 10:
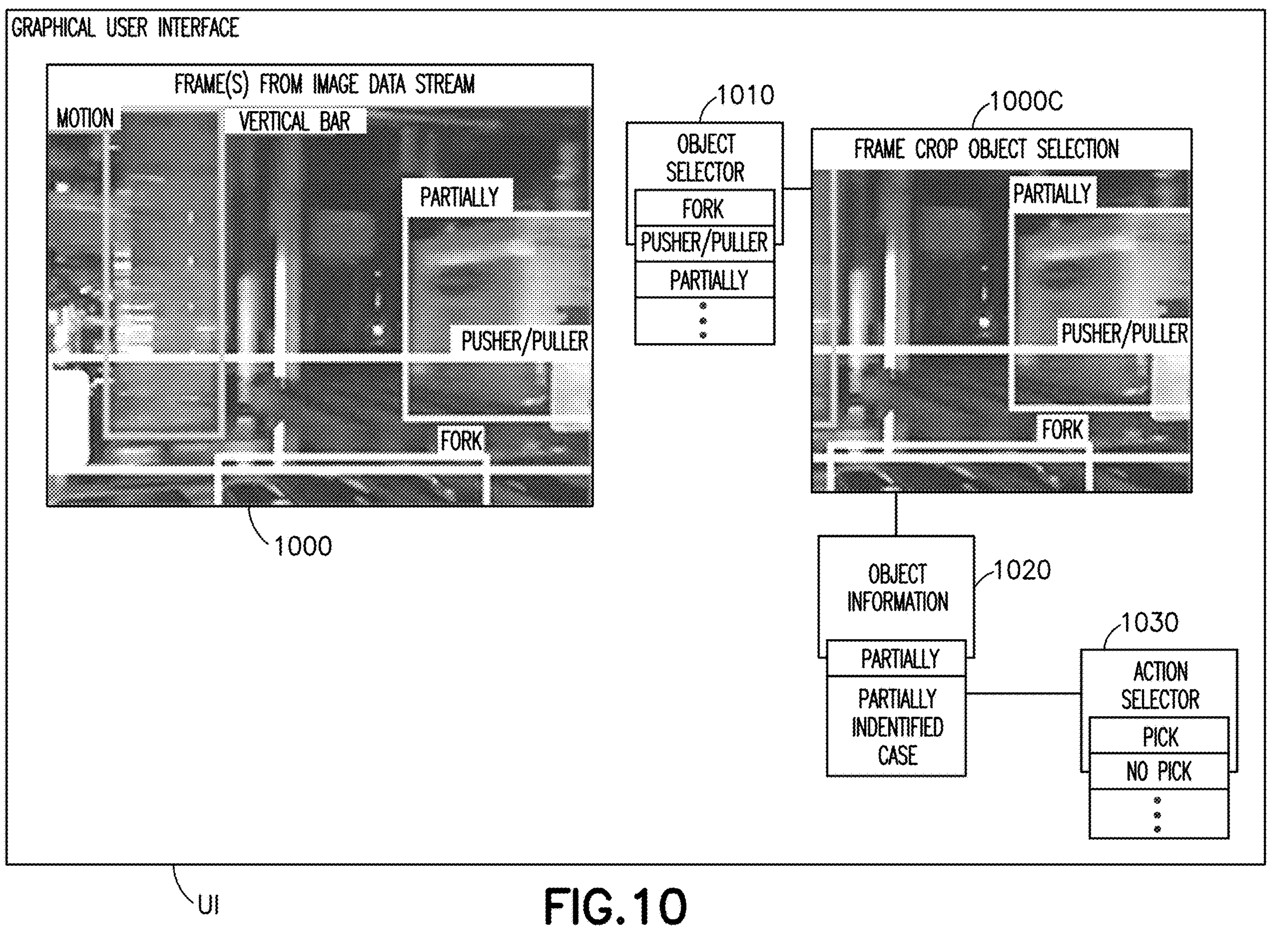
FIG. 10 is an exemplary user interface of the autonomous guided vehicle of FIG. 2 in accordance with aspects of the disclosed embodiment.

The aspects of the disclosed embodiment provide for a logistics autonomous guided vehicle 110 (referred to herein as an autonomous guided vehicle) having intelligent autonomy and collaborative operation. For example, the autonomous guided vehicle 110 includes a vision system 400 (see FIG. 2) having at least one camera 410A, 410B, 420A, 420B, 430A, 430B, 460A, 460B, 477A, 477B disposed to generate video stream data imaging of an object in a logistic space (such as the operating environment or space of the storage and retrieval system 100). The object is one or more of: at least part of the autonomous guided vehicle 110 frame 200, at least part of the payload (e.g., case CU), at least part of the transfer arm 210A, and at least part of a logistic item (other cases CU) or structure (e.g., of the storage and retrieval system 100) in the logistic space beyond the autonomous guided vehicle 110. For exemplary purposes, the vision system 400 employs at least stereo or binocular vision configured to effect detection cases CU and objects (such as facility structure and undesired foreign/transient materials) within a logistics facility, such as the automated storage and retrieval system 100, as well as autonomous guided vehicle localization within the automated storage and retrieval system 100. The vision system 400 also provides for collaborative vehicle operation by providing images (still or video stream, live or recorded) to an operator of the automated storage and retrieval system 100, where those images are, in some aspects, provided through a user interface UI as augmented images as described herein and as illustrated in FIG. 10.

As will be described in greater detail herein, the autonomous guided vehicle 110 includes a controller 122 that is programmed with one or more machine learning models ML and one or more artificial neural networks ANN that access data from the vision system 400 to effect robust case/object detection and localization regardless of obstruction of one or more cameras of the vision system 400. Here the case/object detection is robust in that the case/object is detected and localized, even where stereo vision is unavailable in a super-constrained system or operating environment, through employment of the artificial neural network ANN and machine learning model(s) ML which provide a detection and localization effect commensurate with the detection and localization obtained with the stereo vision. The super-constrained system includes, but is not limited to, at least the following constraints: spacing between adjacent cases is a densely packed spacing, the autonomous guided vehicle is configured to underpick (lift from beneath) cases, different sized cases are distributed within the storage array SA in a Gaussian distribution, cases may exhibit deformities, and cases may be placed on a support surface in an irregular manner, all of which impact the transfer of case units CU between the storage shelf 555 (or other case holding location) and the autonomous guided vehicle 110.

Another constraint of the super-constrained system is the transfer time for an autonomous guided vehicle 110 to transfer a case unit(s) between a payload bed 210B of the autonomous guided vehicle 110 and a case holding location (e.g., storage space, buffer, transfer station, or other case holding location described herein). Here, the transfer time for case transfer is about 10 seconds or less. As such, the vision system 400 discriminates case location and pose (or holding station location and pose) in less than about two seconds or in less than about half a second.

As noted above, the cases CU stored in the storage and retrieval system have a Gaussian distribution (see FIG. 4A) with respect to the sizes of the cases within a picking aisle 130A and with respect to the sizes of cases throughout the storage array SA such that as cases are picked and placed, the size of any given storage space on a storage shelf 555 dynamically varies (e.g., a dynamic Gaussian case size distribution). As such, the autonomous guided vehicle 110 is configured, as described herein, to identify cases held in the dynamically sized (according to the case held therein) storage spaces regardless of blockage of one camera in a pair of stereo cameras that effect object detection and localization.

Figure 4A:
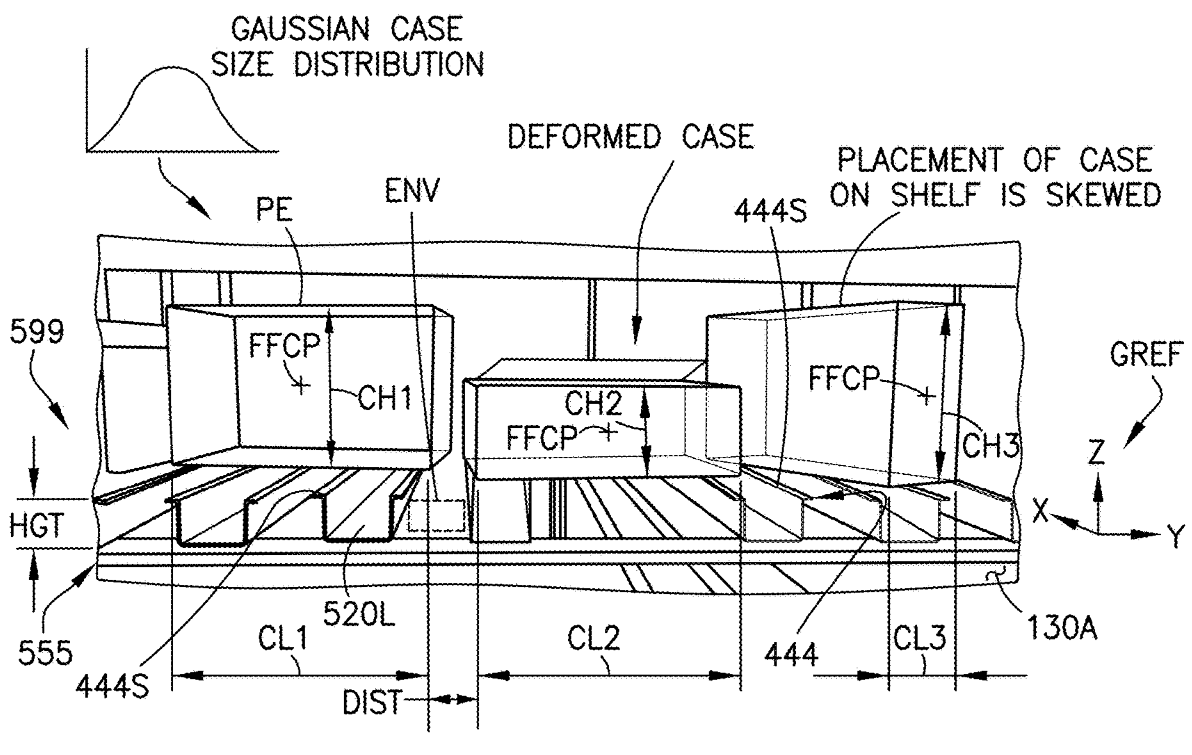
FIGS. 4A, 4B and 4C are examples of image data captured with a vision system, of the autonomous guided vehicle of FIG. 2, in accordance with aspects of the disclosed embodiment.
Figure 4B:
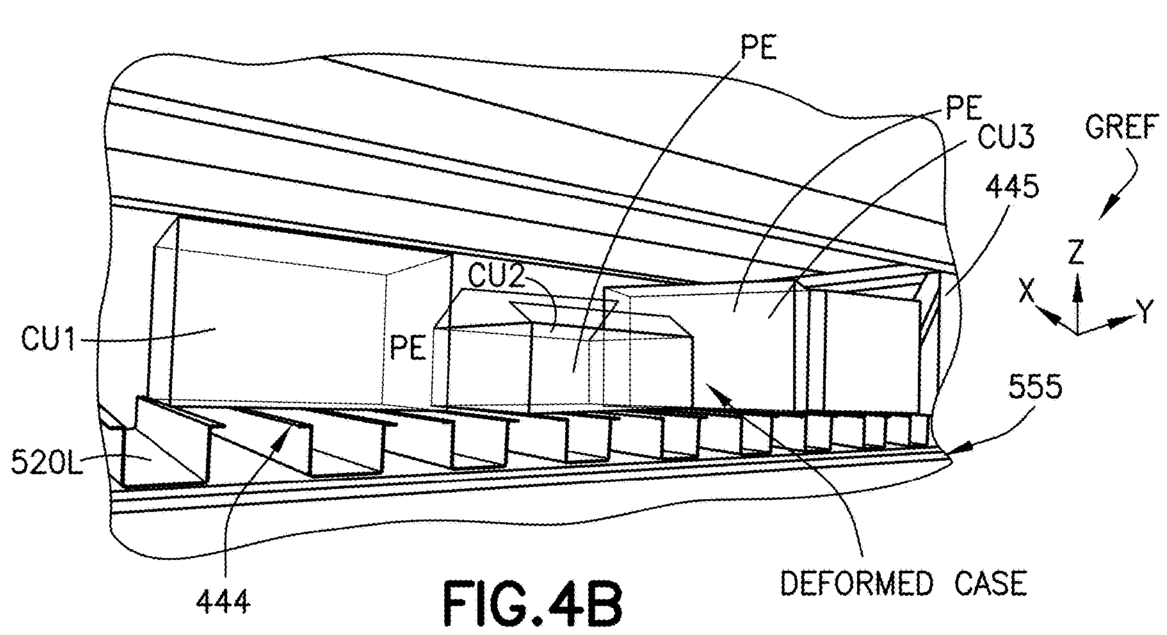
Figure 4C:
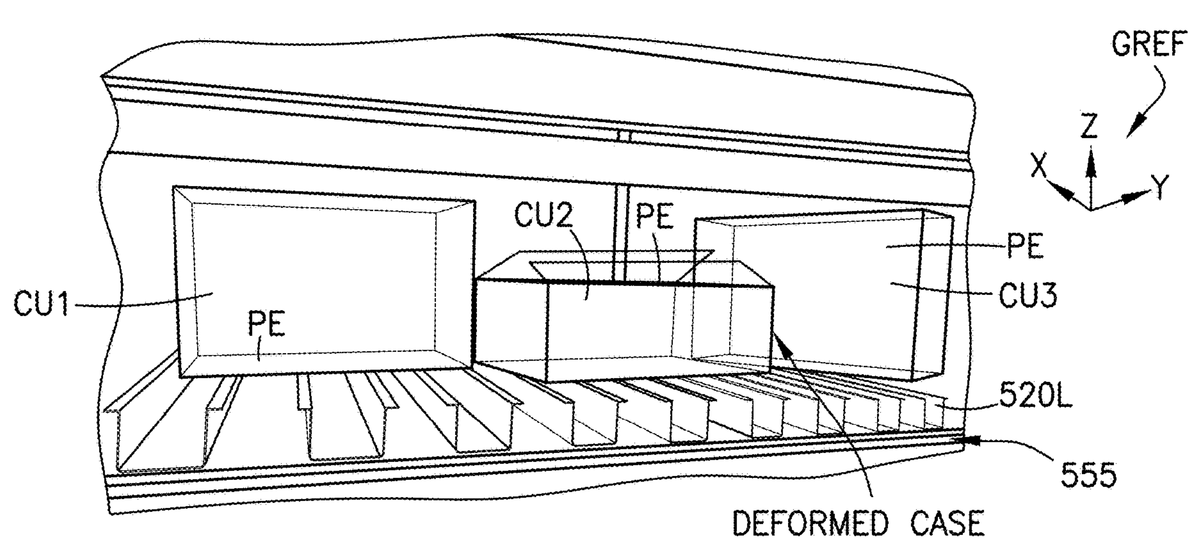

In addition, as can be seen in, e.g., FIG. 4A, the cases CU are placed on storage shelves 555 (or other holding station) in a close coupled or densely spaced relationship where the distance DIST between adjacent case units CU is about one-half the distance between storage shelf hats 444. The distance/width DIST between hats 444 of the support slats 520L is about 2.5 inches. The dense spacing of the cases CU may be compounded (i.e., the spacing may be less than one-half the distance between the storage shelf hats 444) in that the cases CU (e.g., deformed cases—see FIGS. 4A-4C illustrating an open flap case deformity) may exhibit deformations (e.g., such as bulging sides, open flaps, convex sides) and/or may be skewed relative to the hats 444 on which the cases CU sit (i.e., the front face of a case may not be parallel with the front of the storage shelf 555 and the lateral sides of the case may not be parallel with the hat 555 of the storage shelf 555 (see FIG. 4A). The case deformities and the skewed case placement may further decrease the spacing between adjacent cases. As such, the autonomous guided vehicle is configured, as described herein, to determine pick interference between the densely spaced adjacent cases regardless of blockage of one camera in a pair of stereo cameras that effect object detection and localization.

Figure 3A:
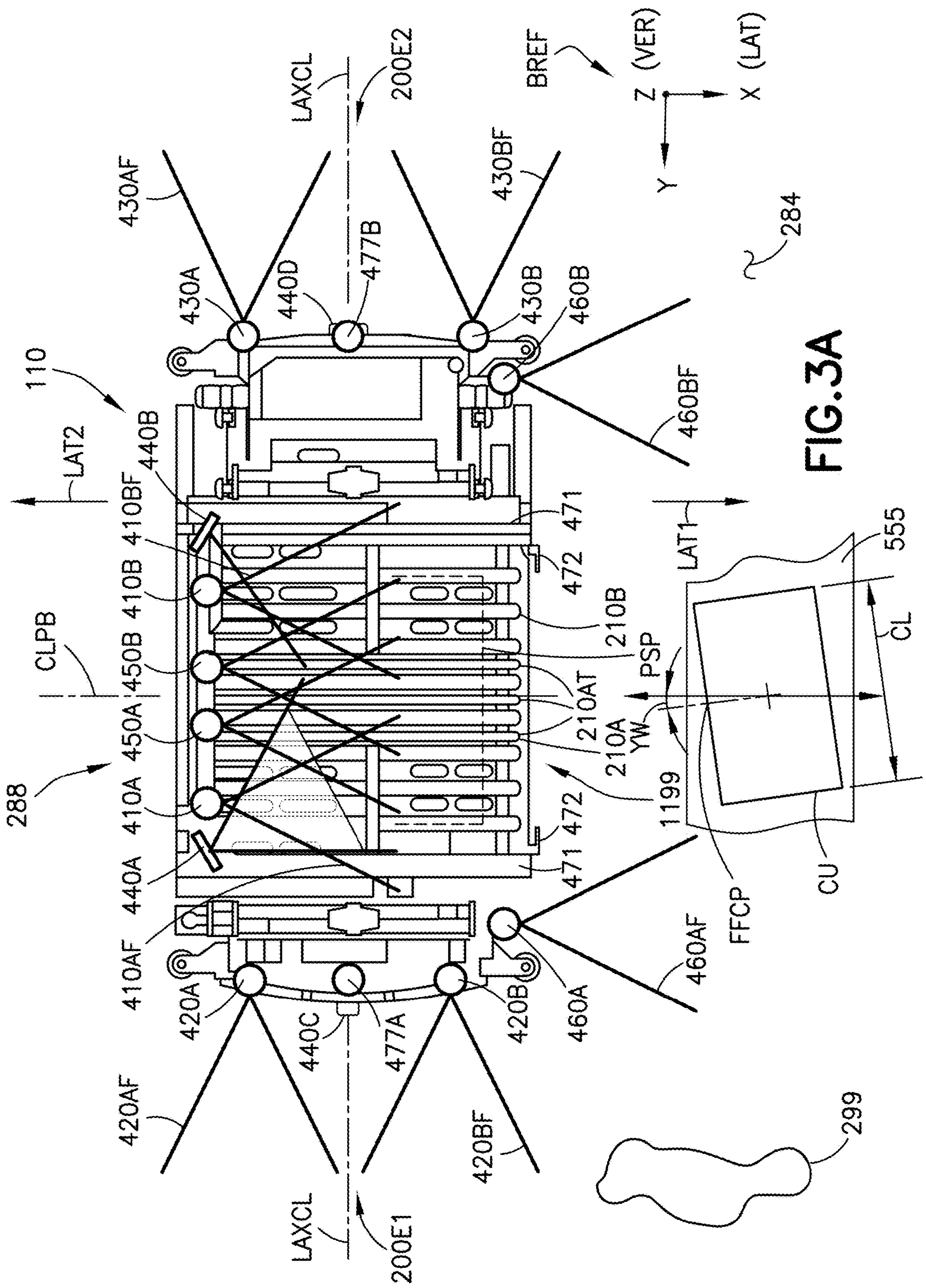
FIG. 3A is a schematic illustration of a portion of the autonomous guided vehicle of FIG. 2 in accordance with aspects of the disclosed embodiment.
Figure 3B:
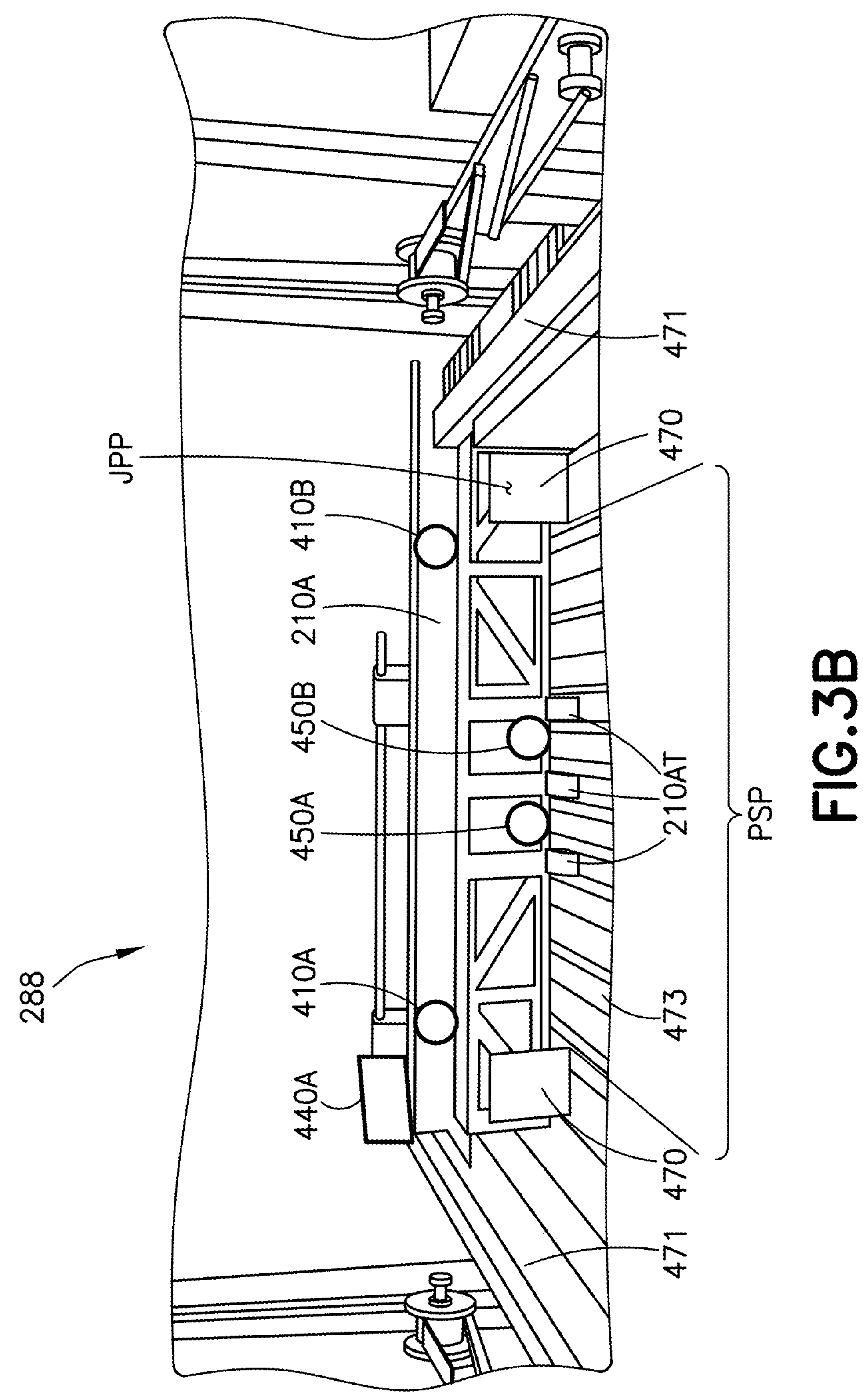
FIG. 3B is a schematic illustration of a portion of the autonomous guided vehicle of FIG. 2 in accordance with aspects of the disclosed embodiment.
Figure 3C:
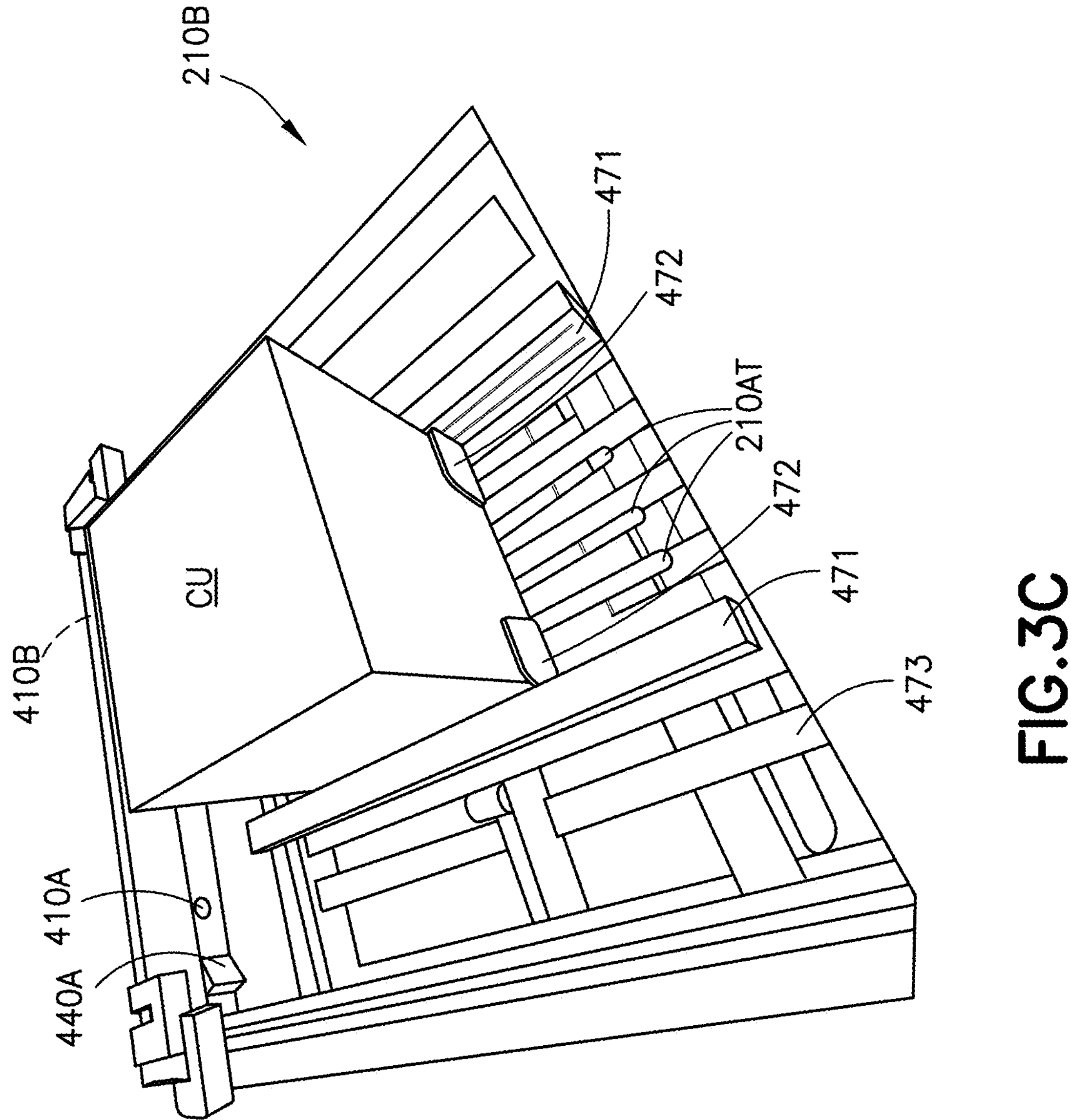
FIG. 3C is a schematic illustration of a portion of the autonomous guided vehicle of FIG. 2 in accordance with aspects of the disclosed embodiment.

It is also noted that the height HGT of the hats 444 is about 2 inches, where a space envelope ENV between the hats 444 in which a tine 210AT of the transfer arm 210A of the autonomous guided vehicle 110 is inserted underneath a case unit CU for picking/placing cases to and from the storage shelf 555 is about 1.7 inches in width and about 1.2 inches in height (see, e.g., FIGS. 3A, 3C and 4A). The underpicking of the cases CU by the autonomous guided vehicle must interface with the cases CU, held on the storage shelf 555, at the pick/case support plane (defined by the case seating surfaces 444S of the hats 444—see FIG. 4A) without impact between the autonomous guided vehicle 110 transfer arm 210A tines 210AT and the hats 444/slats 520L, without impact between the tines 210AT and an adjacent case (that is not to be picked), and without impact between the case being picked and an adjacent case not being picked, all of which is effected with placement of the tines 210AT in the envelope ENV between the hats 444. As such, the autonomous guided vehicle is configured, as described herein, to detect and localize the space envelope ENV for inserting tines 210AT of a transfer arm 210A beneath a predetermined case CU, for picking the case, regardless of blockage of one camera in a pair of stereo cameras that effect object detection and localization.

The super-constrained system described above requires robustness of the vision system, and may be considered to define the robustness of the vision system 400 as the vision system 400 is configured to accommodate the above-noted constraints, even with unavailability of stereo vision provided by the vision system 400, and may provide pose and localization information for cases CU and/or the autonomous guided vehicle 110 that effects an autonomous guided vehicle pick failure rate of about one pick failure for every about one million picks.

The robustness of the vision system 400 is effected, at least in part where the controller 122, includes a control module (referred to herein as a deep conductor module DC) that includes the artificial neural network ANN and is configured to select, via the artificial neural network ANN, a detection/localization protocol from one of both (alternately both) a computer vision protocol (e.g., that employs binocular/stereo vision) and a machine learning protocol (e.g., that employs monocular vision in conjunction with monocular vision data analysis with the machine learning models ML and artificial neural network ANN). As described herein, the controller 122 is configured so that object detection and localization, within a predetermined reference frame (e.g., global reference frame GREF and/or autonomous guided vehicle reference frame BREF), is effected from video stream data imaging selectably with binocular vision and monocular vision from the video stream data imaging. Each of the binocular vision object detection and localization and the monocular vision object detection and localization is selectable on demand by the controller 122. The controller 122 is configured so that the binocular vision object detection and localization and the monocular vision object detection and localization are interchangeably selectable by the controller 122. The controller 122 has a selector 122SL (effected with the deep conductor DC described herein) disposed to select between the binocular vision object detection and localization and the monocular vision object detection and localization on demand based on detection of a predetermined operating characteristic (such as the video stream data imaging registered by the controller being unsupportive of the binocular vision object detection and localization) of the autonomous guided vehicle 110. Here, the aspects of the disclosed embodiment provide for autonomous guided vehicle 110 obtaining data with binocular vision (with the autonomous guided vehicle 110 traversing through the storage and retrieval system 100) and switching to monocular vision on demand (or on the fly) when the data from the binocular vision is unsuitable to effect object detection and localization as described herein. The data obtained by the monocular vision object detection and localization is such that the controller 122 can perform object detection and localization for any given image frame data de novo without knowledge of data from previously obtained image frame data.

The computer vision protocol and the machine learning protocol operate simultaneously and the deep conductor module DC determines which protocol provides the highest detection and/or localization confidence and selects the protocol with the highest detection and/or localization confidence. It is noted that, when the machine learning protocol is selected, the monocular vision data (processed by the one or more machine learning models ML and one or more artificial neural networks ANN) is used in place of binocular or stereo (the terms binocular and stereo are used interchangeably herein) vision data (i.e., available, unobstructed, unobscured, and in-focus binocular vision or otherwise unimpaired binocular vision data of the computer vision protocol) with commensurate effect.

In accordance with the aspects of the disclosed embodiment, the automated storage and retrieval system 100 in FIGS. 1A and 1B may be disposed in a retail distribution (logistics) center or warehouse, for example, to fulfill orders received from retail stores for replenishment goods shipped in cases, packages, and or parcels. The terms case, package and parcel are used interchangeably herein and as noted before may be any container that may be used for shipping and may be filled with one or more product units by the producer. Case or cases as used herein means case, package or parcel units not stored in trays, on totes, etc. (e.g., uncontained). It is noted that the case units CU (also referred to herein as mixed cases, cases, and shipping units) may include cases of items/units (e.g., case of soup cans, boxes of cereal, etc.) or an individual item/unit that are adapted to be taken off of or placed on a pallet. In accordance with the exemplary embodiments, shipping cases or case units (e.g., cartons, barrels, boxes, crates, jugs, shrink wrapped trays or groups or any other suitable device for holding case units) may have variable sizes and may be used to hold case units in shipping and may be configured so they are capable of being palletized for shipping. Case units may also include totes, boxes, and/or containers of one or more individual goods, unpacked/decommissioned (generally referred to as breakpack goods) from original packaging and placed into the tote, boxes, and/or containers (collectively referred to as totes) with one or more other individual goods of mixed or common types at an order fill station. It is noted that when, for example, incoming bundles or pallets (e.g., from manufacturers or suppliers of case units arrive at the storage and retrieval system for replenishment of the automated storage and retrieval system 100, the content of each pallet may be uniform (e.g. each pallet holds a predetermined number of the same item—one pallet holds soup and another pallet holds cereal). As may be realized, the cases of such pallet load may be substantially similar or in other words, homogenous cases (e.g. similar dimensions), and may have the same SKU (otherwise, as noted before the pallets may be "rainbow" pallets having layers formed of homogeneous cases). As pallets leave the storage and retrieval system, with cases or totes filling replenishment orders, the pallets may contain any suitable number and combination of different case units (e.g., each pallet may hold different types of case units—a pallet holds a combination of canned soup, cereal, beverage packs, cosmetics and household cleaners). The cases combined onto a single pallet may have different dimensions and/or different SKU's.

The automated storage and retrieval system 100 may be generally described as a storage and retrieval engine 190 coupled to a palletizer 162. In greater detail now, and with reference still to FIGS. 1A and 1B, the storage and retrieval system 100 may be configured for installation in, for example, existing warehouse structures or adapted to new warehouse structures. As noted before the automated storage and retrieval system 100 shown in FIGS. 1A and 1B is representative and may include for example, in-feed and out-feed conveyors terminating on respective transfer stations 170, 160, lift module(s) 150A, 150B, a storage structure 130, and a number of autonomous guided vehicles 110. It is noted that the storage and retrieval engine 190 is formed at least by the storage structure 130 and the autonomous guided vehicles 110 (and in some aspect the lift modules 150A, 150B; however in other aspects the lift modules 150A, 150B may form vertical sequencers in addition to the storage and retrieval engine 190 as described in U.S. patent application Ser. No. 17/091,265 filed on Nov. 6, 2020 and titled "Pallet Building System with Flexible Sequencing," the disclosure of which is incorporated herein by reference in its entirety). In alternate aspects, the storage and retrieval system 100 may also include robot or bot transfer stations (not shown) that may provide an interface between the autonomous guided vehicles 110 and the lift module(s) 150A, 150B. The storage structure 130 may include multiple levels of storage rack modules where each storage structure level 130L of the storage structure 130 includes respective picking aisles 130A, and transfer decks 130B for transferring case units between any of the storage areas of the storage structure 130 and a shelf of the lift module(s) 150A, 150B. The picking aisles 130A are in one aspect configured to provide guided travel of the autonomous guided vehicles 110 (such as along rails 130AR) while in other aspects the picking aisles are configured to provide unrestrained travel of the autonomous guided vehicle 110 (e.g., the picking aisles are open and undeterministic with respect to autonomous guided vehicle 110 guidance/travel). The transfer decks 130B have open and undeterministic bot support travel surfaces along which the autonomous guided vehicles 110 travel under guidance and control provided by any suitable bot steering. In one or more aspects, the transfer decks 130B have multiple lanes between which the autonomous guided vehicles 110 freely transition for accessing the picking aisles 130A and/or lift modules 150A, 150B. As used herein, "open and undeterministic" denotes the travel surface of the picking aisle and/or the transfer deck has no mechanical restraints (such as guide rails) that delimit the travel of the autonomous guided vehicle 110 to any given path along the travel surface.

The picking aisles 130A, and transfer decks 130B also allow the autonomous guided vehicles 110 to place case units CU into picking stock and to retrieve ordered case units CU (and define the different positions where the bot performs autonomous tasks, though any number of locations in the storage structure (e.g., decks, aisles, storage racks, etc.) can be one or more of the different positions). In alternate aspects, each level may also include respective transfer stations 140 that provide for an indirect case transfer between the autonomous guided vehicles 110 and the lift modules 150A, 150B. The autonomous guided vehicles 110 may be configured to place case units, such as the above described retail merchandise, into picking stock in the one or more storage structure levels 130L of the storage structure 130 and then selectively retrieve ordered case units for shipping the ordered case units to, for example, a store or other suitable location. The in-feed transfer stations 170 and out-feed transfer stations 160 may operate together with their respective lift module(s) 150A, 150B for bi-directionally transferring case units CU to and from one or more storage structure levels 130L of the storage structure 130. It is noted that while the lift modules 150A, 150B may be described as being dedicated inbound lift modules 150A and outbound lift modules 150B, in alternate aspects each of the lift modules 150A, 150B may be used for both inbound and outbound transfer of case units from the storage and retrieval system 100.

As may be realized, the storage and retrieval system 100 may include multiple in-feed and out-feed lift modules 150A, 150B that are accessible (e.g., indirectly through transfer stations 140 or through transfer of cases directly between the lift module 150A, 150B and the autonomous guided vehicle 110) by, for example, autonomous guided vehicles 110 of the storage and retrieval system 100 so that one or more case unit(s), uncontained (e.g., case unit(s) are not held in trays), or contained (within a tray or tote) can be transferred from a lift module 150A, 150B to each storage space on a respective level and from each storage space to any one of the lift modules 150A, 150B on a respective level. The autonomous guided vehicles 110 may be configured to transfer the cases CU (also referred to herein as case units) between the storage spaces 130S (e.g., located in the picking aisles 130A or other suitable storage space/case unit buffer disposed along the transfer deck 130B) and the lift modules 150A, 150B. Generally, the lift modules 150A, 150B include at least one movable payload support that may move the case unit(s) between the in-feed and out-feed transfer stations 160, 170 and the respective level of the storage space where the case unit(s) is stored and retrieved. The lift module(s) may have any suitable configuration, such as for example reciprocating lift, or any other suitable configuration. The lift module(s) 150A, 150B include any suitable controller (such as control server 120 or other suitable controller coupled to control server 120, warehouse management system 2500, and/or palletizer controller 164, 164') and may form a sequencer or sorter in a manner similar to that described in U.S. patent application Ser. No. 16/444,592 filed on Jun. 18, 2019 and titled "Vertical Sequencer for Product Order Fulfillment" (the disclosure of which is incorporated herein by reference in its entirety).

The automated storage and retrieval system 100 may include a control system, comprising for example one or more control servers 120 that are communicably connected to the in-feed and out-feed conveyors and transfer stations 170, 160, the lift modules 150A, 150B, and the autonomous guided vehicles 110 via a suitable communication and control network 180. The communication and control network 180 may have any suitable architecture which, for example, may incorporate various programmable logic controllers (PLC) such as for commanding the operations of the in-feed and out-feed conveyors and transfer stations 170, 160, the lift modules 150A, 150B, and other suitable system automation. The control server 120 may include high level programming that effects a case management system (CMS) managing the case flow system. The network 180 may further include suitable communication for effecting a bi-directional interface with the autonomous guided vehicles 110. For example, the autonomous guided vehicles 110 may include an on-board processor/controller 122. The network 180 may include a suitable bi-directional communication suite enabling the autonomous guided vehicle controller 122 to request or receive commands from the control server 120 for effecting desired transport (e.g. placing into storage locations or retrieving from storage locations) of case units and to send desired autonomous guided vehicle 110 information and data including autonomous guided vehicle 110 ephemeris, status and other desired data, to the control server 120. As seen in FIGS. 1A and 1B, the control server 120 may be further connected to a warehouse management system 2500 for providing, for example, inventory management, and customer order fulfillment information to the CMS level program of control server 120. As noted before, the control server 120, and/or the warehouse management system 2500 allow for a degree of collaborative control, at least of bots 110, via a user interface UI, as will be further described below. A suitable example of an automated storage and retrieval system arranged for holding and storing case units is described in U.S. Pat. No. 9,096,375, issued on Aug. 4, 2015 the disclosure of which is incorporated by reference herein in its entirety.

Referring now to FIGS. 1A, 1B, and 2, the autonomous guided vehicle 110 includes a frame 200 with an integral payload support or bed 210B (also referred to herein as a payload hold). The frame 200 has a front end 200E1 and a back end 200E2 that define a longitudinal axis LAX of the autonomous guided vehicle 110. The frame 200 may be constructed of any suitable material (e.g., steel, aluminum, composites, etc.) and includes a case handling assembly 210 configured to handle cases/payloads transported by the autonomous guided vehicle 110. The case handling assembly 210 includes any suitable payload bed 210B (also referred to herein as a payload bay or payload hold) on which payloads are placed for transport and/or any suitable transfer arm 210A (also referred to herein as a payload handler) connected to the frame. The transfer arm 210A is configured to (autonomously) transfer a payload (such as a case unit CU), with a flat undeterministic seating surface seated in the payload bed 210B, to and from the payload bed 210B of the autonomous guided vehicle 110 and a storage location (such as storage space 130S on a storage shelf 555 (see FIG. 2), a shelf of lift module 150A, 150B, buffer, transfer station, and/or any other suitable storage location), of the payload CU, in a storage array SA, where the storage location 130S, in the storage array SA, is separate and distinct from the transfer arm 210A and the payload bed 210B. The transfer arm 210A is configured to extend laterally in direction LAT and/or vertically in direction VER to transport payloads to and from the payload bed 210B. Examples of suitable payload beds 210B and transfer arms 210A and/or autonomous guided vehicles to which the aspects of the disclosed embodiment may be applied can be found in U.S. patent Ser. No. 11/078,017 issued on Aug. 3, 2021 and titled “Automated Bot with Transfer Arm”; U.S. Pat. No. 7,591,630 issued on Sep. 22, 2009 titled “Materials-Handling System Using Autonomous Transfer and Transport Vehicles”; U.S. Pat. No. 7,991,505 issued on Aug. 2, 2011 titled “Materials-Handling System Using Autonomous Transfer and Transport Vehicles”; U.S. Pat. No. 9,561,905 issued on Feb. 7, 2017 titled “Autonomous Transport Vehicle”; U.S. Pat. No. 9,082,112 issued on Jul. 14, 2015 titled “Autonomous Transport Vehicle Charging System”; U.S. Pat. No. 9,850,079 issued on Dec. 26, 2017 titled “Storage and Retrieval System Transport Vehicle”; U.S. Pat. No. 9,187,244 issued on Nov. 17, 2015 titled “Bot Payload Alignment and Sensing”; U.S. Pat. No. 9,499,338 issued on Nov. 22, 2016 titled “Automated Bot Transfer Arm Drive System”; U.S. Pat. No. 8,965,619 issued on Feb. 24, 2015 titled “Bot Having High Speed Stability”; U.S. Pat. No. 9,008,884 issued on Apr. 14, 2015 titled “Bot Position Sensing”; U.S. Pat. No. 8,425,173 issued on Apr. 23, 2013 titled “Autonomous Transports for Storage and Retrieval Systems”; and U.S. Pat. No. 8,696,010 issued on Apr. 15, 2014 titled “Suspension System for Autonomous Transports”, the disclosures of which are incorporated herein by reference in their entireties.

The frame 200 includes one or more idler wheels or casters 250 disposed adjacent the front end 200E1. Suitable examples of casters can be found in U.S. patent application Ser. No. 17/664,948 titled “Autonomous Transport Vehicle with Synergistic Vehicle Dynamic Response” filed on May 25, 2022 ( ) and U.S. patent application Ser. No. 17/664,838 titled “Autonomous Transport Vehicle with Steering” filed on May 26, 2021, the disclosures of which are incorporated herein by reference in their entireties. The frame 200 also includes one or more drive wheels 260 disposed adjacent the back end 200E2. In other aspects, the position of the casters 250 and drive wheels 260 may be reversed (e.g., the drive wheels 260 are disposed at the front end 200E1 and the casters 250 are disposed at the back end 200E2). It is noted that in some aspects, the autonomous guided vehicle 110 is configured to travel with the front end 200E1 leading the direction of travel or with the back end 200E2 leading the direction of travel. In one aspect, casters 250A, 250B (which are substantially similar to caster 250 described herein) are located at respective front corners of the frame 200 at the front end 200E1 and drive wheels 260A, 260B (which are substantially similar to drive wheel 260 described herein) are located at respective back corners of the frame 200 at the back end 200E2 (e.g., a support wheel is located at each of the four corners of the frame 200) so that the autonomous guided vehicle 110 stably traverses the transfer deck(s) 130B and picking aisles 130A of the storage structure 130.

The autonomous guided vehicle 110 includes a drive section 261D, connected to the frame 200, with drive wheels 260 supporting the autonomous guided vehicle 110 on a traverse/rolling surface 284, where the drive wheels 260 effect vehicle traverse on the traverse surface 284 moving the autonomous guided vehicle 110 over the traverse surface 284 in a facility (e.g., such as a warehouse, store, etc.). The drive section 261D has at least a pair of traction drive wheels 260 (also referred to as drive wheels 260—see drive wheels 260A, 260B) astride the drive section 261D. The drive wheels 260 have a fully independent suspension 280 coupling each drive wheel 260A, 260B of the at least pair of drive wheels 260 to the frame 200 and configured to maintain a substantially steady state traction contact patch between the at least one drive wheel 260A, 260B and rolling/travel surface 284 (also referred to as autonomous vehicle travel surface 284) over rolling surface transients (e.g., bumps, surface transitions, etc.) Suitable examples of the fully independent suspension 280 can be found in U.S. patent application Ser. No. 17/664,948 titled “Autonomous Transport Vehicle with Synergistic Vehicle Dynamic Response” filed on May 25, 2022, the disclosure of which was previously incorporated herein by reference in its entirety.

The autonomous guided vehicle 110 includes a physical characteristic sensor system 270 (also referred to as an autonomous navigation operation sensor system) connected to the frame 200. The physical characteristic sensor system 270 has electro-magnetic sensors. Each of the electro-magnetic sensors is responsive to interaction or interface of a sensor emitted or generated electro-magnetic beam or field with a physical characteristic (e.g., of the storage structure or a transient object such as a case unit CU, debris, etc.), where the electro-magnetic beam or field is disturbed by interaction or interface with the physical characteristic. The disturbance in the electro-magnetic beam is detected by and effects sensing by the electro-magnetic sensor of the physical characteristic, wherein the physical characteristic sensor system 270 is configured to generate sensor data embodying at least one of a vehicle navigation pose or location (relative to the storage and retrieval system or facility in which the autonomous guided vehicle 110 operates) information and payload pose or location (relative to a storage location 130S or the payload bed 210B) information.

The physical characteristic sensor system 270 includes, for exemplary purposes only, one or more of laser sensor(s) 271, ultrasonic sensor(s) 272, bar code scanner(s) 273, position sensor(s) 274, line sensor(s) 275, case sensors 278 (e.g., for sensing case units within the payload bed 210B onboard the vehicle 110 or on a storage shelf off-board the vehicle 110), arm proximity sensor(s) 277, vehicle proximity sensor(s) 278 or any other suitable sensors for sensing a position of the vehicle 110 or a payload (e.g., case unit CU). In some aspects, supplemental navigation sensor system 288 may form a portion of the physical characteristic sensor system 270. Suitable examples of sensors that may be included in the physical characteristic sensor system 270 are described in U.S. Pat. No. 8,425,173 titled “Autonomous Transport for Storage and Retrieval Systems” issued on Apr. 23, 2013, 9,008,884 titled “Bot Position Sensing” issued on Apr. 14, 2015, and 9,946,265 titled Bot Having High Speed Stability" issued on Apr. 17, 2018, the disclosures of which are incorporated herein by reference in their entireties.

The sensors of the physical characteristic sensor system 270 may be configured to provide the autonomous guided vehicle 110 with, for example, awareness of its environment and external objects, as well as the monitor and control of internal subsystems. For example, the sensors may provide guidance information, payload information or any other suitable information for use in operation of the autonomous guided vehicle 110.

The bar code scanner(s) 273 may be mounted on the autonomous guided vehicle 110 in any suitable location. The bar code scanners(s) 273 may be configured to provide an absolute location of the autonomous guided vehicle 110 within the storage structure 130. The bar code scanner(s) 273 may be configured to verify aisle references and locations on the transfer decks by, for example, reading bar codes located on, for example the transfer decks, picking aisles and transfer station floors to verify a location of the autonomous guided vehicle 110. The bar code scanner(s) 273 may also be configured to read bar codes located on items stored in the shelves 555.

The position sensors 274 may be mounted to the autonomous guided vehicle 110 at any suitable location. The position sensors 274 may be configured to detect reference datum features (or count the slats 520L of the storage shelves 555) (e.g. see FIG. 5A) for determining a location of the vehicle 110 with respect to the shelving of, for example, the picking aisles 130A (or a buffer/transfer station located adjacent the transfer deck 130B or lift 150). The reference datum information may be used by the controller 122 to, for example, correct the vehicle's odometry and allow the autonomous guided vehicle 110 to stop with the support tines 210AT of the transfer arm 210A positioned for insertion into the spaces between the slats 520L (see, e.g., FIG. 5A). In one exemplary embodiment, the vehicle 110 may include position sensors 274 on the drive (rear) end 200E2 and the driven (front) end 200E1 of the autonomous guided vehicle 110 to allow for reference datum detection regardless of which end of the autonomous guided vehicle 110 is facing the direction the autonomous guided vehicle 110 is travelling.

The line sensors 275 may be any suitable sensors mounted to the autonomous guided vehicle 110 in any suitable location, such as for exemplary purposes only, on the frame 200 disposed adjacent the drive (rear) and driven (front) ends 200E2, 200E1 of the autonomous guided vehicle 110. For exemplary purposes only, the line sensors 275 may be diffuse infrared sensors. The line sensors 275 may be configured to detect guidance lines 900 (see FIG. 1B) provided on, for example, the floor of the transfer decks 130B. The autonomous guided vehicle 110 may be configured to follow the guidance lines when travelling on the transfer decks 130B and defining ends of turns when the vehicle is transitioning on or off the transfer decks 130B. The line sensors 275 may also allow the vehicle 110 to detect index references for determining absolute localization where the index references are generated by crossed guidance lines 119 (see FIG. 1B).

The case sensors 276 may include case overhang sensors and/or other suitable sensors configured to detect the location/pose of a case unit CU within the payload bed 210B. The case sensors 276 may be any suitable sensors that are positioned on the vehicle so that the sensor(s) field of view(s) span the payload bed 210B adjacent the top surface of the support tines 210AT (see FIGS. 3A and 3B). The case sensors 276 may be disposed at the edge of the payload bed 210B (e.g., adjacent a transport opening 1199 of the payload bed 210B to detect any case units CU that are at least partially extending outside of the payload bed 210B.

The arm proximity sensors 277 may be mounted to the autonomous guided vehicle 110 in any suitable location, such as for example, on the transfer arm 210A. The arm proximity sensors 277 may be configured to sense objects around the transfer arm 210A and/or support tines 210AT of the transfer arm 210A as the transfer arm 210A is raised/lowered and/or as the support tines 210AT are extended/retracted.

The laser sensors 271 and ultrasonic sensors 272 may be configured to allow the autonomous guided vehicle 110 to locate itself relative to each case unit forming the load carried by the autonomous guided vehicle 110 before the case units are picked from, for example, the storage shelves 555 and/or lift 150 (or any other location suitable for retrieving payload). The laser sensors 271 and ultrasonic sensors 272 may also allow the vehicle to locate itself relative to empty storage locations 130S for placing case units in those empty storage locations 130S. The laser sensors 271 and ultrasonic sensors 272 may also allow the autonomous guided vehicle 110 to confirm that a storage space (or other load depositing location) is empty before the payload carried by the autonomous guided vehicle 110 is deposited in, for example, the storage space 130S. In one example, the laser sensor 271 may be mounted to the autonomous guided vehicle 110 at a suitable location for detecting edges of items to be transferred to (or from) the autonomous guided vehicle 110. The laser sensor 271 may work in conjunction with, for example, retro-reflective tape (or other suitable reflective surface, coating or material) located at, for example, the back of the shelves 555 to enable the sensor to "see" all the way to the back of the storage shelves 555. The reflective tape located at the back of the storage shelves allows the laser sensor 1715 to be substantially unaffected by the color, reflectiveness, roundness, or other suitable characteristics of the items located on the shelves 555. The ultrasonic sensor 272 may be configured to measure a distance from the autonomous guided vehicle 110 to the first item in a predetermined storage area of the shelves 555 to allow the autonomous guided vehicle 110 to determine the picking depth (e.g. the distance the support tines 210AT travel into the shelves 555 for picking the item(s) off of the shelves 555). One or more of the laser sensors 271 and ultrasonic sensors 272 may allow for detection of case orientation (e.g. skewing of cases within the storage shelves 555) by, for example, measuring the distance between the autonomous guided vehicle 110 and a front surface of the case units to be picked as the autonomous guided vehicle 110 comes to a stop adjacent the case units to be picked. The case sensors may allow verification of placement of a case unit on, for example, a storage shelf 555 by, for example, scanning the case unit after it is placed on the shelf.

Vehicle proximity sensors 278 may also be disposed on the frame 200 for determining the location of the autonomous guided vehicle 110 in the picking aisle 130A and/or relative to lifts 150. The vehicle proximity sensors 278 are located on the autonomous guided vehicle 110 so as to sense targets or position determining features disposed on rails 130AR on which the vehicle 110 travels through the picking aisles 130A (and/or on walls of transfer areas 195 and/or lift 150 access location). The position of the targets on the rails 130AR are in known locations so as to form incremental or absolute encoders along the rails 130AR. The vehicle proximity sensors 278 sense the targets and provide sensor data to the controller 122 so that the controller 122 determines the position of the autonomous guided vehicle 110 along the picking aisle 130A based on the sensed targets.

The sensors of the physical characteristic sensing system 270 are communicably coupled to the controller 122 of the autonomous guided vehicle 110. As described herein, the controller 122 is operably connected to the drive section 261D and/or the transfer arm 210A. The controller 122 is configured to determine from the information of the physical characteristic sensor system 270 vehicle pose and location (e.g., in up to six degrees of freedom, X, Y, Z, Rx, Ry, Rz) effecting independent guidance of the autonomous guided vehicle 110 traversing the storage and retrieval facility/system 100. The controller 122 is also configured to determine from the information of the physical characteristic sensor system 270 payload (e.g., case unit CU) pose and location (onboard or off-board the autonomous guided vehicle 110) effecting independent underpick (e.g., lifting of the case unit CU from underneath the case unit CU) and place of the payload CU to and from a storage location 130S and independent underpick and place of the payload CU in the payload bed 210B.

Referring to FIGS. 1A, 1B, 2, 3A, and 3B, as described above, the autonomous guided vehicle 110 includes a supplemental or auxiliary navigation sensor system 288, connected to the frame 200. The supplemental navigation sensor system 288 supplements the physical characteristic sensor system 270. The supplemental navigation sensor system 288 is, at least in part, a vision system 400 with cameras disposed to capture image data informing the at least one of a vehicle navigation pose or location (relative to the storage and retrieval system structure or facility in which the vehicle 110 operates) and payload pose or location (relative to the storage locations or payload bed 210B) that supplements the information of the physical characteristic sensor system 270. It is noted that the term "camera" described herein is a still imaging or video imaging device that includes one or more of a two-dimensional camera, a two dimensional camera with RGB (red, green, blue) pixels, a three-dimensional camera with XYZ+A definition (where XYZ is the three-dimensional reference frame of the camera and A is one of a radar return strength, a time of flight stamp, or other distance determination stamp/indicator), and an RGB/XYZ camera which includes both RGB and three-dimensional coordinate system information, non-limiting examples of which are provided herein.

Referring to FIGS. 2, 3A, and 3B, the vision system 400 includes one or more of the following: case unit monitoring cameras 410A, 410B, forward navigation cameras 420A, 420B, rearward navigation cameras 430A, 430B, one or more three-dimensional imaging system 440A, 440B, one or more case edge detection sensors 450A, 450B, one or more traffic monitoring camera 460A, 460B, and one or more out of plane (e.g., upward or downward facing) localization cameras 477A, 477B (noting the downward facing cameras may supplement the line following sensors 275 of the physical characteristic sensor system 270 and provide a broader field of view than the line following sensors 275 so as to effect guidance/traverse of the vehicle 110 to place the guide lines 900 (see FIG. 1B) back within the field of view of the line following sensors 275 in the event the vehicle path strays from the guide line 900 removing the guide line 900 from the line following sensor 275 field of view). Images (static images and/or dynamic video images) from the different vision system 400 cameras are requested from the vision system controller 122VC by the controller 122 as desired for any given autonomous guided vehicle 110 task. For example, images are obtained by the controller 122 from at least one or more of the forward and rearward navigation cameras 420A, 420B, 430A, 430B to effect navigation of the autonomous guided vehicle 110 along the transfer deck 130B and picking aisles 130A.

The forward navigation cameras 420A, 420B may be paired to form a stereo camera system and the rearward navigation cameras 430A, 430B may be paired to form another stereo camera system. Referring to FIGS. 2 and 3A, the forward navigation cameras 420A, 420B, are any suitable cameras configured to provide object detection and ranging. The forward navigation cameras 420A, 420B may be placed on opposite sides of the longitudinal centerline LAXCL of the autonomous transport vehicle 110 and spaced apart by any suitable distance so that the forward facing fields of view 420AF, 420BF provide the autonomous transport vehicle 110 with stereo vision. The forward navigation cameras 420A, 420B are any suitable high resolution or low resolution video cameras (where video images that include more than about 480 vertical scan lines and are captured at more than about 50 frames/second are considered high resolution), time-of-flight cameras, laser ranging cameras, or any other suitable cameras configured to provide object detection and ranging for effecting autonomous vehicle traverse along the transfer deck 130B and picking aisles 130A. The rearward navigation cameras 430A, 430B may be substantially similar to the forward navigation cameras. The forward navigation cameras 420A, 420B and the rear navigation cameras 430A, 430B provide for autonomous guided vehicle 110 navigation with obstacle detection and avoidance (with either end 200E1 of the autonomous guided vehicle 110 leading a direction of travel or trailing the direction of travel) as well as localization of the autonomous transport vehicle within the storage and retrieval system 100. Localization of the autonomous guided vehicle 110 may be effected by one or more of the forward navigation cameras 420A, 420B and the rearward navigation cameras 430A, 430B by detection of guide lines on the travel/rolling surface 284 and/or by detection of suitable storage structure, including but not limited to storage rack (or other) structure. The line detection and/or storage structure detection may be compared to floor maps and structure information (e.g., stored in a memory of or accessible by) of the vision system controller 122VC. The forward navigation cameras 420A, 420B and the rearward navigation cameras 430A, 430B may also send signal to the controller 122 (inclusive of or through the vision system controller 122VC) so that as objects approach the autonomous transport vehicle 110 (with the autonomous transport vehicle 110 stopped or in motion) the autonomous transport vehicle 110 may be maneuvered (e.g., on the undeterministic rolling surface of the transfer deck 130B or within the picking aisle 130A (which may have a deterministic or undeterministic rolling surface) to avoid the approaching object (e.g., another autonomous transport vehicle, case unit, or other transient object within the storage and retrieval system 100).

The forward navigation cameras 420A, 420B and the rear navigation cameras 430A, 430B may also provide for convoys of vehicles 110 along the picking aisles 130A or transfer deck 130B, where one vehicle 110 follows another vehicle 110A at predetermined fixed distances. As an example, FIG. 1B illustrates a three vehicle 110 convoy where one vehicle closely follows another vehicle at the predetermined fixed distance.

As another example, the controller 122 may obtain images from one or more of the three-dimensional imaging system 440A, 440B, the case edge detection sensors 450A, 450B, and the case unit monitoring cameras 410A, 410B to effect case handling by the vehicle 110. Still referring FIGS. 2 and 3A, the one or more case edge detection sensors 450A, 450B are any suitable sensors such as laser measurement sensors configured to scan the shelves of the storage and retrieval system 100 to verify the shelves are clear for placing case units CU, or to verify a case unit size and position before picking the case unit CU. While one case edge detection sensor 450A, 450B is illustrated on each side of the payload bed 210B centerline CLPB (see FIG. 3A) there may be more or less than two case edge detection sensors placed at any suitable locations on the autonomous transport vehicle 110 so that the vehicle 110 can traverse by and scan case units CU with the front end 200E1 leading a direction of vehicle travel or the rear/back end 200E2 leading the direction of vehicle travel. It is noted that case handling includes picking and placing case units from case unit holding locations (such as for case unit localization, verification of the case unit, and verification of placement of the case unit in the payload bed 210B and/or at a case unit holding location such as a storage shelf or buffer location).

Images from the out of plane localization cameras 477A, 477B may be obtained by the controller 122 to effect navigation of the autonomous guided vehicle 110 and/or to provide data (e.g., image data) supplemental to localization/navigation data from the one or more of the forward and rearward navigation cameras 420A, 420B, 430A, 430B. Images from the one or more traffic monitoring camera 460A, 460B may be obtained by the controller 122 to effect travel transitions of the autonomous guided vehicle 110 from a picking aisle 130A to the transfer deck 130B (e.g., entry to the transfer deck 130B and merging of the autonomous guided vehicle 110 with other autonomous guided vehicles travelling along the transfer deck 130B).

The one or more out of plane (e.g., upward or downward facing) localization cameras 477A, 477B are disposed on the frame 200 of the autonomous transport vehicle 110 so as to sense/detect location fiducials (e.g., location marks (such as barcodes, etc.), lines 900 (see FIG. 1B), etc.) disposed on a ceiling of the storage and retrieval system or on the rolling surface 284 of the storage and retrieval system. The location fiducials have known locations within the storage and retrieval system and may provide unique identification marks/patterns that are recognized by the vision system controller 122VC (e.g., processing data obtained from the localization cameras 477A, 477B). Based on the location fiducial detected, the vision system controller 122VC compares the detected location fiducial to known location fiducials (e.g., store in a memory of or accessible to the vision system controller 122VC) to determine a location of the autonomous transport vehicle 110 within the storage structure 130.

The one or more traffic monitoring cameras 460A, 460B are disposed on the frame 200 so that a respective field of view 460AF, 460BF faces laterally in lateral direction LAT1. While the one or more traffic monitoring cameras 460A, 460B are illustrated as being adjacent a transfer opening 1199 of the transfer bed 210B (e.g., on the pick side from which the arm 210A of the autonomous transport vehicle 110 extends), in other aspects there may be traffic monitoring cameras disposed on the non-pick side of the frame 200 so that a field of view of the traffic monitoring cameras faces laterally in direction LAT2. The traffic monitoring cameras 460A, 460B provide for an autonomous merging of autonomous transport vehicles 110 exiting, for example, a picking aisle 130A or lift transfer area 195 onto the transfer deck 130B (see FIG. 1B). For example, the autonomous transport vehicle 110V leaving the lift transfer area 195 (FIG. 1B) detects autonomous transport vehicle 110T travelling along the transfer deck 130B. Here, the controller 122 autonomously strategizes merging (e.g., entering the transfer deck in front of or behind the autonomous guided vehicle 110T, acceleration onto the transfer deck based on a speed of the approaching vehicle 110T, etc.) on to the transfer deck based on information (e.g., distance, speed, etc.) of the autonomous guided vehicle 110T gathered by the traffic monitoring cameras 460A, 460B and communicated to and processed by the vision system controller 122VC.

The case unit monitoring cameras 410A, 410B are any suitable high resolution or low resolution video cameras (where video images that include more than about 480 vertical scan lines and are captured at more than about 50 frames/second are considered high resolution). The case unit monitoring cameras 410A, 410B are arranged relative to each other to form a stereo vision camera system that is configured to monitor case unit CU ingress to and egress from the payload bed 210B. The case unit monitoring cameras 410A, 410B are coupled to the frame 200 in any suitable manner and are focused at least on the payload bed 210B. In one or more aspects, the case unit monitoring cameras 410A, 410B are coupled to the transfer arm 210A so as move in direction LAT with the transfer arm 210A (such as when picking and placing case units CU) and are positioned so as to be focused on the payload bed 210B and support tines 210AT of the transfer arm 210A.

Referring also to FIG. 5A, the case unit monitoring cameras 410A, 410B effect at least in part one or more of case unit determination, case unit localization, case unit position verification, and verification of the case unit justification features (e.g., justification blades 471 and pushers 470) and case transfer features (e.g., tines 210AT, pullers 472, and payload bed floor 473). For example, the case unit monitoring cameras 410A, 410B detect one or more of case unit length CL, CL1, CL2, CL3, a case unit height CH1, CH2, CH3, and a case unit yaw YW (e.g., relative to the transfer arm 210A extension/retraction direction LAT). The data from the case handling sensors (e.g., noted above) may also provide the location/positions of the pushers 470, pullers 472, and justification blades 471, such as where the payload bed 210B is empty (e.g., not holding a case unit).

The case unit monitoring cameras 410A, 410B are also configured to effect, with the vision system controller 122VC, a determination of a front face case center point FFCP (e.g., in the X, Y, and Z directions with the case units disposed on a shelf or other holding area off-board the vehicle 110) relative to a reference location of the autonomous guided vehicle 110. The reference location of the autonomous guided vehicle 110 may be defined by one or more justification surfaces of the payload bed 210B or the centerline CLPB of the payload bed 210B. For example, the front face case center point FFCP may be determined along the longitudinal axis LAX (e.g. in the Y direction) relative to a centerline CLPB of the payload bed 210B (FIG. 3A). The front face case center point FFCP may be determined along the vertical axis VER (e.g. in the Z direction) relative to a case unit support plane PSP of the payload bed 210B (FIGS. 3A and 3B—formed by one or more of the tines 210AT of the transfer arm 210A and the payload bed floor 473). The front face case center point FFCP may be determined along the lateral axis LAT (e.g. in the X direction) relative to a justification plane surface JPP of the pushers 470 (FIG. 3B). Determination of the front face case center point FFCP of the case units CU located on a storage shelf 555 (see FIGS. 3A and 4A) or other case unit holding location provides, as non-limiting examples, for localization of the autonomous guided vehicle 110 relative to case units CU to be picked, mapping locations of case units within the storage structure (e.g., such as in a manner similar to that described in U.S. Pat. No. 9,242,800 issued on Jan. 26, 2016 titled "Storage and retrieval system case unit detection", the disclosure of which is incorporated herein by reference in its entirety), and/or pick and place accuracy relative to other case units on the storage shelf 555 (e.g., so as to maintain predetermined gap sizes between case units. The determination of the front face case center point FFCP also effects a comparison of the "real world" environment in which the autonomous guided vehicle 110 is operating with a virtual model 400VM of that operating environment so that controller 122 of the autonomous guided vehicle 110 compares what is "sees" with the vision system 400 substantially directly with what the autonomous guided vehicle 110 expects to "see" based on the simulation of the storage and retrieval system structure in a manner similar to that described in U.S. patent application Ser. No. 17/804,026 filed on May 25, 2022 and titled "Autonomous Transport Vehicle with Vision System", the disclosure of which is incorporated herein by reference in its entirety. Moreover, in one aspect, illustrated in FIG. 5A, the object (case unit) and characteristics determined by the vision system controller 122VC are coapted (combined, overlaid) to the virtual model 400VM enhancing resolution, in up to six degrees of freedom resolution, of the object pose with respect to a facility or global reference frame GREF (see FIG. 2). As may be realized, registration of the cameras of the vision system 400 with the global reference frame GREF allows for enhanced resolution of vehicle 110 pose and/or location with respect to both a global reference (facility features rendered in the virtual model 400VM) and the imaged object. More particularly, object position discrepancies or anomalies apparent and identified upon coapting the object image and virtual model 400VM (e.g., edge spacing between case unit fiducial edges or case unit inclination or skew, with respect to the rack slats 520L of the virtual model 400VM), if greater than a predetermined nominal threshold, describe an errant pose of one or more of case, rack, and/or vehicle 110. Discrimination as to whether errancy is with the pose/location of the case, rack or vehicle 110, one or more is determined via comparison with pose data from sensors 270 and supplemental navigation sensor system 288.

As an example of the above-noted enhanced resolution, if one case unit disposed on a shelf that is imaged by the vision system 400 is turned compared to juxtaposed case units on the same shelf (also imaged by the vision system) and to the virtual model 400VM the vision system 400 may determine the one case is skewed and provide the enhanced case position information to the controller 122 for operating the transfer arm 210A and positioning the transfer arm 210A so as to pick the one case based on the enhanced resolution of the case pose and location. As another example, if the edge of a case is offset from a slat 520L (see FIG. 4A-4C) edge by more than a predetermined threshold the vision system 400 may generate a position error for the case; noting that if the offset is within the threshold, the supplemental information from the supplemental navigation sensor system 288 enhances the pose/location resolution (e.g., an offset substantially equal to the determined pose/location of the case with respect to the slat 520L and vehicle 110 payload bed 210B transfer arm 210A frame. It is further noted that if only one case is skewed/offset relative to the slat 520L edges the vision system may generate the case position error; however, if two or more juxtaposed cases are determined to be skewed relative to the slat 520L edges the vision system may generate a vehicle 110 pose error and effect repositioning of the vehicle 110 (e.g., correct the position of the vehicle 110 based on an offset determined from the supplemental navigation sensor system 288 supplemental information) or a service message to an operator (e.g., where the vision system 400 effects a "dashboard camera" collaborative mode (as described herein) that provides for remote control of the vehicle 110 by an operator with images (still and/or real time video) from the vision system being conveyed to the operator to effect the remote control operation). The vehicle 110 may be stopped (e.g., does not traverse the picking aisle 130A or transfer deck 130B) until the operator initiates remote control of the vehicle 110.

The case unit monitoring cameras 410A, 410B may also provide feedback with respect to the positions of the case unit justification features and case transfer features of the autonomous guided vehicle 110 prior to and/or after picking/placing a case unit from, for example, a storage shelf or other holding locations (e.g., for verifying the locations/positions of the justification features and the case transfer features so as to effect pick/place of the case unit with the transfer arm 210A without transfer arm obstruction). For example, as noted above, the case unit monitoring cameras 410A, 410B have a field of view that encompasses the payload bed 210B. The vision system controller 122VC is configured to receive sensor data from the case unit monitoring cameras 410A, 410B and determine, with any suitable image recognition algorithms stored in a memory of or accessible by the vision system controller 122VC, positions of the pushers 470, justification blades 471, pullers 472, tines 210AT, and/or any other features of the payload bed 210B that engage a case unit held on the payload bed 210B. The positions of the pushers 470, justification blades 471, pullers 472, tines 210AT, and/or any other features of the payload bed 210B may be employed by the controller 122 to verify a respective position of the pushers 470, justification blades 471, pullers 472, tines 210AT, and/or any other features of the payload bed 210B as determined by motor encoders or other respective position sensors; while in some aspects the positions determined by the vision system controller 122VC may be employed as a redundancy in the event of encoder/position sensor malfunction.

The justification position of the case unit CU within the payload bed 210B may also be verified by the case unit monitoring cameras 410A, 410B. For example, referring also to FIG. 3C, the vision system controller 122VC is configured to receive sensor data from the case unit monitoring cameras 410A, 410B and determine, with any suitable image recognition algorithms stored in a memory of or accessible by the vision system controller 122VC, a position of the case unit in the X, Y, Z directions relative to, for example, one or more of the centerline CLPB of the payload bed 210B, a reference/home position of the justification plane surface JPP (FIG. 3B) of the pushers 470, and the case unit support plane PSP (FIGS. 3A and 3B). Here, position determination of the case unit CU within the payload bed 210B effects at least place accuracy relative to other case units on the storage shelf 555 (e.g., so as to maintain predetermined gap sizes between case units.

Referring to FIGS. 2, 3A, 3B, and 5, the one or more three-dimensional imaging system 440A, 440B includes any suitable three-dimensional imager(s) including but not limited to, e.g., time-of-flight cameras, imaging radar systems, light detection and ranging (LIDAR), etc. The one or more three-dimensional imaging system 440A, 440B provides for enhanced autonomous guided vehicle 110 localization with respect to, for example, a global reference frame GREF (see FIG. 2) of the storage and retrieval system 100. For example, the one or more three-dimensional imaging system 440A, 440B may effect, with the vision system controller 122VC, a determination of a size (e.g., height and width) of the front face (i.e., the front face surface) of a case unit CU and front face case center point FFCP (e.g., in the X, Y, and Z directions) relative to a reference location of the autonomous guided vehicle 110 and invariant of a shelf supporting the case unit CU (e.g., the one or more three-dimensional imaging system 440A, 440B effects case unit CU location (which location of the case units CU within the automated storage and retrieval system 100 is defined in the global reference frame GREF) without reference to the shelf supporting the case unit CU and effects a determination as to whether the case unit is supported on a shelf through a determination of a shelf invariant characteristic of the case units). Here, the determination of the front face surface and case center point FFCP also effects a comparison of the "real world" environment in which the autonomous guided vehicle 110 is operating with the virtual model 400VM so that controller 122 of the autonomous guided vehicle 110 compares what is "sees" with the vision system 400 substantially directly with what the autonomous guided vehicle 110 expects to "see" based on the simulation of the storage and retrieval system structure as described in U.S. patent application Ser. No. 17/804,026 filed on May 25, 2022 and titled "Autonomous Transport Vehicle with Vision System", the disclosure of which was previously incorporated herein by reference in its entirety. The image data obtained from the one or more three-dimensional imaging system 440A, 440B may supplement and/or enhance the image data from the cameras 410A, 410B in the event data from the cameras 410A, 410B is incomplete or missing. Here, the object detection and localization with respect to autonomous guided vehicle 110 pose within the global reference frame GREF may be determined with high accuracy and confidence by the one or more three-dimensional imaging system 440A, 440B; however, in other aspects, the object detection and localization may be effected with one or more sensors of the physical characteristic sensor system 270 and/or wheel encoders/inertial sensors of the autonomous guided vehicle 110.

Figure 5:
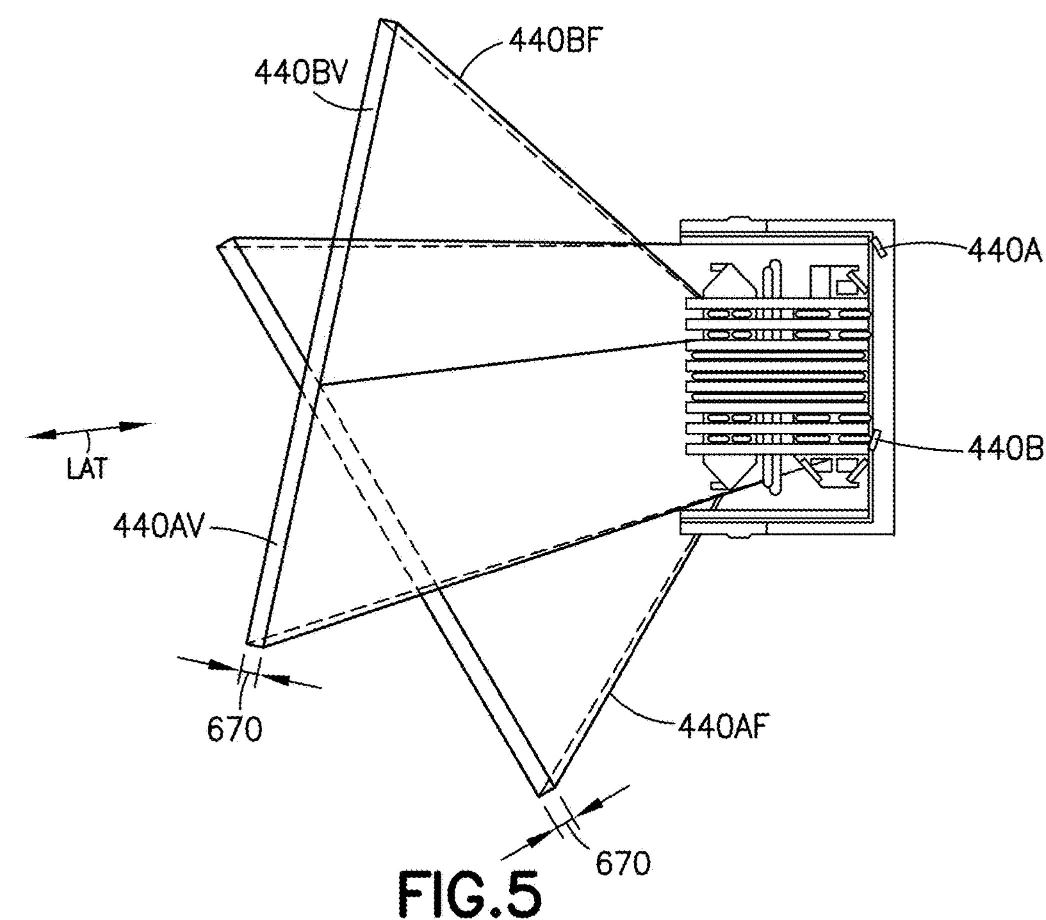
FIG. 5 is a schematic illustration of a portion of the autonomous guided vehicle of FIG. 2 in accordance with aspects of the disclosed embodiment.

As illustrated in FIG. 5, the one or more three-dimensional imaging system 440A, 440B has a respective field of view that extends past the payload bed 210B substantially in direction LAT so that each three-dimensional imaging system 440A, 440B is disposed to sense case units CU adjacent to but external of the payload bed 210B (such as case units CU arranged so as to extend in one or more rows along a length of a picking aisle 130A (see FIG. 5A) or a substrate buffer/transfer stations (similar in configuration to storage racks 599 and shelves 555 thereof disposed along the picking aisles 130A) arranged along the transfer deck 130B). The field of view 440AF, 440BF of each three-dimensional imaging system 440A, 440B encompasses a volume of space 440AV, 440BV that extends a height 670 of a pick range of the autonomous guided vehicle 110 (e.g., a range/height in direction VER—FIG. 2—in which the arm 210A can move to pick/place case units to a shelf or stacked shelves accessible from a common rolling surface 284 (e.g., of the transfer deck 130B or picking aisle 130A—see FIG. 2) on which the autonomous guided vehicle 110 rides).

The vision system 400 may also effect operational control of the autonomous transport vehicle 110 in collaboration with an operator. The vision system 400 provides data (images) and that vision system data is registered by the vision system controller 122VC that (a) determines information characteristics (in turn provided to the controller 122), or (b) information is passed to the controller 122 without being characterized (objects in predetermined criteria) and characterization is done by the controller 122. In either (a) or (b) it is the controller 122 that determines selection to switch to the collaborative state. After switching, the collaborative operation is effected by a user accessing the vision system 400 via the vision system controller 122VC and/or the controller 122 through a user interface UI (see FIG. 10). In its simplest form, however, the vision system 400 may be considered as providing a collaborative mode of operation of the autonomous transport vehicle 110. Here, the vision system 400 supplements the autonomous navigation/operation sensor system 270 to effect collaborative discriminating and mitigation of objects/hazards 299 (see FIG. 3A, where such objects/hazards includes fluids, cases, solid debris, etc.), e.g., encroaching upon the travel/rolling surface 284 as described in U.S. patent application Ser. No. 17/804,026 filed on May 25, 2022 and titled "Autonomous Transport Vehicle with Vision System", the disclosure of which was previously incorporated herein by reference in its entirety.

In one aspect, the operator may select or switch control of the autonomous guided vehicle (e.g., through the user interface UI) from automatic operation to collaborative operation (e.g., the operator remotely controls operation of the autonomous transport vehicle 110 through the user interface UI). For example, the user interface UI may include a capacitive touch pad/screen, joystick, haptic screen, or other input device that conveys kinematic directional commands (e.g., turn, acceleration, deceleration, etc.) from the user interface UI to the autonomous transport vehicle 110 to effect operator control inputs in the collaborative operational mode of the autonomous transport vehicle 110. For example, the vision system 400 provides a "dashboard camera" (or dash-camera) that transmits video and/or still images from the autonomous transport vehicle 110 to an operator (through user interface UI) to allow remote operation or monitoring of the area relative to the autonomous transport vehicle 110 in a manner similar to that described in U.S. patent application Ser. No. 17/804,026 filed on May 25, 2022 and titled "Autonomous Transport Vehicle with Vision System", the disclosure of which was previously incorporated herein by reference in its entirety.

Referring to FIG. 10, in the collaborative operational mode of the autonomous guided vehicle 110, frames from the image data stream 1000 are presented to the operator. In one or more aspects, the frames from the image data stream 1000 are augmented images (as described herein), where the image augmentation provides the operator with at least an identification of the objects within a respective frame. The user interface may provide for a frame crop object selection 1000C where a portion of a frame from the image data stream 1000 is selected for operator manipulation. The frame crop object selection 1000C may include one or more object windows 1010, 1020, 1030 where these object windows 1010, 1020, 1030 are configured to provide the operator with selections that effect object selection and display of data pertaining to a selected object. For example, an object selector 1010 may be presented to the operator with display of the frame crop selection 1000C. The object selector 1010 may include a drop down menu (or other suitable interface) that effects operator selection of objects shown in the frame crop selection 1000C (e.g., in this example, the fork and pusher/puller of the vehicle 110 as well as a case unit CU are illustrated and presented in the object selector for operator selection). With selection of an object, a bounding box may be presented around the selected object so as to identify the object in the in the frame crop selection 1000C. Selection of an object may also effect presentation of object information 1020 (e.g., which in this example the "partially" object is selected and the information presented for the "partially" object informs the operator that the "partially" object represents or otherwise identifies a partial identification of a case unit CU by the vision system controller 122VC. An action list 1030 may also be presented in the user interface UI, where the action list depends on the object selected. For example, as a case unit CU has been partially identified, the operator may instruct the autonomous guided vehicle, through the action list 1030 to pick or not pick the case unit CU. In other aspects, the user interface UI may present any suitable information regarding operation of the autonomous guided vehicle(s) 110 to an operator that effects the collaborative operation of the autonomous guided vehicle(s) 110.

Referring to FIG. 1A, as described above, the autonomous guided vehicle 110 is provided with a vision system 400 that has an architecture based on camera pairs (e.g., such as camera pairs 410A and 410B, 420A and 420B, 430A and 430B, 460A and 460B, 477A and 477B), disposed for stereo or binocular object detection and depth determination (e.g., through employment of respective disparity/depth maps from registered video frame/images captured with the respective cameras). The object detection and depth determination provides for the localization of the autonomous guided vehicle 110 relative to the object (e.g., at least case holding locations such as e.g., on shelves and/or lift, and cases to be picked); however, as noted herein, stereo vision from the camera pairs may not be always available (i.e., the stereo vision is impaired). As such, the disclosed embodiment provides the controller 122 of the autonomous guided vehicle 110 with both a computer vision object detection and localization protocol that employs the stereo vision of the vision system 400 and a machine learning detection and localization protocol. The computer vision object detection and localization protocol employs the vision system controller 120VC to determine at least one computer vision parameter discrepancy or disparity map for different features on an image frame obtained with the stereo cameras. The machine learning detection and localization protocol employs machine learning where at least one machine learning model ML and at least one artificial neural network ANN effects robust object determination and localization through monocular vision (employing one (i.e., an unimpaired) camera of a stereo camera pair) with a detection confidence commensurate with unimpaired binocular vision.

As described above, and referring also to FIG. 2, the artificial neural network ANN is included in the deep conductor module DC. The deep conductor module DC is communicably coupled to the vision controller 122VC. The deep conductor module DC (which may be referred to as a deep learning graphics processing unit) is located onboard the autonomous guided vehicle 110 and is a separate control module of controller 122. Here, a shared memory SH is located onboard the autonomous guided vehicle 110. The shared memory SH is communicably connected to the vision system 400 and the vision system controller 122VC so as to receive, from the vision system 400 (such as provided substantially in real-time via the dash-camera mode of operation, described herein, of the vision system 400 and/or as provided by a cached mode of operation where video is stored in the shared memory for on-demand retrieval), video stream data imaging of objects in the logistics space. The shared memory SH includes non-transitory image frame generation computer program code configured to generate image frames (e.g., such as those illustrated in FIGS. 9A and 9C) from the video stream data imaging, which image frames are communicated to the deep conductor module DC to effect selection of one or the computer vision (detection/localization) protocol and the machine learning (detection/localization) protocol, while in other aspects the non-transitory image frame generation computer program code is included in the deep conductor module DC. The non-transitory image frame generation computer program code may be, for example, OpenCV Mat object/image processing code or any other suitable code for generating image frames from the video stream data imaging.

In other aspects, the deep conductor module DC may be located remotely (such as at the control server 120 (see FIG. 1A) or other remotely located computer/server) from and communicably connected to the autonomous guided vehicle 110 by the network 180 using any suitable communication protocol such as, e.g., a server/client socket based application. Where the deep conductor DC is located remotely from the autonomous guided vehicle 110 the server/client socket based application is structured so that a media server MS is located onboard the autonomous guided vehicle 110. The media server MS is communicably connected to the vision system 400 and the vision system controller 122VC so as to receive, from the vision system 400 (such as provided by and substantially in real-time via the dash-camera mode of operation, described herein, of the vision system 400 and/or as provided by a cached mode of operation where video is stored in the shared memory for on-demand retrieval), video stream data imaging of objects in the logistics space. Here, the media server MS is communicably connected to the at least one camera (such as those described herein of the autonomous guided vehicle 110) and registers (in any suitable memory) the video stream data from the at least one camera. While the media server is described as interfacing with the vision system controller 122VC (e.g., the vision system controller 122VC being located onboard the autonomous guided vehicle 110), the media server MS may also interface (e.g., via the network 180) with any suitable controller (such as control server 120 or warehouse management system 2500) located remotely from the autonomous guided vehicle 110. The media server MS includes the non-transitory image frame generation computer program code so as to generate image frames (e.g., such as those illustrated in FIGS. 9A and 9C) from the video stream data imaging, which image frames are communicated to the deep conductor module DC to effect selection of one or the computer vision (detection/localization) protocol and the machine learning (detection/localization) protocol. The media server MS is configured to generate image frames in any suitable manner such as with OpenCV Mat object/image processing as described above.

Both the shared memory SH and the media server MS are configured to remove image frames that are similar to each other with the conversion of the video stream data imaging to the image frames. The removal of similar (e.g., substantially duplicate) image frames reduces image processing time of the deep conductor DC when analyzing the received image frames and reduces data transfer traffic between the shared memory SH and deep conductor DC and between the media server MS and the deep conductor DC. The shared memory SH and the media server MS, via the respective non-transitory image frame generation computer program code, are configured to employ any suitable similarity metric (e.g., a structural similarity index) that calculates the structural similarity of the image frames. A suitable example of a structural similarity index for duplicate image frame removal can be found in, for example, Z. Wang, A. C. Bovik, H. R. Sheikh, E. P. Simoncelli, "Image quality assessment: From error visibility to structural similarity," IEEE Transaction on Image Processing, Vol. 13, No. 4, pp 600-612, April 2004 (referred to herein as "Wang"), the disclosure of which is incorporated herein by reference in its entirety. This similarity metric is employed by the respective non-transitory image frame generation computer program code of the shared memory SH and media server MS to remove images that are similar based on predetermined similarity index threshold values, such as described in Wang. A predetermined similarity index threshold value is set for each camera 410A, 410B, 420A, 420B, 430A, 430B, 460A, 460B, 477A, 477B so as to generate similarity indices and remove similar images when converting video files from each respective camera to image files for each respective camera 410A, 410B, 420A, 420B, 430A, 430B, 460A, 460B, 477A, 477B.

In other aspects, the video stream data imaging is streamed, in any suitable manner (such as via the dash-camera operation), to the remotely located deep conductor module DC (located in the remotely located controller as described herein) where the deep conductor module DC includes the, e.g., OpenCV Mat object/image processing for generating the image frames.

It is noted that the autonomous guided vehicle may be provided with both the onboard shared memory SH with onboard deep conductor module DC and the media server MS with remotely located deep conductor module DC, where the media server MS and remotely located deep conductor module DC may be employed in situations where processing capabilities onboard the autonomous guided vehicle 110 and/or electrical power stored on the autonomous guided vehicle 110 is/are to be conserved or are limited. As described herein, the media server MS may also interface with the onboard shared memory SH with onboard deep conductor module DC.

Figure 6:
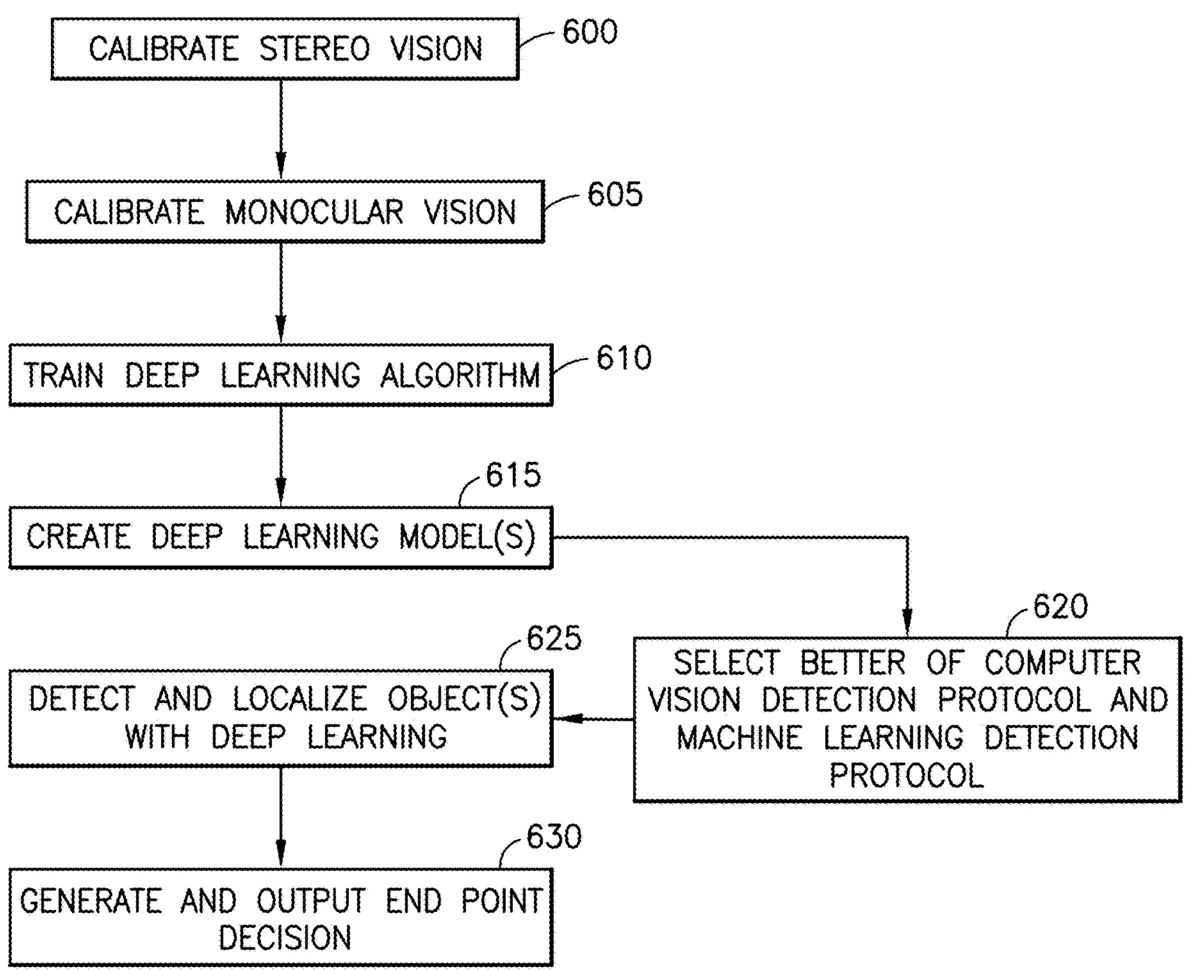
FIG. 6 is an exemplary flow diagram of a method in accordance with aspects of the disclosed embodiment.

Still referring to FIGS. 1A, 2 and 6, to obtain the video stream data imaging with the vision system 400, the stereo pairs of cameras 410A and 410B, 420A and 420B, 430A and 430B, 460A and 460B, 477A and 477B are calibrated (see FIG. 6, Block 600). The stereo pairs of cameras 410A and 410B, 420A and 420B, 430A and 430B, 460A and 460B, 477A and 477B may be calibrated in any suitable manner (such as by, e.g., an intrinsic and extrinsic camera calibration) to effect sensing of case units CU, storage structure (e.g., shelves, columns, etc.), and other structural features of the storage and retrieval system. Referring also to FIGS. 3A, 3B, 4A, 4B, and 4C, known objects (such as case units CU1, CU2, CU3 (or storage system structure) (e.g., having a known physical characteristics such as shape, size, etc.) may be placed within the field of view of a camera (or the vehicle 110 may be positioned so that the known objects are within the field of view of the camera) of the supplemental navigation sensor system 288. These known objects may be imaged by the camera from several angles/view points to calibrate each camera so that the vision system controller 122VC is configured to detect the known objects based on sensor signals from the calibrated camera.

For example, calibration of case unit monitoring cameras 410A, 410B will be described with respect to case units CU1, CU2, CU3 having known physical characteristics/parameters (noting that calibration of the other stereo camera pairs described herein may be effected in a similar manner). FIGS. 4A-4C are exemplary images captured from one of case unit monitoring cameras 410A, 410B from, for exemplary purposes, three different view points. Here, physical characteristics/parameters (e.g., shape, length, width, height, etc.) of the case units CU1, CU2, CU3 are known by the vision system controller 122VC (e.g., the physical characteristics of the different case units CU1, CU2, CU3 are stored in a memory of or accessible to the vision system controller 122VC). Based on, for example, the three (or more) different view points of the case units CU1, CU2, CU3, in the images of FIGS. 4A-4C, the vision system controller 122VC is provided with intrinsic and extrinsic camera and case unit parameters that effect calibration of the case unit monitoring camera 410A, 410B. It is noted that each camera 410A, 410B is intrinsically calibrated to its own coordinate system (i.e., each camera knows the depth of an object from the respective image sensor of the camera). Where multiple cameras 410A, 410B are employed, in one aspect, calibration of the vision system 400 includes calibration of the cameras 410A, 410B to a common base reference frame (that may be the reference frame of a single camera or any other suitable base frame of reference to which each camera 410A, 410B, 420A, 420B, 430A, 430B, 460A, 460B, 477A, 477B may be related to so as to form the common base reference frame collectively for all cameras of the vision system) and calibration of the common base reference frame to the robot reference frame. Calibration of the cameras 410A, 410B, 420A, 420B, 430A, 430B, 460A, 460B, 477A, 477B to the common base reference frame includes identifying and applying a translation between the respective reference frames of each camera(s) 410A, 410B, 420A, 420B, 430A, 430B, 460A, 460B so that the respective reference frame of each camera 410A, 410B, 420A, 420B, 430A, 430B, 460A, 460B is translated (or referenced) to a common base reference frame. For example, the reference frame for camera 410A (although any of the cameras may be used) represents the common base reference frame. The translation (i.e., a rigid translation in six degrees of freedom) is determined for each of the coordinate systems/reference frames for the other cameras 410B, 420A, 420B, 430A, 430B, 460A, 460B with respect to the reference frame of camera 410A so that image data from cameras 410B, 420A, 420B, 430A, 430B, 460A, 460B is correlated or translated into the reference frame of camera 410A.

Calibration of the cameras includes registering (e.g., storing in memory), from the images the vision system controller 122VC, a perspective of the case units CU1, CU2, CU3 relative, for example, to the case unit monitoring camera 410A, 410B. The vision system controller 122VC estimates the pose of the case units CU1, CU2, CU3 relative to the case unit monitoring camera 410A, 410B and estimates the pose of the case units CU1, CU2, CU3 relative to each other. The pose estimates PE of the respective case units CU1, CU2, CU3 are illustrated in FIGS. 4A-4C as being overlaid on the respective case units CU1, CU2, CU3.

The vehicle 110 is moved so that any suitable number of view points of the case units CU1, CU2, CU3 are obtained/imaged by the case unit monitoring camera 410A, 410B to effect a convergence of the case unit characteristics/parameters (e.g., estimated by the vison system controller 122VC) for each of the known case units CU1, CU2, CU3. Upon convergence of the case unit parameters, the case unit monitoring camera 410A, 410B is calibrated. The calibration process is repeated for the other case unit monitoring camera 410A, 410B. With both of the case unit monitoring cameras 410A, 410B calibrated, the vision system controller 122VC is configured with three-dimensional rays for each pixel in each of the case unit monitoring cameras 410A, 410B as well as an estimate of the three-dimensional baseline line segment separating the cameras and the relative pose of the case unit monitoring cameras 410A, 410B relative to each other. The vision system controller 122VC is configured to employ the three-dimensional rays for each pixel in each of the case unit monitoring cameras 410A, 410B, the estimate of the three-dimensional baseline line segment separating the cameras, and the relative pose of the case unit monitoring cameras 410A, 410B relative to each other so that the case unit monitoring cameras 410A, 410B form a passive stereo vision sensor such as where there are common features visible within the fields of view 410AF, 410BF of the case unit monitoring cameras 410A, 410B.

The common base reference frame may be translated to the reference frame BREF of the autonomous guided vehicle 110 by transferring one or more of the case units CU1-CU3 to the payload bed 210B of the autonomous guided vehicle 110, where the one or more case units CU1-CU3 are justified within the payload bed 210B (using, e.g., at least the justification blades 471 and pushers 470). With the one or more case units CU1-CU3 at the known location within the payload bed 210B, the controller (knowing the dimensions of the case unit(s) CU1-CU3) characterizes the relationship between the image field of the common base reference frame and the reference frame of the robot BREF so that the locations of the case unit(s) CU1-CU3 in the vision system images are calibrated to the robot reference frame BREF. The other stereo camera pairs 420A and 420B, 430A and 430B, 477A and 477B may be calibrated in a similar manner where the common base reference frame of each pair is translated to the reference frame BREF of the autonomous guided vehicle 110 based on known relative camera positions and/or disparity or depth map imaging of a portion of the autonomous guided vehicle (within the field of view of the respective camera pair) and the case units or other structure of the storage and retrieval system.

Figure 8:
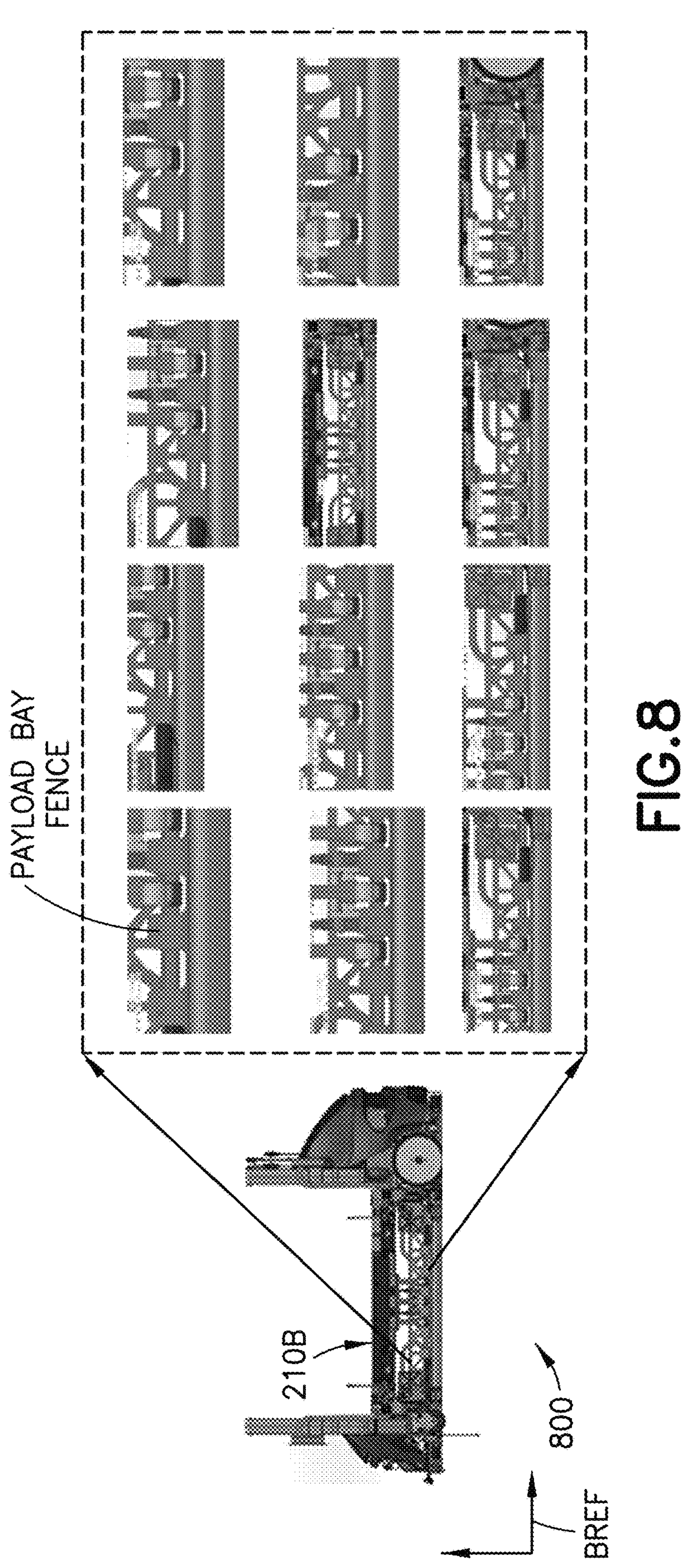
FIG. 8 is an exemplary illustration of a computer model (and portions thereof) of the autonomous guided vehicle of FIG. 2 in accordance with aspects of the disclosed embodiment.

As may be realized, referring also to FIG. 8, to translate the common base reference frame of the respective camera pairs to the reference frame BREF of the autonomous guided vehicle 110, a computer model 800 (such as a computer aided drafting or CAD model) of the autonomous guided vehicle 110 may also be employed (in conjunction with reference frame translation determination effected by holding the case units in the payload bay as described above or in lieu of such reference frame translation determination) by the controller 122 (or vision controller 122VC). As can be seen in FIG. 8, feature dimensions, such as of any suitable features of the payload bed 210B depending on which camera pair is being calibrated (which in this example are features of the payload bed fence relative to the reference frame BREF or any other suitable features of the autonomous guided vehicle 110 via the autonomous guided vehicle model 800 and/or suitable features of the storage structure via the virtual model 400VM of the operating environment), may be extracted by the controller 122 for portions of the autonomous guided vehicle 110 within the fields of view of the camera pairs. These feature dimensions of the payload bed 210B are determined from an origin of the reference frame BREF of the autonomous guided vehicle 110. These known dimensions of the autonomous guided vehicle 110 are employed by the controller 122 (or vision controller 122VC) along with a disparity or depth map created by the stereo camera pair to correlate the common base reference frame (or the reference frame of each camera) to the reference frame BREF of the autonomous guided vehicle 110.

As noted above, the calibration of the case unit monitoring cameras 410A, 410B was described with respect to case units CU1, CU2, CU3 but may be performed with respect to any suitable structure (e.g., permanent or transient (inclusive of calibration fixtures)) of the storage and retrieval system 100 in a substantially similar manner.

Figure 7A:
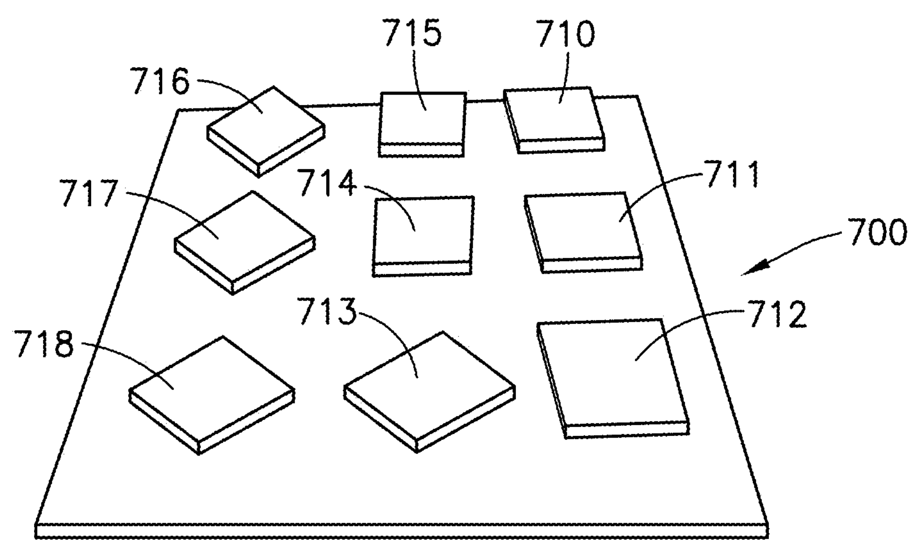
FIGS. 7A and 7B are schematic illustrations of a calibration fixture or jig in accordance with aspects of the disclosed embodiment.
Figure 7B:
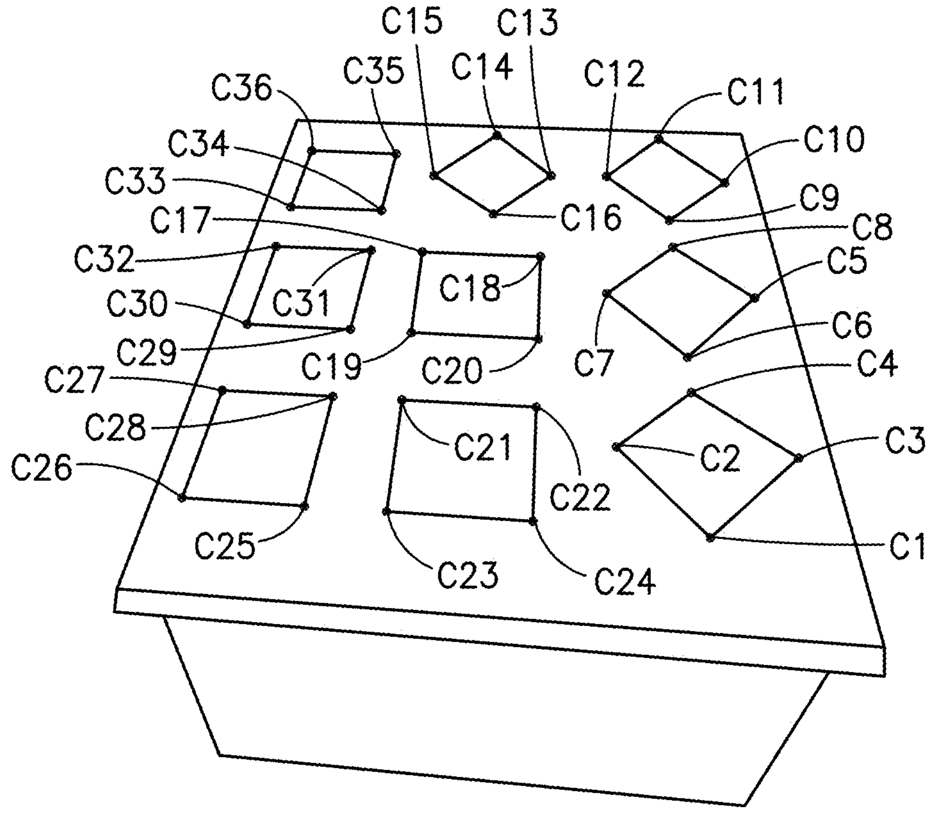

Referring also to FIGS. 7A and 7B, an example of multiple camera calibration employing a calibration jig/fixture 700 (also referred to as a common camera calibration reference structure) includes calibration of the camera pairs 410A and 410B, 420A and 420B, 430A and 430B, 460A, 460B, 477A, 477B to respective common base reference frames (in a manner similar to that described above) and calibration of the common base reference frames to the robot reference frame (in a manner similar to that described above); while in other aspects of camera calibration with case units/storage structure and/or calibration fixture, where one or multiple cameras are employed, the reference frame of the one camera or the reference frame of one or more cameras 410A, 410B, 420A, 420B, 430A, 430B, 460A, 460B, 477A, 477B may be individually calibrated to the autonomous guided vehicle 110 reference frame BREF.

For exemplary purposes only, referring to FIGS. 3A, 3B, 7A, and 7B, calibration of the camera pairs 410A and 410B, 420A and 420B, 430A and 430B, 460A and 460B, 477A and 477B to the respective common base reference frame includes identifying and applying a translation between the respective reference frames of each camera(s) 410A, 410B, 420A, 420B, 430A, 430B, 460A, 460B, 477A, 477B so that the respective reference frame of each camera 410A, 410B, 420A, 420B, 430A, 430B, 460A, 460B, 477A, 477B is translated (or referenced) to the respective common base reference frame. Again, the common base reference frame may be the reference frame of a single camera of the camera pair or any other suitable base frame of reference to which each camera pair 410A and 410B, 420A and 420B, 430A and 430B, 460A and 460B, 477A and 477B may be related to so as to form the respective common base reference frame collectively for all cameras of the camera pair in a manner substantially similar to that described above. This calibration of the cameras 410A, 410B, 420A, 420B, 430A, 430B, 460A, 460B, 477A, 477B may be performed with the calibration fixture 700 that is placed at any suitable holding location of the storage and retrieval system 100 (e.g., such as on a storage shelf or any other suitable location accessible to the autonomous guided vehicle 110 and within the fields of view of the cameras being calibrated). As described herein, each camera 410A, 410B, 420A, 420B, 430A, 430B, 460A, 460B, 477A, 477B is calibrated to the common base reference frame, and calibration to the common base reference frame, describes a positional relationship of a respective camera reference frame of each respective camera 410A, 410B, 420A, 420B, 430A, 430B, 460A, 460B, 477A, 477B with each other camera 410A, 410B, 420A, 420B, 430A, 430B, 460A, 460B, 477A, 477B, and with the reference frame BREF of the autonomous guided vehicle 110.

The calibration fixture 700 includes uniquely identifiable three-dimensional geometric shapes 710-719 (in this example, squares, some of which are rotated relative to others) that provide the calibration fixture 1300 with an asymmetric pattern and that constrain the determination/translation of the reference frames of the cameras (e.g., from each camera) to the common base reference frame and the translation between the common base reference frame and the autonomous guided vehicle reference frame BREF as will be further described so as to determine relative pose of the calibration fixture 1300 (and hence case units) to the transfer arm 210A of the autonomous guided vehicle 110. The calibration fixture 700 shown and described herein is exemplary and any other suitable calibration fixture may be employed in a manner similar to that described herein. For exemplary purposes, each of the three-dimensional geometric shapes 710-719 are of a predetermined size that constrains the identification of corners or points C1-C36 of the three-dimensional geometric shapes 710-719 and the translation is such that the distance between the corresponding corners C1-C36 are minimized (e.g., the distance between the respective corners C1-C36 in the reference frame of camera 310C1 is minimized with respect to each of the respective corners C1-C36 identified in the reference frames 410AF, 410BF, 420AF, 420BF, 430AF, 430BF, 460AF, 460BF of each camera 410A, 410B, 420A, 420B, 430A, 430B, 460A, 460B of the camera pair being calibrated—cameras 477A, 477B have similar reference frames).

Each of the three-dimensional geometric shapes 710-719 are simultaneously imaged (i.e., three-dimensional geometric shapes 710-719 are each at a single location in the common base reference frame during imaging by all cameras of the camera pair whose reference frames are to be calibrated to the respective common base reference frame of the camera pair) and is uniquely identified by each of the cameras in the camera pair 410A and 410B, 420A and 420B, 430A and 430B, 460A and 460B, 477A and 477B at the single location so that the points/corners C1-C36 of the three-dimensional geometric shapes 1310-1319 identified in the images (one exemplary image is illustrated in FIG. 7B) are identified by the vision system 400 and are uniquely determined independent of calibration fixture orientation. The corners C1-C36 identified in each image of the image set are compared between images from the cameras in the camera pair to define the translation for each camera reference frame to the common base reference frame (which in one example may correspond with or is otherwise defined by the reference frame of camera 410A for calibration of the camera pair 410A, 410B).

Upon registration of the cameras 410A, 410B, 420A, 420B, 430A, 430B, 460A, 460B, 477A, 477B to the respective common base reference frame, the respective common base reference frames (or the reference frame of one or more cameras individually) are translated (e.g., registered) to the autonomous guided vehicle 110 reference frame BREF by transferring the calibration fixture 700 (or similar fixture) to the payload bed 210B of the autonomous guided vehicle 110 and/or by employing the computer model 800 of the autonomous guided vehicle 110 in a manner similar to that noted above. For example, where the calibration fixture 700 is transferred into the payload bed 210B, the calibration fixture 700 is justified within the payload bed 210B (using, e.g., at least the justification blades 471 and pushers 470). With the calibration fixture 700 at the known (i.e., justified) location within the payload bed 210B, the controller (knowing the locations of the points/corners C1-C36) characterizes the relationship between the image field of the common base reference frame and the reference frame BREF of the autonomous guided vehicle so that the locations of the points/corners C1-C36 in the vision system images are calibrated to the robot reference frame BREF. Where the computer model 800 is employed, the disparity or depth map generated by the stereo camera pair is employed along with the known dimensions of the payload bed features (from the computer model 800) and the known dimensions/locations of the points/corners C1-C36 to provide the translation between the respective common base reference frame of, e.g., camera pair 410A and 410B with the reference frame BREF of the autonomous guided vehicle 110.

Figure 15:
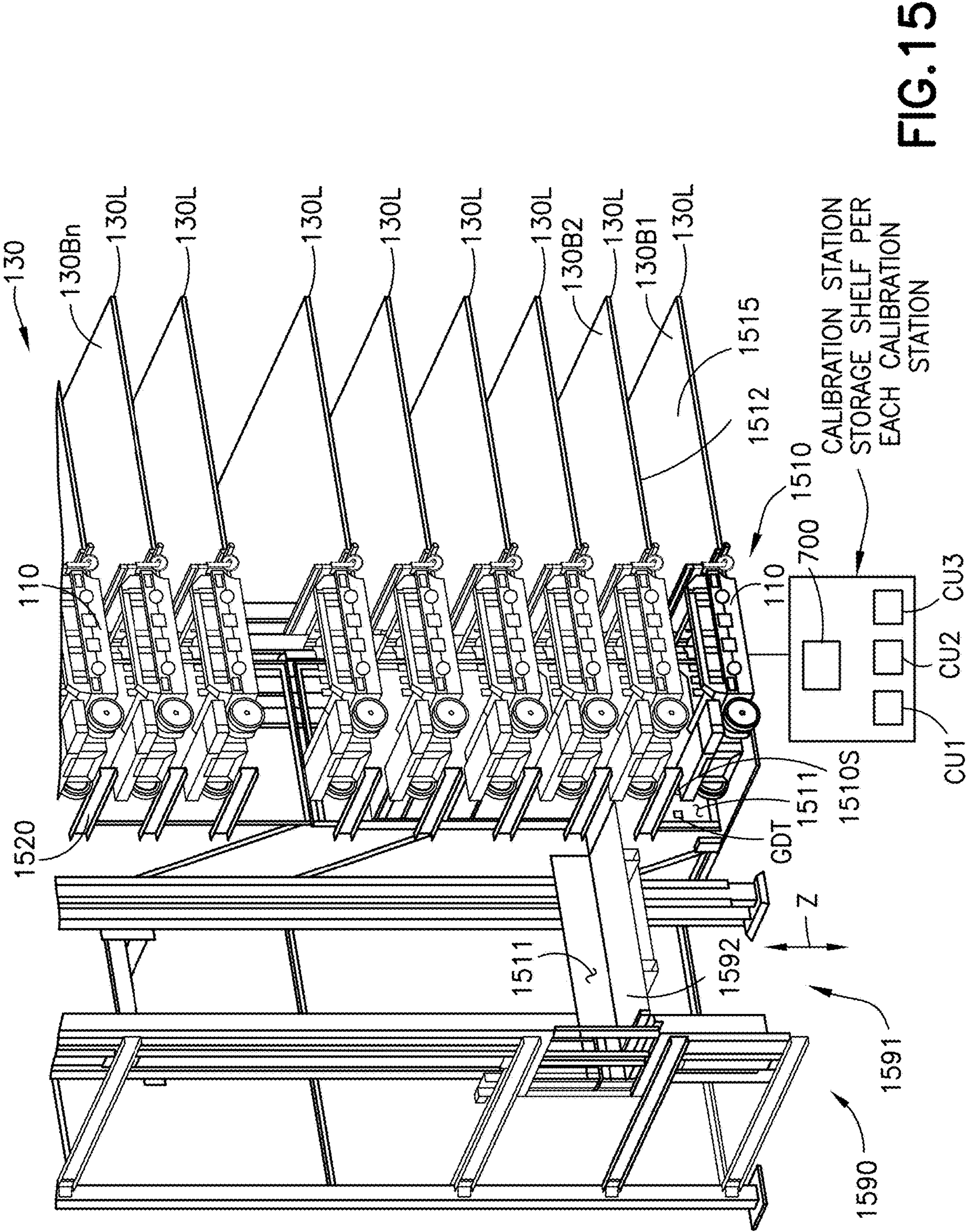
FIG. 15 is an exemplary schematic illustration of a calibration station(s) of the logistics facility of FIG. 1A in accordance with aspects of the disclosed embodiment.

Referring also to FIG. 15, the calibration of the camera pairs 410A and 410B, 420A and 420B, 430A and 430B, 460A and 460B, 477A and 477B may be provided or otherwise performed at a calibration station 1510 of the storage structure 130. As can be seen in FIG. 15, the calibration station 1510 may be disposed at or adjacent an autonomous guided vehicle ingress or egress location 1590 of the storage structure 130. The autonomous guided vehicle ingress or egress location 1590 provides for induction and removal of autonomous guided vehicles 110 to the one or more storage levels 130L of the storage structure 130 in a manner substantially similar to that described in U.S. Pat. No. 9,656,803 issued on May 23, 2017 and titled "Storage and Retrieval System Rover Interface," the disclosure of which is incorporated herein by reference in its entirety. For example, the autonomous guided vehicle ingress or egress location 1590 includes a lift module 1591 so that entry and exit of the autonomous guided vehicles 110 may be provided at each storage level 130L of the storage structure 130. The lift module 1591 can be interfaced with the transfer deck 130B of one or more storage level 130L. The interface between the lift module 1591 and the transfer decks 130B may be disposed at a predetermined location of the transfer decks 130B so that the input and exit of autonomous guided vehicles 110 to each transfer deck 130B is substantially decoupled from throughput of the automated storage and retrieval system 100 (e.g. the input and output of the autonomous guided vehicles 110 at each transfer deck does not affect throughput). In one aspect the lift module 1591 may interface with a spur or staging area 130B1-130Bn (e.g. autonomous guided vehicles loading platform) that is connected to or forms part of the transfer deck 130B for each storage level 130L. In other aspects, the lift modules 1591 may interface substantially directly with the transfer decks 130B. It is noted that the transfer deck 130B and/or staging area 130B1-130Bn may include any suitable barrier 1520 that substantially prevents an autonomous guided vehicle 110 from traveling off the transfer deck 130B and/or staging area 130B1-130Bn at the lift module interface. In one aspect the barrier may be a movable barrier 1520 that may be movable between a deployed position for substantially preventing the autonomous guided vehicles 110 from traveling off of the transfer deck 130B and/or staging area 130B1-130Bn and a retracted position for allowing the autonomous guided vehicles 110 to transit between a lift platform 1592 of the lift module 1591 and the transfer deck 130B and/or staging area 130B1-130Bn. In addition to inputting or removing autonomous guided vehicles 110 to and from the storage structure 130, in one aspect, the lift module 1591 may also transport rovers 110 between storage levels 130L without removing the autonomous guided vehicles 110 from the storage structure 130.

Each of the staging areas 130B1-130Bn includes a respective calibration station 1510 that is disposed so that autonomous guided vehicles 110 may repeatedly calibrate the camera pairs 410A and 410B, 420A and 420B, 430A and 430B, 460A and 460B, 477A and 477B. The calibration of the camera pairs may be automatic upon autonomous guided vehicle registration (via the autonomous guided vehicle ingress or egress location 1590 in a manner substantially similar to that described in U.S. Pat. No. 9,656,803, previously incorporated by reference) into the storage structure 130. In other aspects, the calibration of the camera pairs may be manual (such as where the calibration station is located on the lift 1592) and be performed prior to insertion of the autonomous guided vehicle 110 into the storage structure 130 in a manner similar to that described herein with respect to calibration station 1510.

To calibrate the stereo pairs of cameras the autonomous guided vehicle is positioned (either manually or automatically) at a predetermined location of the calibration station 1510. Automatic positioning of the autonomous guided vehicle 110 at the predetermined location may employ detection of any suitable features of the calibration station 1510 with the vision system 400 of the autonomous guided vehicle 110. For example, the calibration station 1510 includes any suitable location flags or positions 1510S disposed on one or more surfaces 1200 of the calibration station 1510. The location flags 1510S are disposed on the one or more surfaces within the fields of view of at least one camera of a respective camera pair. The vision system controller 122VC is configured to detect the location flags 1510S, and with detection of one or more of the location flags 1510S, the autonomous guided vehicle is grossly located relative to the calibration fixture 700 (e.g., stored on a shelf or other support of the calibration station 1510), calibration case units (similar to case units CU1, CU2, CU3 noted above and stored on a shelf of the of the calibration station 1510), and/or other calibration datums (or known objects) such as those described herein. In other aspects, in addition to or in lieu of the location flags 1510S, the calibration station 1510 may include a buffer or physical stop against which the autonomous guided vehicle 110 abuts for locating itself at the predetermined location of the calibration station 1510. The buffer or physical stop may be, for example, the barrier 1520 or any other suitable stationary or deployable feature of the calibration station. Automatic positioning of the autonomous guided vehicle 110 in the calibration station 1510 may be effected as the autonomous guided vehicle 110 is inducted into the storage and retrieval system 100 (such as with the autonomous guided vehicle exiting the lift 1592) and/or any suitable time where the autonomous guided vehicle enters the calibration station 1510 from the transfer deck 130. Here, the autonomous guided vehicle 110 may be programmed with calibration instructions that effect stereo vision calibration upon induction into the storage structure 130 or the calibration instructions may be initialized at any suitable time with the autonomous guided vehicle 110 operating (i.e., in service) within the storage structure 130.

As noted above, the case units CU1, CU2, CU3 and/or calibration fixture 700 may be stored on a storage shelf of a respective calibration station 1510, where calibration of the camera pairs is performed at the respective calibration station 1510 in the manner described above. Further, one or more surfaces of each calibration station 1110 may include any suitable number of known objects GDT, which may be substantially similar to the geometric shapes 710-719. The one or more surfaces may be any surface that is viewable by the camera pairs including, but not limited to, a side wall 1511 of the calibration station 1510, a ceiling 1512 of the calibration station 1510, a floor/traverse surface 1515 of the calibration station 1510, and a barrier 1520 of the calibration station 1510. The objects GDT (which may also be referred to as vision datums or calibration objects) included with a respective surface may be raised structures, apertures, appliques (e.g., paint, stickers, etc.) that each have known physical characteristics such as shape, size, etc. such that calibration of the camera pairs is performed in a manner substantially similar to that described above with respect to the case units CU1-CU3 and/or calibration fixture 700.

As may be realized, vehicle localization (e.g., positioning of the vehicle at a predetermined location along a picking aisle 130A or along the transfer deck 130B relative to a pick/place location) effected by the physical characteristic sensor system 270 may be enhanced with the pixel level position determination effected by the supplemental navigation sensor system 288. Here, the controller 122 is configured to what may be referred to as "grossly" locate the vehicle 110 relative to a pick/place location by employing on or more sensors of the physical characteristic sensor system 270. The controller 122 is configured to employ the supplemental (e.g., pixel level) position information obtained from the vision system controller 122VC of the supplemental navigation sensor system 288 to what may be referred to as "fine tune" the vehicle pose and location relative to the pick/place location so that positioning of the vehicle 110 and case units CU placed to storage locations 130S by the vehicle 110 may be held to smaller tolerances (i.e., increased position accuracy) compared to positioning of the vehicle 110 or case units CU with the physical characteristic sensor system 270 alone. Here, the pixel level positioning provided by the supplemental navigation sensor system 288 has a higher positioning definition/resolution than the electro-magnetic sensor resolution provided by the physical characteristic sensor system 270.

Figure 9A:
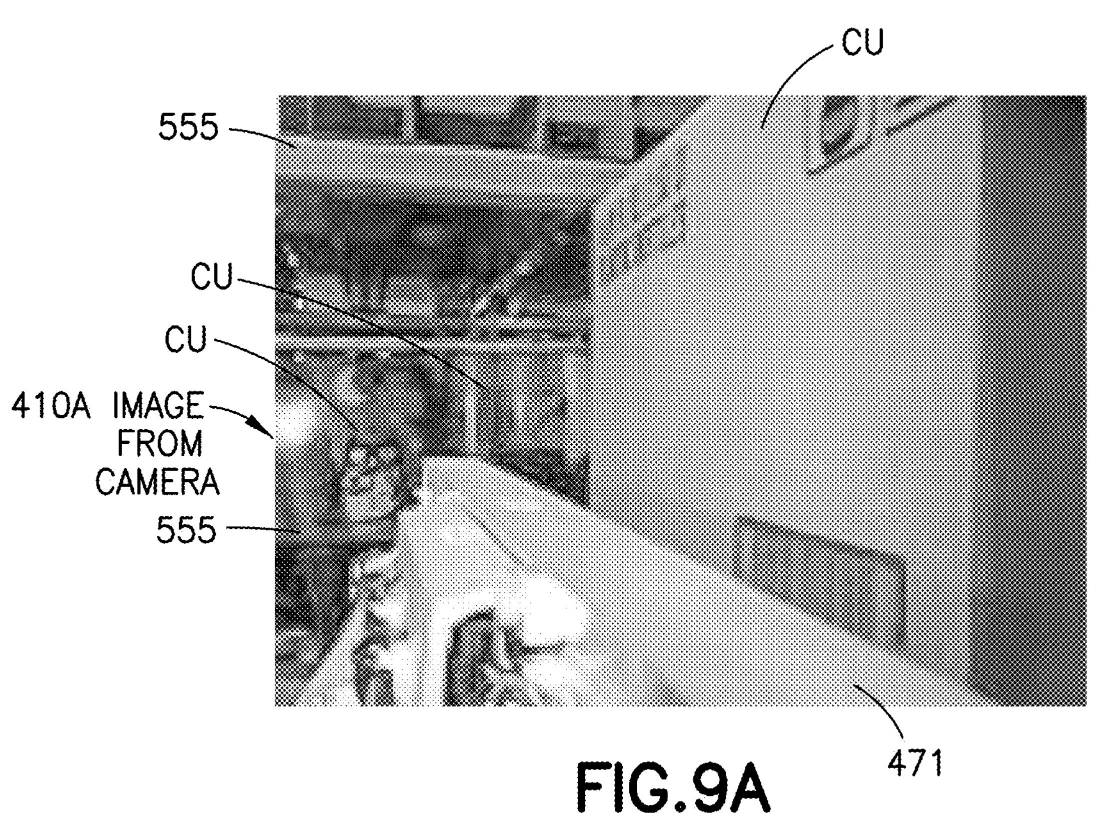
FIG. 9A is an exemplary monocular image from a camera of a vision system of the autonomous guided vehicle of FIG. 2 in accordance with aspects of the disclosed embodiment.
Figure 9B:
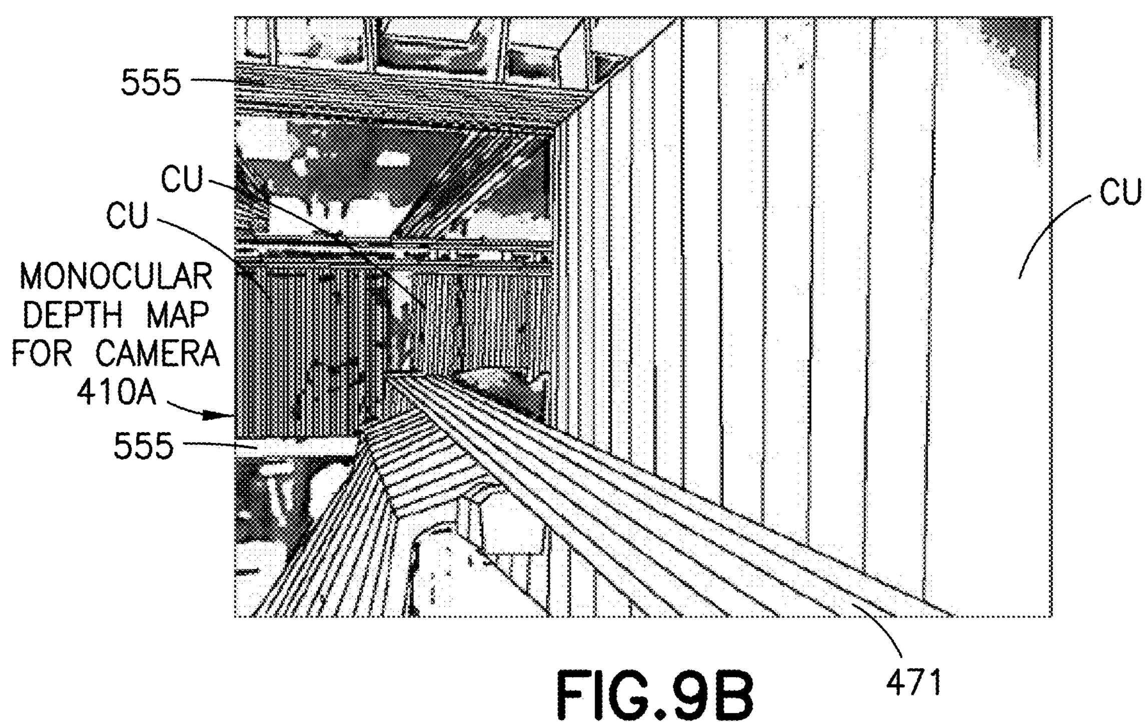
FIG. 9B is an exemplary depth map generated from the exemplary monocular image of FIG. 9A in accordance with aspects of the disclosed embodiment.
Figure 9C:
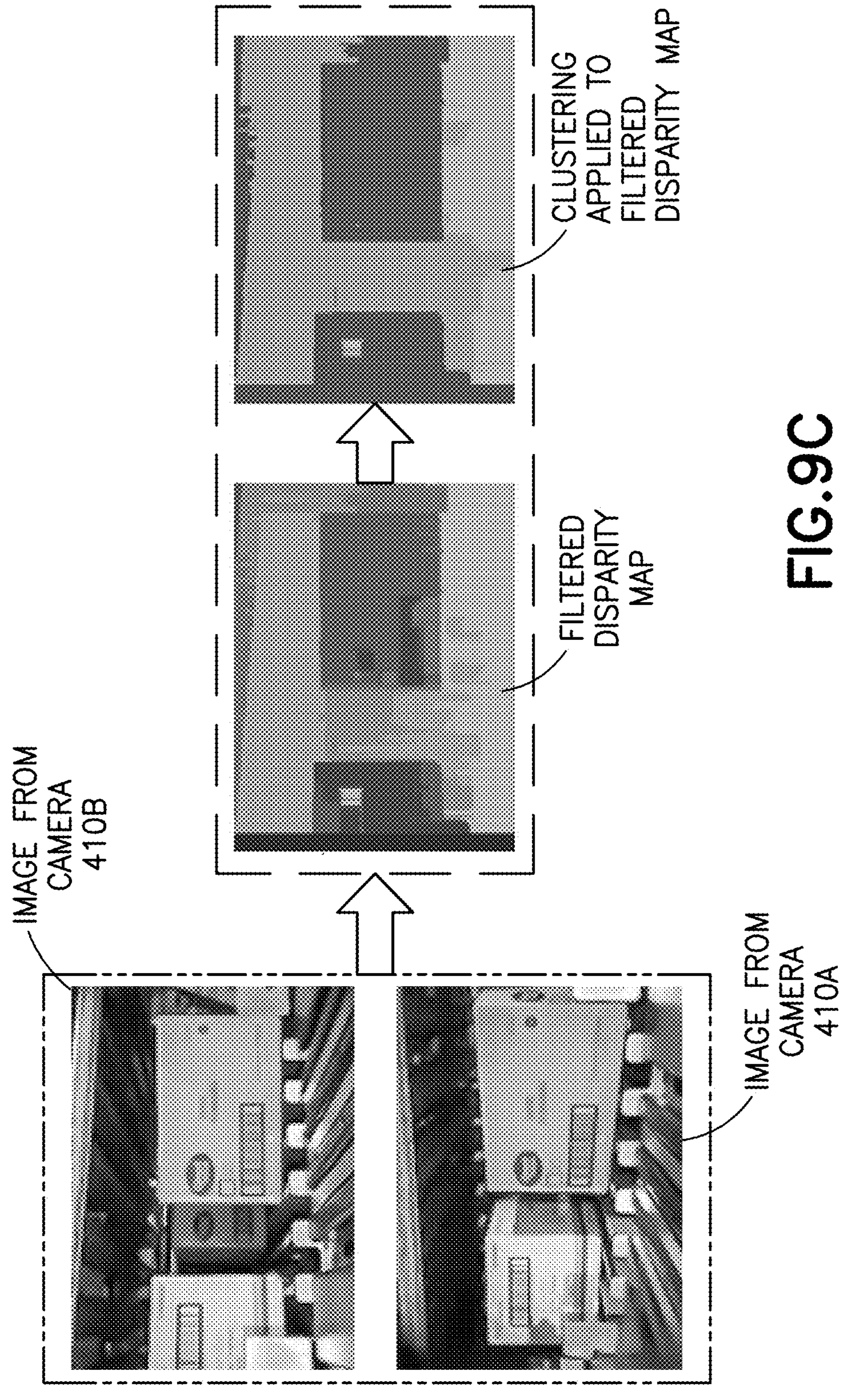
FIG. 9C is an exemplary illustration of disparity map generation employing a pair of cameras of the vision system of the autonomous guided vehicle of FIG. 2 in accordance with aspects of the disclosed embodiment.

Still referring to FIGS. 1A, 2 and 6 as well as FIGS. 9A-9C, to obtain the video stream data imaging with the vision system 400, each camera of the stereo pairs of cameras 410A and 410B, 420A and 420B, 430A and 430B, 460A and 460B, 477A and 477B are calibrated for three-dimensional monocular vision (see FIG. 6, Block 605). Here, monocular calibration of each camera in a camera pair 410A and 410B, 420A and 420B, 430A and 430B, 460A and 460B, 477A and 477B employs disparity or depth images and a depth image associated with a three-dimensional imaging sensor (with respect to stereo camera pair 410A and 410B, three-dimensional imaging sensor 440A and/or 440B—noting at least one three-dimensional imaging sensors 440C, 440D may be placed at each end 200E1, 200E2 of the automated guided vehicle 110 with respect to stereo camera pairs 420A and 420B, 430A and 430B or the disparity or depth map may be generated from the camera pair itself as there is generally no obstruction between the respective camera pairs 420A and 420B, 430A and 430B at the ends 200E1, 200E2 of the autonomous guided vehicle 110 that would impair the depth map generated therefrom). FIG. 9A illustrates a three-dimensional object (i.e., case unit CU) held, for example, in the payload bay 210B of the autonomous guided vehicle 110, although the three-dimensional object may be held at any suitable location that is within the fields of view of each camera in a camera pair and the associated three-dimensional sensor(s). This case unit CU is placed in a position and orientation (e.g., within the payload bay 210B or any other suitable location) that is visible in the fields of view of the cameras 410A, 410B and the three-dimensional imaging sensors 440A, 440B. The case unit CU is observable in all images from the cameras 410A, 410B and three-dimensional image sensors 440A, 440B so that objects and points common to the images from the cameras 410A, 410B and three-dimensional image sensors 440A, 440B can be incorporated for transformations from the two-dimensional image from the respective monocular camera 410A, 410B to a three-dimensional image for the respective monocular camera 410A, 410B.

FIG. 9C illustrates a disparity or depth map that is generated from the vision system 400 with, for example, cameras 410A, 410B. The disparity map from the camera 410A, 410B images is filtered and then a clustering method is applied to the filtered disparity map to arrive at the disparity map employed for object detection and localization. The disparity maps generated from the cameras 410A, 410B are calibrated in any suitable manner with the depth map from one or more of the three-dimensional image sensors 440A, 440B.

Exemplary transformation equations that effect depth determinations from a monocular image from a monocular camera 410A, 410B, 420A, 420B, 430A, 430B, 460A, 460B, 477A, 477B are as follows:

$$\begin{bmatrix} x \\ y \\ z \end{bmatrix} = R \begin{bmatrix} X \\ Y \\ Z \end{bmatrix} + t \quad \text{[eq. 1]}$$

$$s \begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix} \quad \text{[eq. 2]}$$

Where R is a rotational transformation, r is a 3×3 translational matrix and t is a 3×1 translational vector. The above exemplary equations are employed by the controller 122 and/or vision controller 122VC to convert coordinates within the monocular camera images to the global reference frame GREF of the storage and retrieval system 100. The depth information associated with a depth of a detected object in a front-facing plane of the point clouds or maps created with the three-dimensional imaging sensor(s) 440A, 440B is employed for generating the coordinates of the global reference frame GREF. The above-noted equations and depth information form calibration parameters that are employed by the controller 122 to convert monocular image coordinates to the global reference frame coordinates GREF subsequent to deep learning detection analysis of the monocular images as described herein.

Figure 12A:
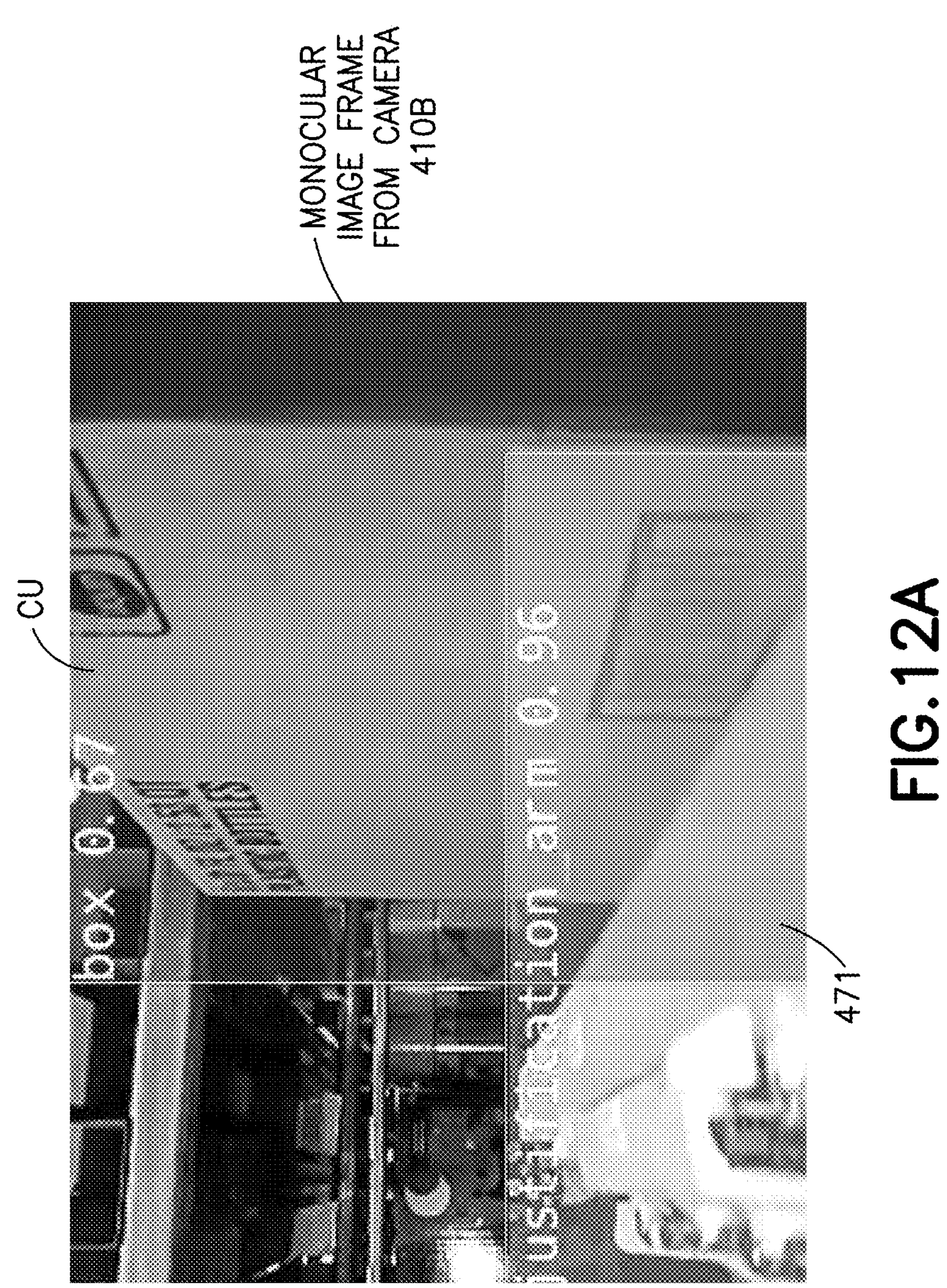
FIGS. 12A and 12B are exemplary augmented images of the vision system of the autonomous guided vehicle of FIG. 2 in accordance with aspects of the disclosed embodiment.

With the stereo camera pairs calibrated and each of the individual cameras of the camera pairs calibrated as monocular cameras, the artificial neural network ANN of the deep conductor DC is trained (FIG. 6, Block 610). The artificial neural network ANN is any suitable deep learning graphic processing algorithm configured for feature or representation learning and detection consolidation and is trained in any suitable manner known in the art, such as with labeled or unlabeled data or in any other suitable manner. Referring briefly to FIG. 12A, the detection consolidation performed by the deep conductor DC, via the artificial neural network ANN, generates several measures including, but not limited to, intersection over union (e.g., an extent of overlap of two boxes) and confidence of detection, where, for exemplary purposes only, a best fit bounding box is chosen to represent a detected object, among multiple bounding boxes generated for the detection of the object. In one aspect, the consolidated results for detection of an object are in the form of a bounding box with the confidence and detected labels presented as an overlay in the image frame, as illustrated in FIG. 12A. In FIG. 12A the justification blade or arm 471 is labeled and identified with a respective bounding box and with a confidence of 0.96 or 96% that the object detected is the justification blade 471. Also in FIG. 12A, a case or box is labeled and identified with a respective bounding box and with a confidence of 0.67 or 67% that the object detected is the case CU. As noted herein, while bounding boxes are illustrated in FIG. 12A, the identified objects may be identified in the image frame in any suitable manner (e.g., such as by highlighting the detected object or any other suitable image augmentation).

Figure 11A:
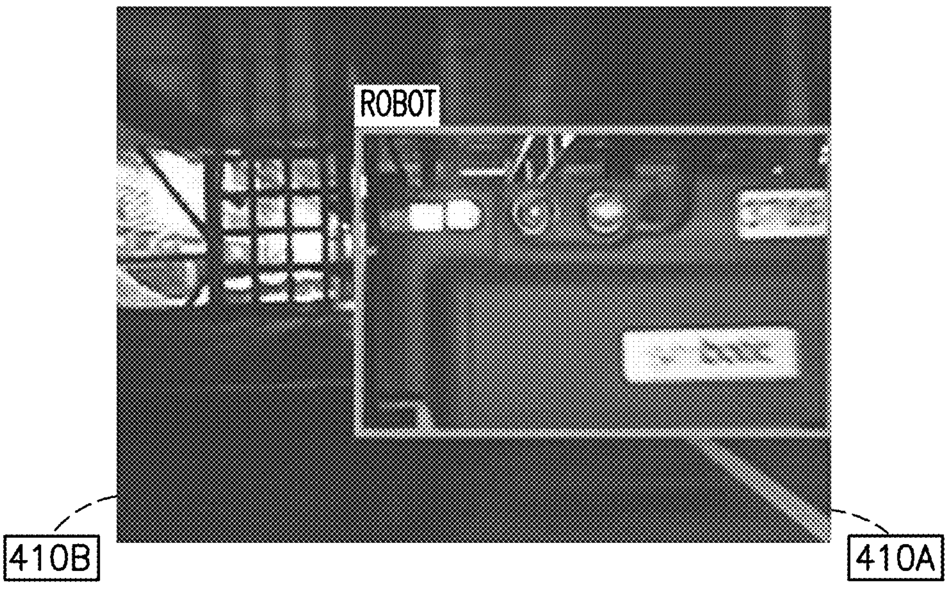
FIG. 11A is an exemplary image frame of a video stream data imaging of objects taken from one or more forward navigation cameras or one or more rearward navigation cameras of an autonomous guided vehicle in accordance with aspects of the disclosed embodiment, noting that detected image features are bound by bounding boxes for exemplary purposes only and may be identified in the image frame in any suitable manner.
Figure 11B:
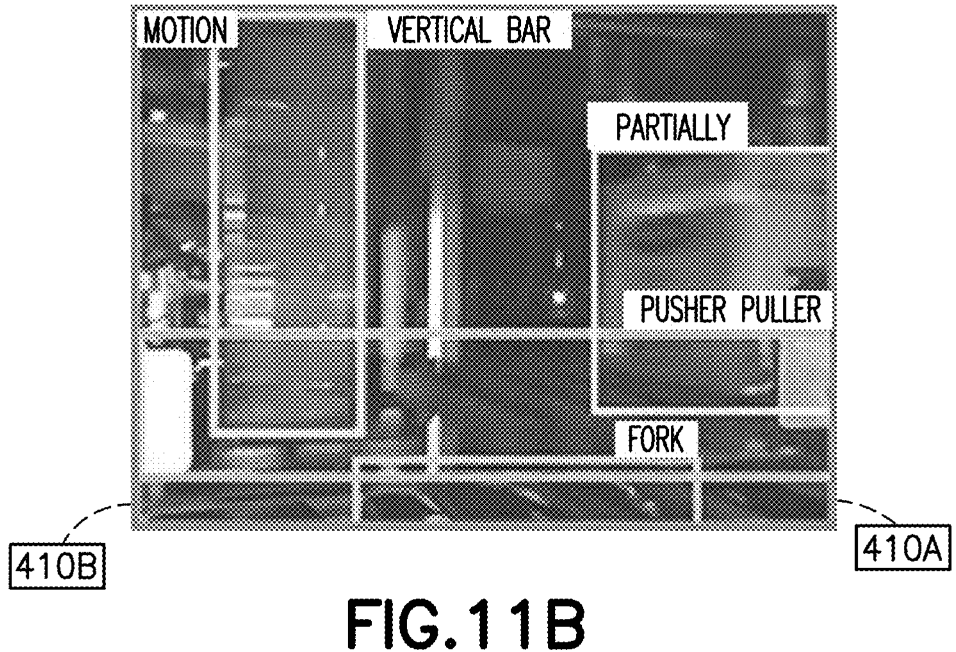
FIGS. 11B-11F are exemplary image frames of video stream data imaging of objects taken from one or more case monitoring camera of an autonomous guided vehicle in accordance with aspects of the disclosed embodiment, noting that detected image features are bound by bounding boxes for exemplary purposes only and may be identified in the image frame in any suitable manner.

The object detection performed by the deep conductor DC is a deep learning based multiple object detection where multiple detections can be presented in each image frame. The detection results, in the form of augmented image frames (such as shown in FIG. 12A, noting that while FIG. 12A illustrates an image frame from a monocular video stream, the augmented image frame is similar for an image frame obtained from a stereo vision video stream) are time stamped and may be saved in any suitable memory (e.g., such as the shared memory SH, media server MS, or any other memory in communication with the controller 122) for data logging, reporting, archiving, evaluation, trouble shooting, analysis of operational factors, quality control and measurement, fault detection or any other suitable purpose. As will be described herein, an output of the deep conductor DC (e.g., the detection results noted above with integrated logic and time stamp) are employed to activate one or more of the computer vision protocol for object detection and localization and the machine learning protocol for object detection and localization. As a brief example, and referring to 11F, detection results of the deep conductor DC are illustrated where detections from cameras 410A, 410B in the payload bed 210B identify objects (e.g., at least one pick case identified in the image data from each of the cameras 410A, 410B) and the identified objects are compared with any suitable predetermined thresholds. For example, for a picking operation of the autonomous guided vehicle 110, the deep conductor DC compares the image data to verify number of identified pick cases is equal to are greater than one. The deep conductor DC may also verify whether motion is present (i.e., the autonomous guided vehicle is traversing a traverse surface at a speed that causes motion blur), which in the case of FIG. 11F there is no blur. Based on the results of the image comparisons, the deep conductor DC may activate a computer vision protocol where the number of identified pick cases in the image data from camera 410A is the same as the number of identified pick cases in the image data from camera 410B, otherwise a machine learning protocol may be activated by the deep conductor DC.

At least one machine learning model ML is generated (FIG. 6, Block 615), such as by the controller 122 onboard the autonomous guided vehicle 110 (or by any suitable server/computer off-board the autonomous guided vehicle 110 but in communication with the onboard controller 122), where the at least one machine learning model ML represents learned weights and parameters of the artificial neural network ANN. The machine learning model(s) ML is/are configured to effect detection and localization (with respect to the autonomous guided vehicle 110 reference frame BREF) of objects specific to a defined task of the automated guided vehicle 110. For example, a machine learning model ML may be generated for each of go/no-go with respect to vehicle traverse, picking of a case CU, placing a case CU, collision avoidance, ceiling tag or structural detection for autonomous guided vehicle 110 localization, remote case inspection and any other suitable task and/or operational state of the autonomous guided vehicle 110. The machine learning models ML are saved in any suitable memory of the autonomous guided vehicle 110, such as shared memory SH or media server MS, so that the machine learning models ML are accessible to the controller 122 and the deep conductor DC thereof.

The artificial neural network ANN and machine learning model(s) ML provide for real time object detection where the artificial neural network ANN of the deep conductor DC determines which detection protocol (e.g., the computer vision object detection and localization protocol, the machine computer vision object detection and localization protocol, or both) to employ (FIG. 6, Block 620) and the objects, tasks, and/or kinematic states are identified or otherwise detected with the selected detection protocol (FIG. 6, Block 625). Examples of detected objects include, but are not limited to, with reference to FIGS. 1B, 3-4B, 11A-11F, support tines (also referred to as forks) 210AT of the transfer arm 210A, pusher 470 of the transfer arm 210A, puller 472 of the transfer arm 210A, justification blades 471 of the transfer arm 210A, storage shelf hats 444, an electrical panel (see FIG. 11E) of the storage and retrieval system 100 structure, a vertical bar 445 (see FIG. 4B and also FIG. 11B) of the storage and retrieval system 100 structure, other autonomous guided vehicles 110, picking aisles 130A, a partially identified case, and a suspect case (FIG. 11D, e.g., that may be mis-positioned on a shelf), etc. Examples of autonomous guided vehicle tasks include, but are not limited to, with reference to FIG. 11F, a picking task (e.g., case unit is positioned on shelf in an orientation suitable for pick), and a no pick task (e.g., case unit is positioned on shelf in an orientation not suitable for pick), etc. Examples of autonomous guided vehicle kinematic states include, but are not limited to, motion of the autonomous guided vehicle across a traverse surface (see FIGS. 10, 11B and 11C), such motion being indicated by blurring in the image frames (such as image frame 1000) received from the shared memory SH and/or media server MS. Here, the coordinates of the objects, the kinematic states, and/or the tasks are identified and obtained from the image frame, such as by coordinates of a respective bounding box (illustrated in FIGS. 11A-11F) with an identification of the object, task, and/or kinematic state; however, in other aspects the coordinates of the objects may be identified and obtained in any suitable manner using any suitable vision processing algorithms in combination with or in lieu of bounding boxes.

In determining which detection protocol(s) to employ (e.g., a determination of which detection protocol provides for the highest level of confidence in object detection), the deep conductor DC, via the artificial neural network ANN, assigns a flag to each of the detected objects, tasks, and kinematic states. It is noted that while flags are employed for exemplary purposes for comparison with respective predetermined thresholds, any suitable thresholding may be employed. The flag is, for example, a marker that indicates the respective condition, object or kinematic state exists. Here, each detected condition, object and kinematic state is assigned a flag (e.g., 1 (or other integer greater than 0) for exists and 0 for does not exist). These flags form metadata for the respective image frame and are employed by the deep conductor DC (along with one or more of the image frame time stamp, detection labels and bounding box or object coordinates) to effect, from the video stream imaging data, the robust object detection and localization by selecting a detection/localization protocol from one or both of the computer vision protocol and the machine learning protocol. For example, if there is no motion detection in an image frame, a flag for binocular depth map is set to 1 and a flag for vision maintenance (e.g., obstruction/impairment of at least one camera in the stereo camera pair) is set to 0, where the deep conductor DC selects the machine vision detection protocol for object detection and localization. If there is no motion and the flag for binocular depth map is set to zero (e.g., binocular vision is obstructed, one of the cameras in the camera pair is not available, an object is detected in one camera but not the other, etc.) and the flag for vision maintenance is set to 1 (e.g., as a result of the aforementioned anomalous stereo vision), the deep conductor DC selects the machine learning protocol for object detection and localization. Where the same objects are detected in image frames of both cameras in a pair of cameras, the detected objects are compared with any suitable thresholds (e.g., such as a detection confidence threshold) and if the threshold is satisfied the flag for binocular depth map is set to 1, and the number of detections for each camera in the pair of cameras for a common object is less than a predetermined threshold, so that the vision maintenance flag is set to 1, the deep conductor DC selects both the computer vision protocol and the machine learning protocol for object detection and localization.

Figure 11C:
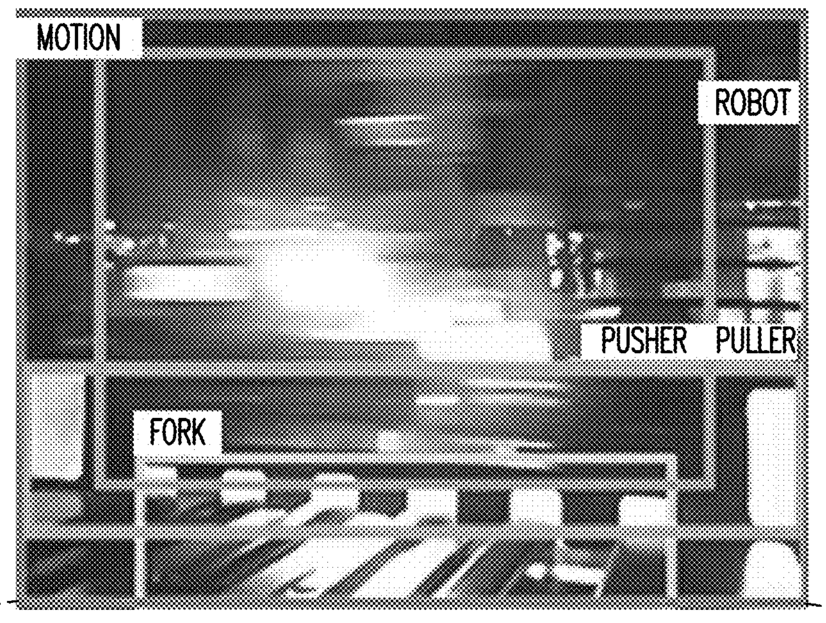
Figure 11D:
Figure 11E:
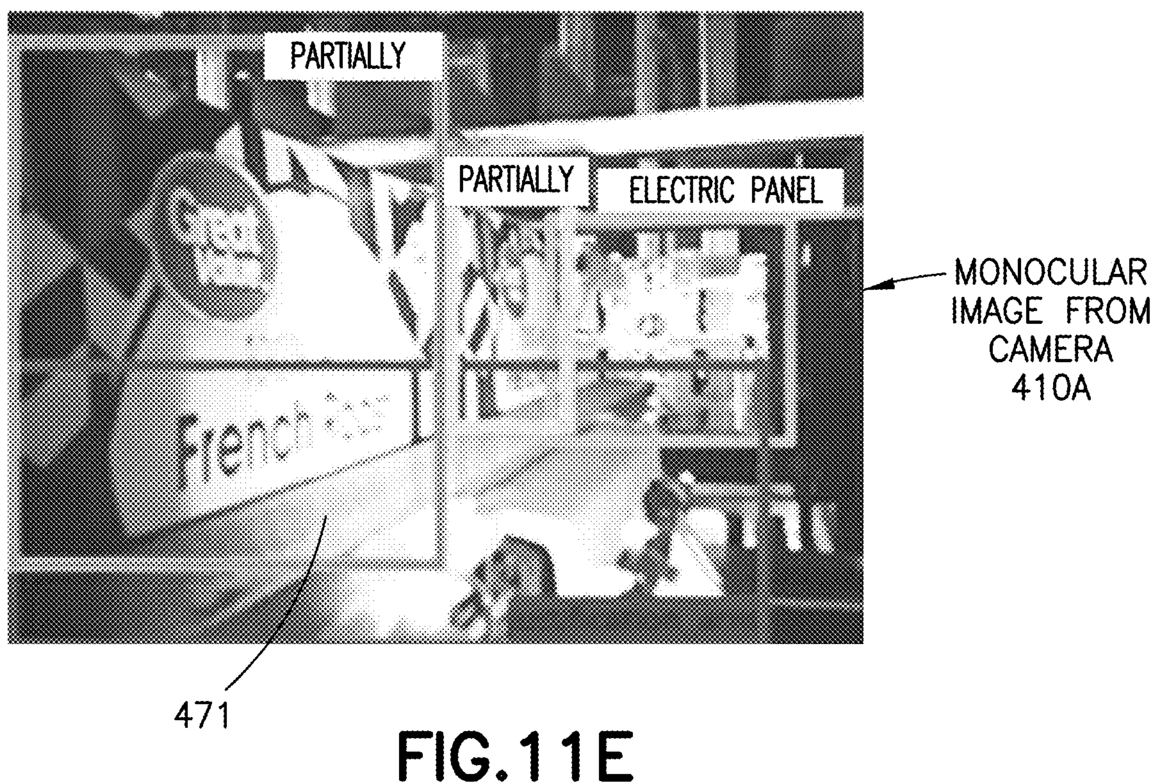
Figure 11F:
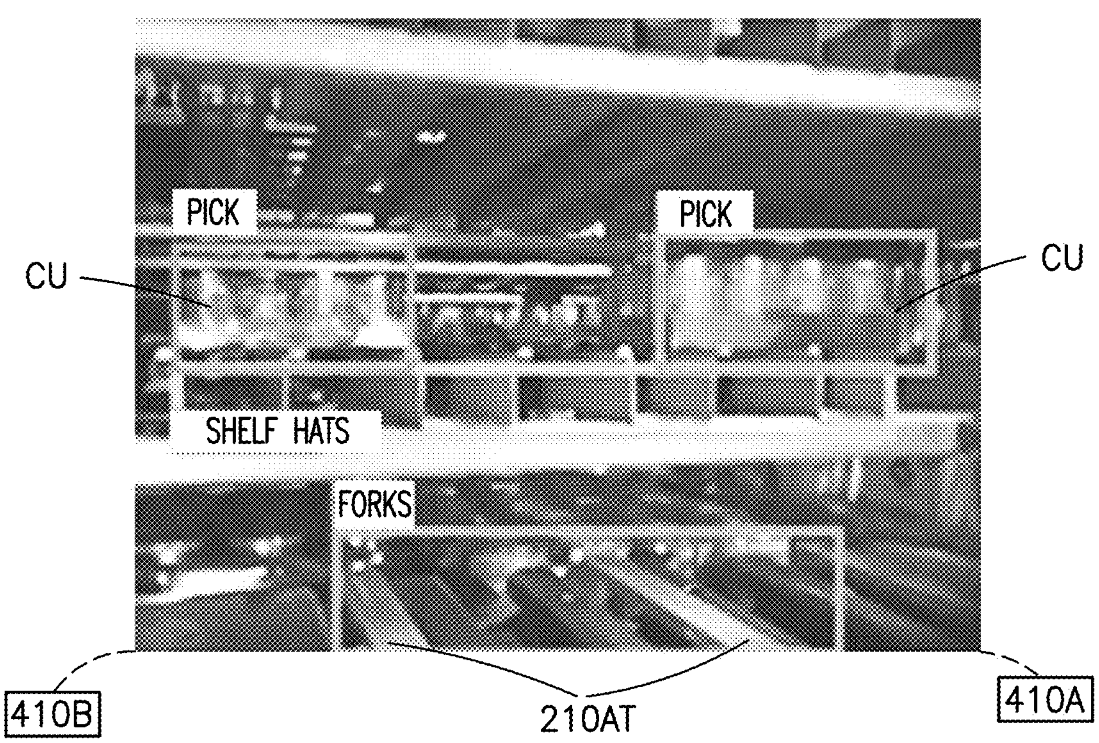
Figure 13:
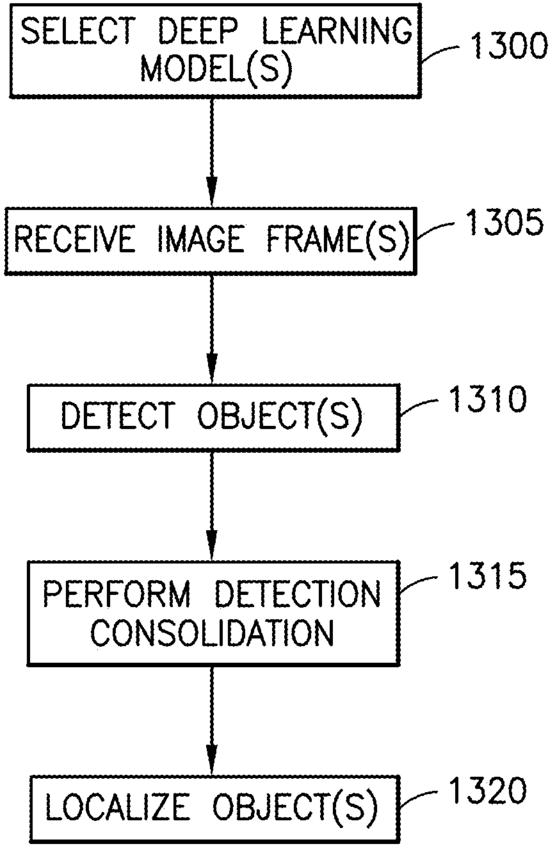
FIG. 13 is an exemplary flow diagram of a method in accordance with aspects of the disclosed embodiment.

Using vehicle motion as an example, with reference to FIG. 11C (which illustrates an image from camera 410A where a corresponding image frame from camera 410B is substantially similar but opposite in hand), the artificial neural network detects that motion exists in the image frame from cameras 410A, 410B and the flag for motion with respect to cameras 410A, 410B are set to 1; however it is noted that FIG. 11C illustrates the cameras 410A, 410B have an unobstructed view relative to each other. The artificial neural network ANN is trained (as described herein) to recognize the unobstructed camera views and the stereo image resulting therefrom. Here, because the camera view is unobstructed and a depth map can be generated from the stereo camera pair 410A, 410B the computer vision protocol is available for object detection and localization. As such, the deep conductor outputs selection of the computer vision protocol for object detection and localization with respect to cameras 410A, 410B. As another example, referring to FIG. 12A, which illustrates an image frame from camera 410B (noting that the corresponding image frame from camera 410A may be substantially similar but opposite in hand) where a case or box and the justification blade are identified. Here, the box obstructs the fields of view of the cameras 410A, 410B and may prevent generation of a stereo image from the cameras 410A, 410B; however, each camera provides a respective monocular image. As such, the deep conductor DC recognizes that the computer vision protocol may be unavailable and outputs selection of the machine learning protocol for object detection and localization with respect to cameras 410A, 410B. As still another example, FIG. 11F which illustrates an image frame from camera 410B (noting that the corresponding image frame from camera 410A may be substantially similar but opposite in hand) where the tines or forks 210AT, cases to be picked and the shelf hats are identified. Here both cameras have an unobstructed view and the number of common objects detected in the image frame from each cameras 410A, 410B in the pair of cameras is less than a predetermined threshold of, for example, 6 objects (in other aspects the threshold may be more or less than 6 objects) such that both the computer vision and machine learning protocols are available. Where both protocols are available, the deep conductor DC may select both detection and localization protocols such that any suitable image consolidation algorithm may be employed by the deep conductor DC to combine the two-dimensional (i.e., monocular vision) image frames with the three-dimensional (stereo-vision) image frames and the depth map from the three-dimensional sensors 440A, 440B.

Where the machine learning protocol is selected, the deep conductor DC selects one or more of the deep learning models ML (FIG. 13, Block 1300) based on a predetermined task (such as picking or placing a case, traversing the transfer deck or picking aisle, etc.) of the autonomous guided vehicle 110. The deep conductor receives the image frames (FIG. 13, Block 1305) for each camera in the camera pair from the shared memory SH and/or media server MS and utilizes the selected deep learning model(s) ML to effect object detection (FIG. 13, Block 1310) within the image frames for the predetermined task. With the objects in the image frames detected, the deep conductor DC performs a detection consolidation (FIG. 13, Block 1315) where the two-dimensional image frames (with the detected objects) are consolidated with a depth map from a three-dimensional sensor (for example, image frames from camera 410A are consolidated with a depth map from three-dimensional sensor 440A) to form a consolidated image or monocular depth map (e.g., such as illustrated in FIG. 9B). The monocular depth map provides depth information that is analogous to depth information obtained with stereo or machine vision obtained with stereo pairs of cameras (such as cameras 410A, 410B—see FIG. 9C). The monocular depth map may be employed by the controller 122 where the images obtained from the video stream data from the stereo pair of cameras, e.g., cameras 410A, 410B, registered by the controller 122 are unsupportive of binocular vision object detection and localization. As noted above, the monocular depth includes depth information that is analogous to that obtained with binocular vision such that any suitable depth information, effecting operation of the autonomous guided vehicle 110, may be obtained from the monocular depth map. Such information obtained from the monocular depth map includes, but is not limited to, identification of case unit distances from the autonomous guided vehicle, clearance between case units stored on a shelf 555, clearance between a case unit being picked/placed with adjacent case unit on a shelf 555, and a size of a storage space to which a case unit is to be placed. The two-dimensional image frames (with the detected objects) are consolidated with a depth map from a three-dimensional sensor by, for example, searching the front facing plane of a depth map generated using three-dimensional sensor 440A, 440B associated with a detected object (e.g., three-dimensional sensor 440A may be associated with objects detected by camera 410A and three-dimensional sensor 440B may be associated with objects detected by camera 410B). This search of the front facing plane is effected by the deep conductor DC using transformed coordinates obtained during stereo calibration of the camera pairs (e.g., camera pair 410A, 410B). The objects in the consolidated image are localized (FIG. 13, Block 1320) where the detected object coordinates from the consolidated image are converted to coordinates of the global reference frame GREF via the depth map information from one or more three-dimensional sensors 440A, 440B. Localization may also include incorporation of selected points generated from the autonomous guided vehicle model 800 and associated points from a corresponding image of the autonomous guided vehicle model taken with a corresponding camera 410A, 410B, 420A, 420B, 430A, 430B, 460A, 460B, 477A, 477B. It should be understood that the cameras 410A, 410B are described above for illustrative purposes and that the above may be effected with any of the camera pairs described herein.

As described herein, the object detection and localization as determined by the machine learning protocol, the computer vision protocol, or both is effected in real time as the autonomous guided vehicle performs a task. As also described herein, the detections (e.g., image frames as augmented or enhanced by the deep conductor DC as described herein—see FIGS. 11A-12A) are generated and output to effect an end point decision (FIG. 6, Block 630) with respect to autonomous guided vehicle operation. Here the deep conductor DC outputs the detections and indicates to the controller 122 (which the deep conductor DC is a module of) whether the autonomous guided vehicle 10 operation/task is a go (i.e., instructions for the autonomous guided vehicle 110 to complete the task are given) or a no-go (instructions for the autonomous guided vehicle 110 to not complete the task are given).

The augmented image frames output by the deep conductor DC may be parsed live or in real time (such as while the autonomous guided vehicle is performing a task and parsing of the augmented image frames effects the completion or non-completion of the task); and/or, as described herein, recorded or stored in any suitable memory (e.g., such as the shared memory SH, the media server MS, a memory of the control server 120, a memory of the warehouse management system 2500, etc.) so that the recorded detections are identified by or are identifiable as corresponding with a respective autonomous guided vehicle 110. For example, where an autonomous guided vehicle 110 cannot effect a task (such as were a case CU is caught on a shelf or a portion of the bot and cannot be transferred completely into the payload bed 210B), an operator may parse the live or stored image frames via the user interface UI, to determine a cause of the uncompleted task and/or manually control the autonomous guided vehicle to remedy the faulty transfer of the case. Here, the vision system controller 122VC (and/or controller 122) is in one or more aspects configured to provide remote viewing with the vision system 400, where such remote viewing may be presented to an operator in augmented reality or in any other suitable manner (such as un-augmented). For example, the autonomous transport vehicle 110 is communicably connected to the warehouse management system 2500 (e.g., via the control server 120) over the network 180 (or any other suitable wireless network). The warehouse management system 2500 includes one or more warehouse control center user interfaces UI. The warehouse control center user interface UI may be any suitable interfaces such as desktop computers, laptop computers, tablets, smart phones, virtual reality headsets, or any other suitable user interface configured to present visual and/or aural data obtained from the autonomous transport vehicle 110. In some aspects the vehicle 110 may include one or more microphones MCP (FIG. 2) where the one or more microphones and/or remote viewing (e.g., of live video images and/or parsed real time augmented images output by the deep conductor DC) may assist in preventative maintenance/troubleshooting diagnostics for storage and retrieval system components such as the vehicle 110, other vehicles, lifts, storage shelves, etc. The warehouse control center user interfaces UI are configured so that warehouse control center users request or are otherwise supplied (such as upon detection of an unidentifiable object 299 and/or upon detection of a suspect object (see FIG. 11D)) with images from the autonomous transport vehicle 110 and so that the requested/supplied images are viewed on the warehouse control center user interfaces UI.

The images supplied and/or requested may be live video streams, pre-recorded (and saved in any suitable memory of the autonomous transport vehicle 110 or warehouse management system 2500) images, or images (e.g., one or more static images and/or dynamic video images) that correspond to a specified (either user selectable or preset) time interval or number of images taken on demand or output by the deep conductor DC in substantially in real time with a respective image request. It is noted that live video stream and/or image capture provided by the vision system 400, vision system controller 122VC, and deep conductor DC may provide for real-time remote controlled operation (e.g., teleoperation) of the autonomous transport vehicle 110 by a warehouse control center user through the warehouse control center user interface UI.

In some aspects, the live video is streamed (augmented or un-augmented) from the vision system 400 of the supplemental navigation sensor system 288 to the user interface UI as a conventional video stream (e.g., the image is presented on the user interface without augmentation, what the camera "sees" is what is presented) in a manner similar to that described in U.S. patent application Ser. No. 17/804,026 filed on May 25, 2022 and titled "Autonomous Transport Vehicle with Vision System", the disclosure of which was previously incorporated herein by reference in its entirety. A virtual reality headset is employed by a user to view the streamed video, images from the front case unit monitoring camera 410A may be presented in a viewfinder of the virtual reality headset corresponding to the user's left eye and images from the rear case unit monitoring camera 410B may be presented in a viewfinder of the virtual reality headset corresponding to the user's right eye.

Figure 12B:
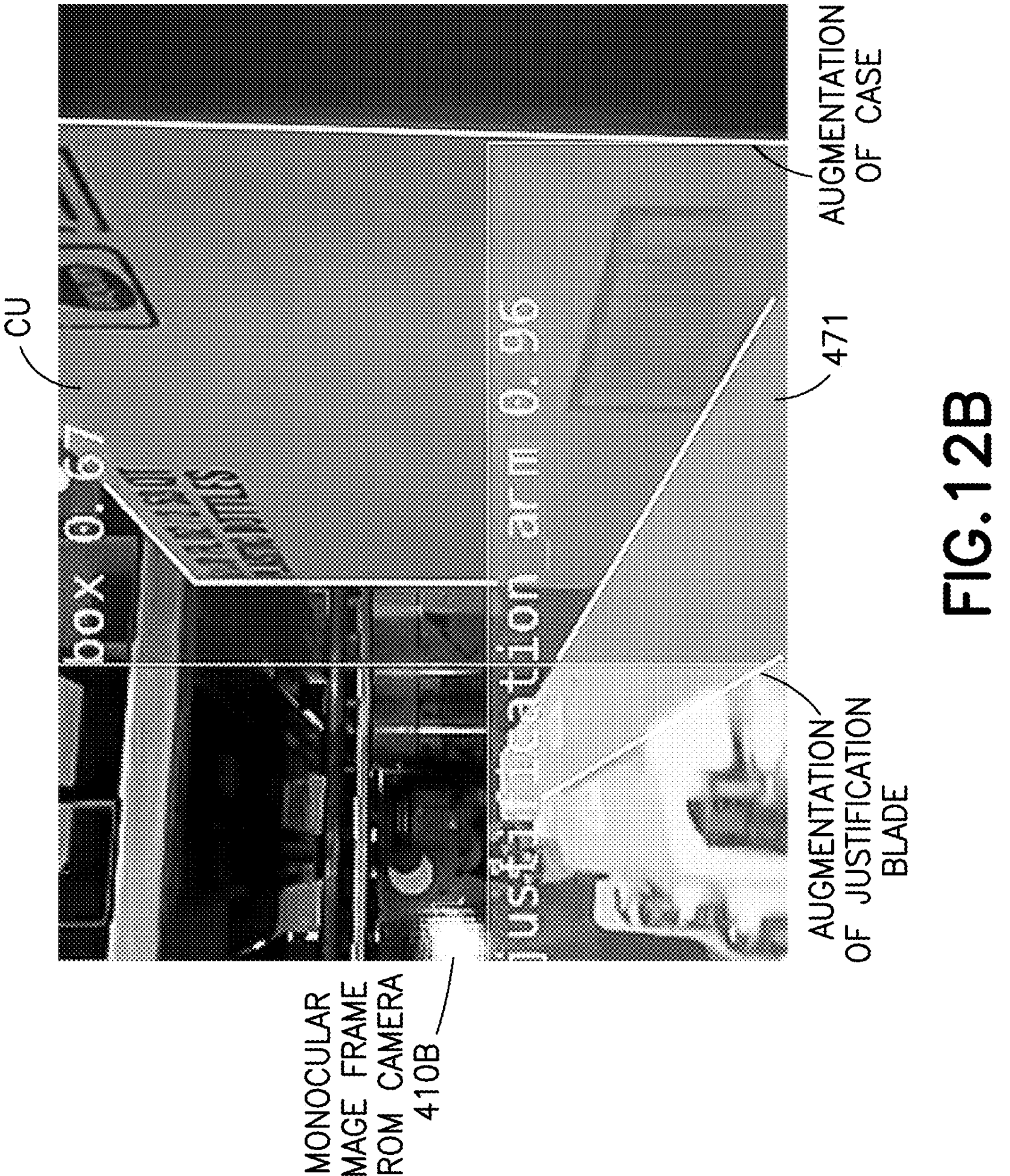

The image frames output by the deep conductor DC may also be presented to a user through the virtual reality headset in a similar manner to that described above with the live video. Here, in addition to detection labels and confidences associated with the detected objects, a machine learning model may be generated as a result of artificial neural network ANN training that augments features of the detected objects in the image frames. For example, referring to FIG. 12B, the image frame from camera 410B is provided, via the deep conductor DC, with the detected object identified. The controller 122 employs the machine learning model to enhance or augment the detected object accordingly. For example, the machine learning model may be applied by the controller 122 to augment or otherwise enhance features of the justification blade 471 and case CU detected in the image. Here, features (such as the edges) of the justification blade 471 and case CU are highlighted or otherwise augmented to expressly define the bounds of the detected objects. It is noted that while the respective bounding boxes of the justification blade 471 and case CU are illustrated in FIG. 12B, such bounding boxes may be omitted where augmentation of the detected object is provided. While the justification bar 471 and case CU are illustrated with augmentation in FIG. 12B, it is noted that any suitable structure of the case, storage and retrieval system 100, and/or autonomous guided vehicle 110 may be augmented in an image frame output by the deep conductor DC so the detected and augmented object (s) may be determined from the output image frame.

Figure 14:
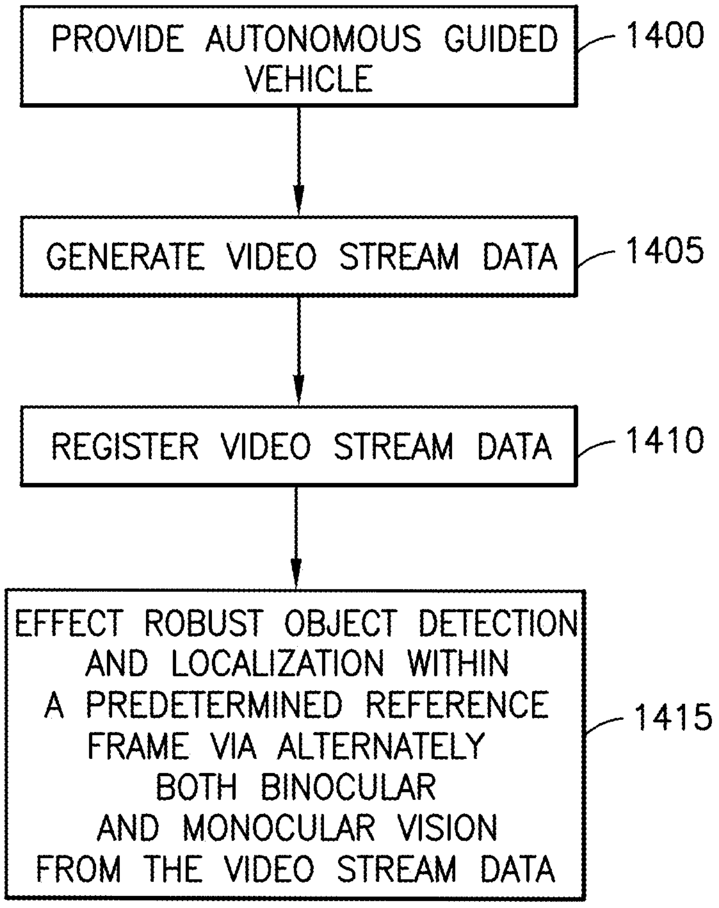
FIG. 14 is an exemplary flow diagram of a method in accordance with aspects of the disclosed embodiment.

Referring to FIGS. TA, 1B, 2, 3A-3C and 14 an exemplary method (e.g., of object detection and localization for the autonomous guided vehicle 110) will be described in accordance with aspects of the disclosed embodiment. Here, the autonomous guided vehicle 110 is provided (FIG. 14, Block 1400). As described herein, the autonomous guided vehicle 110 is provided with a frame 200 with a payload hold 210B, a drive section 261D coupled to the frame 200 with drive wheels 260 supporting the autonomous guided vehicle 110 on a traverse surface 284 where the drive wheels 260 effect vehicle traverse on the traverse surface 284 moving the autonomous guided vehicle 110 over the traverse surface 284 in a facility (e.g., such as a logistics facility, an example of which is the storage and retrieval system 100). A payload handler or transfer arm 210A is coupled to the frame 200 and configured to transfer a payload (such as case CU), with a flat undeterministic seating surface seated in the payload hold or bed 210B, to and from the payload hold 210B and a storage location 130S, of the payload, in a storage array SA. As described herein, the vision system 400 is mounted to the frame 200 and has at least one camera 410A, 410B, 420A, 420B, 430A, 430B, 477A, 477B and the controller 122 is communicably coupled to the vision system 400.

The at least one camera 410A, 410B, 420A, 420B, 430A, 430B, 477A, 477B of the vision system 400 generates video stream data imaging (FIG. 14, Block 1405) of an object (such as those described herein) in the logistic space, where the object is at least one of at least part of the frame 200, at least part of the payload (such as case CU), at least part of the payload handler or transfer arm 210A and at least part of a logistic item or structure in the logistic space beyond the autonomous guided vehicle 110. The controller 122 registers the video stream data imaging (FIG. 14, Block 1410) from the at least one camera 410A, 410B, 420A, 420B, 430A, 430B, 477A, 477B and effects, from the video stream data imaging, robust object detection and localization (FIG. 14, Block 1415) within a predetermined reference frame (such as the autonomous guided vehicle reference frame BREF and/or the global reference frame GREF) via alternately both binocular vision and monocular vision from the video stream data imaging, the detection determined via monocular vision having confidence commensurate with detection determined via the binocular vision.

It should be understood that while the vision system 400 and controller 122 (including the one or more machine learning models ML and one or more artificial neural networks ANN) are described herein with respect to the autonomous guided vehicle 110 in other aspects the vision system 400 and the one or more machine learning models ML and one or more artificial neural networks ANN may be applied to a load handling device 150LHD (FIG. 1—which may be substantially similar to the payload bed 210B of the autonomous guided vehicle 110) and controller of a vertical lift 150 or a pallet builder of the infeed transfer stations 170. Suitable examples, of load handling devices of lifts that the vision system 400 may be incorporated are described in U.S. Pat. No. 10,947,060 titled "Vertical Sequencer for Product Order Fulfilment" and issued on Mar. 16, 2021, the disclosure of which is incorporated herein by reference in its entirety.

Figure 16:
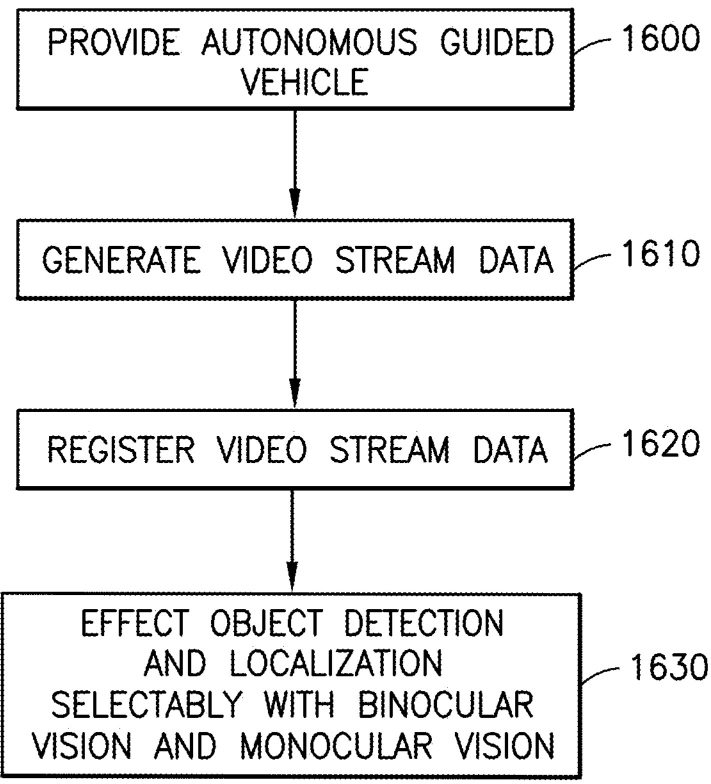
FIG. 16 is an exemplary flow diagram of a method in accordance with aspects of the disclosed embodiment.

Referring to FIGS. 1A, 1B, 2, 3A-3C and 16 an exemplary method (e.g., of object detection and localization for the autonomous guided vehicle 110) will be described in accordance with aspects of the disclosed embodiment. Here, the autonomous guided vehicle 110 is provided (FIG. 16, Block 1600). As described herein, the autonomous guided vehicle 110 is provided with a frame 200 with a payload hold 210B, a drive section 261D coupled to the frame 200 with drive wheels 260 supporting the autonomous guided vehicle 110 on a traverse surface 284 where the drive wheels 260 effect vehicle traverse on the traverse surface 284 moving the autonomous guided vehicle 110 over the traverse surface 284 in a facility (e.g., such as a logistics facility, an example of which is the storage and retrieval system 100). A payload handler or transfer arm 210A is coupled to the frame 200 and configured to transfer a payload (such as case CU), with a flat undeterministic seating surface seated in the payload hold or bed 210B, to and from the payload hold 210B and a storage location 130S, of the payload, in a storage array SA. As described herein, the vision system 400 is mounted to the frame 200 and has at least one camera 410A, 410B, 420A, 420B, 430A, 430B, 477A, 477B. The controller 122 is communicably coupled to the vision system 400 and to at least one or more of the three-dimensional imaging system 440A, 440B and a distance sensor (such as one or more of the laser sensor 271 and ultrasonic sensor 272) that detects a distance of the object (such as those described herein).

The at least one camera 410A, 410B, 420A, 420B, 430A, 430B, 477A, 477B of the vision system 400 generates video stream data imaging (FIG. 16, Block 1610) of the object in the logistic space, where the object is at least one of at least part of the frame 200, at least part of the payload (such as case CU), at least part of the payload handler or transfer arm 210A and at least part of a logistic item or structure in the logistic space beyond the autonomous guided vehicle 110. The controller 122 registers the video stream data imaging (FIG. 16, Block 1620) from the at least one camera 410A, 410B, 420A, 420B, 430A, 430B, 477A, 477B and effects, object detection and localization, within a predetermined reference frame (such as one or more of the global reference frame GREF and autonomous guided vehicle reference frame BREF), from the video stream data imaging selectably with binocular vision and monocular vision (FIG. 16, Block 1630) from the video stream data imaging, each of the binocular vision object detection and localization and the monocular vision object detection and localization being selectable on demand by the controller 122.

In accordance with one or more aspects of the disclosed embodiment, an autonomous guided vehicle comprises: a frame with a payload hold; a drive section coupled to the frame with drive wheels supporting the autonomous guided vehicle on a traverse surface, the drive wheels effect vehicle traverse on the traverse surface moving the autonomous guided vehicle over the traverse surface in a facility; a payload handler coupled to the frame and configured to transfer a payload, with a flat undeterministic seating surface seated in the payload hold, to and from the payload hold of the autonomous guided vehicle and a storage location, of the payload, in a storage array; a vision system mounted to the frame, having at least one camera disposed to generate video stream data imaging of an object in a logistic space, the object being at least one of at least part of the frame, at least part of the payload, at least part of the payload handler and at least part of a logistic item or structure in the logistic space beyond the autonomous guided vehicle; and a controller communicably connected to register the video stream data imaging from the at least one camera and communicably connected to at least one or more of a time of flight sensor and a distance sensor that detects a distance of the object; wherein the controller is configured so to effect, from the video stream data imaging, robust object detection and localization within a predetermined reference frame via alternately both binocular vision and monocular vision from the video stream data imaging, the detection determined via monocular vision having confidence commensurate with detection determined via the binocular vision.

In accordance with one or more aspects of the disclosed embodiment, the controller is configured to effect object detection via the monocular vision with a deep machine learning model.

In accordance with one or more aspects of the disclosed embodiment, the controller is configured to interface with a machine learning module having an object detection function that determines object detection from the monocular vision and a deep machine learning model.

In accordance with one or more aspects of the disclosed embodiment, the autonomous guided vehicle further comprises a media server communicably connected to the at least one camera and registering the video stream data, the media server interfacing the controller, where the controller is disposed onboard the autonomous guided vehicle or remote from the autonomous guided vehicle.

In accordance with one or more aspects of the disclosed embodiment, the payload handler is configured to underpick the payload from the storage location.

In accordance with one or more aspects of the disclosed embodiment, the at least one camera of the vision system comprises two cameras forming a stereo vision camera pair; and the robust object detection and localization effects payload handler underpicking of the payload, from more than two densely packed payloads held in adjacent storage locations, regardless of availability of stereo vision from the stereo vision camera pair.

In accordance with one or more aspects of the disclosed embodiment, the at least one camera of the vision system comprises two cameras forming a stereo vision camera pair; and the robust object detection and localization effects payload handler underpicking of a deformed payload, from more than two densely packed payloads held in adjacent storage locations, regardless of availability of stereo vision from the stereo vision camera pair.

In accordance with one or more aspects of the disclosed embodiment, the at least one camera of the vision system comprises two cameras forming a stereo vision camera pair; and the robust object detection and localization effects payload handler underpicking of the payload, from more than two payloads held in adjacent storage locations and having a dynamic Gaussian case size distribution within the facility, regardless of availability of stereo vision from the stereo vision camera pair.

In accordance with one or more aspects of the disclosed embodiment, object localization effected by the monocular vision has a confidence commensurate with object localization determined via the binocular vision.

In accordance with one or more aspects of the disclosed embodiment, the controller is configured so that binocular vision object detection and localization and monocular vision object detection and localization are interchangeably selectable.

In accordance with one or more aspects of the disclosed embodiment, the controller has a selector disposed to select between binocular vision object detection and localization and monocular vision object detection and localization on demand based on detection of a predetermined operating characteristic of the autonomous guided vehicle.

In accordance with one or more aspects of the disclosed embodiment, the predetermined characteristic is the video stream data registered by the controller being unsupportive of the binocular vision object detection and localization.

In accordance with one or more aspects of the disclosed embodiment, a method of object detection and localization for an autonomous guided vehicle is provided. The method comprises: providing an autonomous guided vehicle with: a frame with a payload hold, a drive section coupled to the frame with drive wheels supporting the autonomous guided vehicle on a traverse surface, the drive wheels effect vehicle traverse on the traverse surface moving the autonomous guided vehicle over the traverse surface in a facility, a payload handler coupled to the frame and configured to transfer a payload, with a flat undeterministic seating surface seated in the payload hold, to and from the payload hold of the autonomous guided vehicle and a storage location, of the payload, in a storage array; a vision system mounted to the frame, the vision system having at least one camera, and a controller communicably coupled to the vision system; generating, with the at least one camera of the vision system, video stream data imaging of an object in a logistic space, where the object is at least one of at least part of the frame, at least part of the payload, at least part of the payload handler and at least part of a logistic item or structure in the logistic space beyond the autonomous guided vehicle; registering, with the controller, the video stream data imaging from the at least one camera; and detecting a distance of the object with at least one or more of a time of flight sensor and a distance sensor that at communicably coupled to the controller; wherein the controller effects, from the video stream data imaging, robust object detection and localization within a predetermined reference frame via alternately both binocular vision and monocular vision from the video stream data imaging, the detection determined via monocular vision having confidence commensurate with detection determined via the binocular vision.

In accordance with one or more aspects of the disclosed embodiment, the controller effects object detection via the monocular vision with a deep machine learning model.

In accordance with one or more aspects of the disclosed embodiment, the controller interfaces with a machine learning module having an object detection function that determines object detection from the monocular vision and a deep machine learning model.

In accordance with one or more aspects of the disclosed embodiment, a media server is communicably connected to the at least one camera and registers the video stream data, the media server interfaces the controller where the controller is disposed onboard the autonomous guided vehicle or remote from the autonomous guided vehicle.

In accordance with one or more aspects of the disclosed embodiment, the payload handler underpicks the payload from the storage location.

In accordance with one or more aspects of the disclosed embodiment, the at least one camera of the vision system comprises two cameras forming a stereo vision camera pair and the method further comprises: effecting, via the robust object detection and localization, payload handler underpicking of the payload, from more than two densely packed payloads held in adjacent storage locations, regardless of availability of stereo vision from the stereo vision camera pair.

In accordance with one or more aspects of the disclosed embodiment, the at least one camera of the vision system comprises two cameras forming a stereo vision camera pair and the method further comprises: effecting, via the robust object detection and localization, payload handler underpicking of a deformed payload, from more than two densely packed payloads held in adjacent storage locations, regardless of availability of stereo vision from the stereo vision camera pair.

In accordance with one or more aspects of the disclosed embodiment, the at least one camera of the vision system comprises two cameras forming a stereo vision camera pair and the method further comprises: effecting, via the robust object detection and localization, payload handler underpicking of the payload, from more than two payloads held in adjacent storage locations and having a dynamic Gaussian case size distribution within the facility, regardless of availability of stereo vision from the stereo vision camera pair.

In accordance with one or more aspects of the disclosed embodiment, object localization effected by the monocular vision has a confidence commensurate with object localization determined via the binocular vision.

In accordance with one or more aspects of the disclosed embodiment, the binocular vision object detection and localization and monocular vision object detection and localization are interchangeably selectable via the controller.

In accordance with one or more aspects of the disclosed embodiment, the controller has a selector disposed to select between binocular vision object detection and localization and monocular vision object detection and localization on demand based on detection of a predetermined operating characteristic of the autonomous guided vehicle.

In accordance with one or more aspects of the disclosed embodiment, the predetermined characteristic is the video stream data registered by the controller being unsupportive of the binocular vision object detection and localization.

In accordance with one or more aspects of the disclosed embodiment, an autonomous guided vehicle comprises: a frame with a payload hold; a drive section coupled to the frame with drive wheels supporting the autonomous guided vehicle on a traverse surface, the drive wheels effect vehicle traverse on the traverse surface moving the autonomous guided vehicle over the traverse surface in a facility; a payload handler coupled to the frame and configured to transfer a payload, with a flat undeterministic seating surface seated in the payload hold, to and from the payload hold of the autonomous guided vehicle and a storage location, of the payload, in a storage array; a vision system mounted to the frame, having at least one camera disposed to generate video stream data imaging of an object in a logistic space, the object being at least one of at least part of the frame, at least part of the payload, at least part of the payload handler and at least part of a logistic item or structure in the logistic space beyond the autonomous guided vehicle; and a controller communicably connected to register the video stream data imaging from the at least one camera and communicably connected to at least one or more of a time of flight sensor and a distance sensor that detects a distance of the object; wherein the controller is configured so that object detection and localization, within a predetermined reference frame, is effected from the video stream data imaging selectably with binocular vision and monocular vision from the video stream data imaging, each of the binocular vision object detection and localization and the monocular vision object detection and localization being selectable on demand by the controller.

In accordance with one or more aspects of the disclosed embodiment, the monocular vision detection and localization has a confidence commensurate with detection determined via the binocular vision object detection and localization.

In accordance with one or more aspects of the disclosed embodiment, the controller is configured so that the binocular vision object detection and localization and the monocular vision object detection and localization are interchangeably selectable.

In accordance with one or more aspects of the disclosed embodiment, the controller has a selector disposed to select between the binocular vision object detection and localization and the monocular vision object detection and localization on demand based on detection of a predetermined operating characteristic of the autonomous guided vehicle.

In accordance with one or more aspects of the disclosed embodiment, the predetermined characteristic is the video stream data imaging registered by the controller being unsupportive of the binocular vision object detection and localization.

In accordance with one or more aspects of the disclosed embodiment, the controller is configured to effect object detection via the monocular vision with a deep machine learning model.

In accordance with one or more aspects of the disclosed embodiment, the controller is configured to interface with a machine learning module having an object detection function that determines object detection from the monocular vision and a deep machine learning model.

In accordance with one or more aspects of the disclosed embodiment, the autonomous guided vehicle further comprises a media server communicably connected to the at least one camera and registering the video stream data, the media server interfacing the controller, where the controller is disposed onboard the autonomous guided vehicle or remote from the autonomous guided vehicle.

In accordance with one or more aspects of the disclosed embodiment, a method of object detection and localization for an autonomous guided vehicle is provided. The method comprises: providing an autonomous guided vehicle with: a frame with a payload hold, a drive section coupled to the frame with drive wheels supporting the autonomous guided vehicle on a traverse surface, the drive wheels effect vehicle traverse on the traverse surface moving the autonomous guided vehicle over the traverse surface in a facility, a payload handler coupled to the frame and configured to transfer a payload, with a flat undeterministic seating surface seated in the payload hold, to and from the payload hold of the autonomous guided vehicle and a storage location, of the payload, in a storage array, a vision system mounted to the frame, having at least one camera disposed to generate video stream data imaging of an object in a logistic space, the object being at least one of at least part of the frame, at least part of the payload, at least part of the payload handler and at least part of a logistic item or structure in the logistic space beyond the autonomous guided vehicle, and a controller communicably connected to the vision system and to at least one or more of a time of flight sensor and a distance sensor that detects a distance of the object; registering, with the controller, the video stream data imaging from the at least one camera; and effecting, with the controller, object detection and localization, within a predetermined reference frame, from the video stream data imaging selectably with binocular vision and monocular vision from the video stream data imaging, each of the binocular vision object detection and localization and the monocular vision object detection and localization being selectable on demand by the controller.

In accordance with one or more aspects of the disclosed embodiment, the monocular vision detection and localization has a confidence commensurate with detection determined via the binocular vision object detection and localization.

In accordance with one or more aspects of the disclosed embodiment, the binocular vision object detection and localization and the monocular vision object detection and localization are interchangeably selectable by the controller.

In accordance with one or more aspects of the disclosed embodiment, the controller has a selector disposed to select between the binocular vision object detection and localization and the monocular vision object detection and localization on demand based on detection of a predetermined operating characteristic of the autonomous guided vehicle.

In accordance with one or more aspects of the disclosed embodiment, the predetermined characteristic is the video stream data imaging registered by the controller being unsupportive of the binocular vision object detection and localization.

In accordance with one or more aspects of the disclosed embodiment, the controller effects object detection via the monocular vision with a deep machine learning model.

In accordance with one or more aspects of the disclosed embodiment, the controller interfaces with a machine learning module having an object detection function that determines object detection from the monocular vision and a deep machine learning model.

In accordance with one or more aspects of the disclosed embodiment, a media server is communicably connected to the at least one camera and registers the video stream data, the media server interfaces the controller where the controller is disposed onboard the autonomous guided vehicle or remote from the autonomous guided vehicle.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the disclosed embodiment.

The invention claimed is:

1. An autonomous guided vehicle comprising:

a frame with a payload hold;

a drive section coupled to the frame with drive wheels supporting the autonomous guided vehicle on a traverse surface, the drive wheels effect vehicle traverse on the traverse surface moving the autonomous guided vehicle over the traverse surface in a facility;

a payload handler coupled to the frame and configured to transfer a payload, with a flat undeterministic seating surface seated in the payload hold, to and from the payload hold of the autonomous guided vehicle and a storage location, of the payload, in a storage array;

a vision system mounted to the frame, having at least one camera disposed to generate video stream data imaging of an object in a logistic space, the object being at least one of at least part of the frame, at least part of the payload, at least part of the payload handler and at least part of a logistic item or structure in the logistic space beyond the autonomous guided vehicle; and a controller communicably connected to register the video stream data imaging from the at least one camera and communicably connected to at least one or more of a time of flight sensor and a distance sensor that detects a distance of the object;

wherein the controller is configured so to effect, from the video stream data imaging, robust object detection and localization within a predetermined reference frame via alternately both binocular vision and monocular vision from the video stream data imaging, the detection determined via monocular vision having confidence commensurate with detection determined via the binocular vision.

2. The autonomous guided vehicle of claim 1, wherein the controller is configured to effect object detection via the monocular vision with a deep machine learning model.

3. The autonomous guided vehicle of claim 1, wherein the controller is configured to interface with a machine learning module having an object detection function that determines object detection from the monocular vision and a deep machine learning model.

4. The autonomous guided vehicle of claim 1, further comprising a media server communicably connected to the at least one camera and registering the video stream data, the media server interfacing the controller, where the controller is disposed onboard the autonomous guided vehicle or remote from the autonomous guided vehicle.

5. The autonomous guided vehicle of claim 1, wherein the payload handler is configured to underpick the payload from the storage location.

6. The autonomous guided vehicle of claim 1, wherein:

the at least one camera of the vision system comprises two cameras forming a stereo vision camera pair; and the robust object detection and localization effects payload handler underpicking of the payload, from more than two densely packed payloads held in adjacent storage locations, regardless of availability of stereo vision from the stereo vision camera pair.

7. The autonomous guided vehicle of claim 1, wherein:

the at least one camera of the vision system comprises two cameras forming a stereo vision camera pair; and the robust object detection and localization effects payload handler underpicking of a deformed payload, from more than two densely packed payloads held in adjacent storage locations, regardless of availability of stereo vision from the stereo vision camera pair.

8. The autonomous guided vehicle of claim 1, wherein:

the at least one camera of the vision system comprises two cameras forming a stereo vision camera pair; and the robust object detection and localization effects payload handler underpicking of the payload, from more than two payloads held in adjacent storage locations and having a dynamic Gaussian case size distribution within the facility, regardless of availability of stereo vision from the stereo vision camera pair.

9. The autonomous guided vehicle of claim 1, wherein object localization effected by the monocular vision has a confidence commensurate with object localization determined via the binocular vision.

10. The autonomous guided vehicle of claim 1, wherein the controller is configured so that binocular vision object detection and localization and monocular vision object detection and localization are interchangeably selectable.

11. The autonomous guided vehicle of claim 1, wherein the controller has a selector disposed to select between binocular vision object detection and localization and monocular vision object detection and localization on demand based on detection of a predetermined operating characteristic of the autonomous guided vehicle.

12. The autonomous guided vehicle of claim 11, wherein the predetermined characteristic is the video stream data registered by the controller being unsupportive of the binocular vision object detection and localization.

13. A method of object detection and localization for an autonomous guided vehicle, the method comprising:

providing an autonomous guided vehicle with:

a frame with a payload hold;

a drive section coupled to the frame with drive wheels supporting the autonomous guided vehicle on a traverse surface, the drive wheels effect vehicle traverse on the traverse surface moving the autonomous guided vehicle over the traverse surface in a facility;

a payload handler coupled to the frame and configured to transfer a payload, with a flat undeterministic seating surface seated in the payload hold, to and from the payload hold of the autonomous guided vehicle and a storage location, of the payload, in a storage array; a vision system mounted to the frame, the vision system having at least one camera; and a controller communicably coupled to the vision system;

generating, with the at least one camera of the vision system, video stream data imaging of an object in a logistic space, where the object is at least one of at least part of the frame, at least part of the payload, at least part of the payload handler and at least part of a logistic item or structure in the logistic space beyond the autonomous guided vehicle;

registering, with the controller, the video stream data imaging from the at least one camera; and detecting a distance of the object with at least one or more of a time of flight sensor and a distance sensor that at communicably coupled to the controller;

wherein the controller effects, from the video stream data imaging, robust object detection and localization within a predetermined reference frame via alternately both binocular vision and monocular vision from the video stream data imaging, the detection determined via monocular vision having confidence commensurate with detection determined via the binocular vision.

14. The method of claim 13, wherein the controller effects object detection via the monocular vision with a deep machine learning model.

15. The method of claim 13, wherein the controller interfaces with a machine learning module having an object detection function that determines object detection from the monocular vision and a deep machine learning model.

16. The method of claim 13, wherein a media server is communicably connected to the at least one camera and registers the video stream data, the media server interfaces the controller where the controller is disposed onboard the autonomous guided vehicle or remote from the autonomous guided vehicle.

17. The method of claim 13, wherein the payload handler underpicks the payload from the storage location.

18. The method of claim 13, wherein the at least one camera of the vision system comprises two cameras forming a stereo vision camera pair, the method further comprising:

effecting, via the robust object detection and localization, payload handler underpicking of the payload, from more than two densely packed payloads held in adjacent storage locations, regardless of availability of stereo vision from the stereo vision camera pair.

19. The method of claim 13, wherein the at least one camera of the vision system comprises two cameras forming a stereo vision camera pair, the method further comprising:

effecting, via the robust object detection and localization, payload handler underpicking of a deformed payload, from more than two densely packed payloads held in adjacent storage locations, regardless of availability of stereo vision from the stereo vision camera pair.

20. The method of claim 13, wherein the at least one camera of the vision system comprises two cameras forming a stereo vision camera pair, the method further comprising:

effecting, via the robust object detection and localization, payload handler underpicking of the payload, from more than two payloads held in adjacent storage locations and having a dynamic Gaussian case size distribution within the facility, regardless of availability of stereo vision from the stereo vision camera pair.

21. The method of claim 13, wherein object localization effected by the monocular vision has a confidence commensurate with object localization determined via the binocular vision.

22. The method of claim 13, wherein the binocular vision object detection and localization and monocular vision object detection and localization are interchangeably selectable via the controller.

23. The method of claim 13, wherein the controller has a selector disposed to select between binocular vision object detection and localization and monocular vision object detection and localization on demand based on detection of a predetermined operating characteristic of the autonomous guided vehicle.

24. The method of claim 23, wherein the predetermined characteristic is the video stream data registered by the controller being unsupportive of the binocular vision object detection and localization.

* * * * *